United States Patent [19]
Danzuka et al.

[11] Patent Number: 5,276,459
[45] Date of Patent: Jan. 4, 1994

[54] RECORDING APPARATUS FOR PERFORMING UNIFORM DENSITY IMAGE RECORDING UTILIZING PLURAL TYPES OF RECORDINGS HEADS

[75] Inventors: Toshimitsu Danzuka, Tokyo; Yoshihiro Takada, Kawasaki; Eiichi Takagi, Yokohama; Haruhiko Moriguchi, Yokohama; Akio Suzuki, Yokohama; Yasushi Miura, Kawasaki; Hisashi Fukushima; Masami Izumizaki, both of Yokohama, all of Japan

[73] Assignee: Canon Kabushiki Kaisha, Tokyo, Japan

[21] Appl. No.: 692,291

[22] Filed: Apr. 26, 1991

[30] Foreign Application Priority Data

| Apr. 27, 1990 | [JP] | Japan | 2-110367 |
| May 11, 1990 | [JP] | Japan | 2-119956 |
| May 11, 1990 | [JP] | Japan | 2-119957 |
| May 25, 1990 | [JP] | Japan | 2-134100 |
| Jul. 12, 1990 | [JP] | Japan | 2-182801 |

[51] Int. Cl.$^5$ .............................................. B41J 2/01
[52] U.S. Cl. ........................ 346/33 A; 346/140 R; 358/503; 358/518; 358/296
[58] Field of Search ............. 346/140; 355/208; 400/73, 175; 358/296, 298, 75, 80

[56] References Cited

U.S. PATENT DOCUMENTS

| 4,647,184 | 3/1987 | Russell | 355/208 |
| 4,692,778 | 9/1987 | Yoshimura | 346/140 R X |
| 4,710,785 | 12/1987 | Mills | 346/153.1 |
| 4,827,279 | 5/1989 | Lubinsky | 346/1.1 |
| 5,038,208 | 8/1991 | Ichikawa | 346/1.1 X |
| 5,039,237 | 8/1991 | Tanuma | 400/175 X |
| 5,084,758 | 1/1992 | Danzuka | 346/140 R X |

*Primary Examiner*—Joseph W. Hartary
*Attorney, Agent, or Firm*—Fitzpatrick, Cella, Harper & Scinto

[57] ABSTRACT

The present invention relates to image recording apparatus for performing image recording on a recording medium by using plural types of recording heads, each having a plurality of recording elements comprising an array. A test pattern forming unit for forming test patterns on the recording medium by using the plural types of recording heads, a reading unit for reading the test patterns recorded by the test pattern recording unit, and a correction unit for correcting image signals for driving the recording elements in accordance with the recording elements and types of recording heads on the basis of data read by the reading unit are included whereby image density is made uniform.

65 Claims, 73 Drawing Sheets

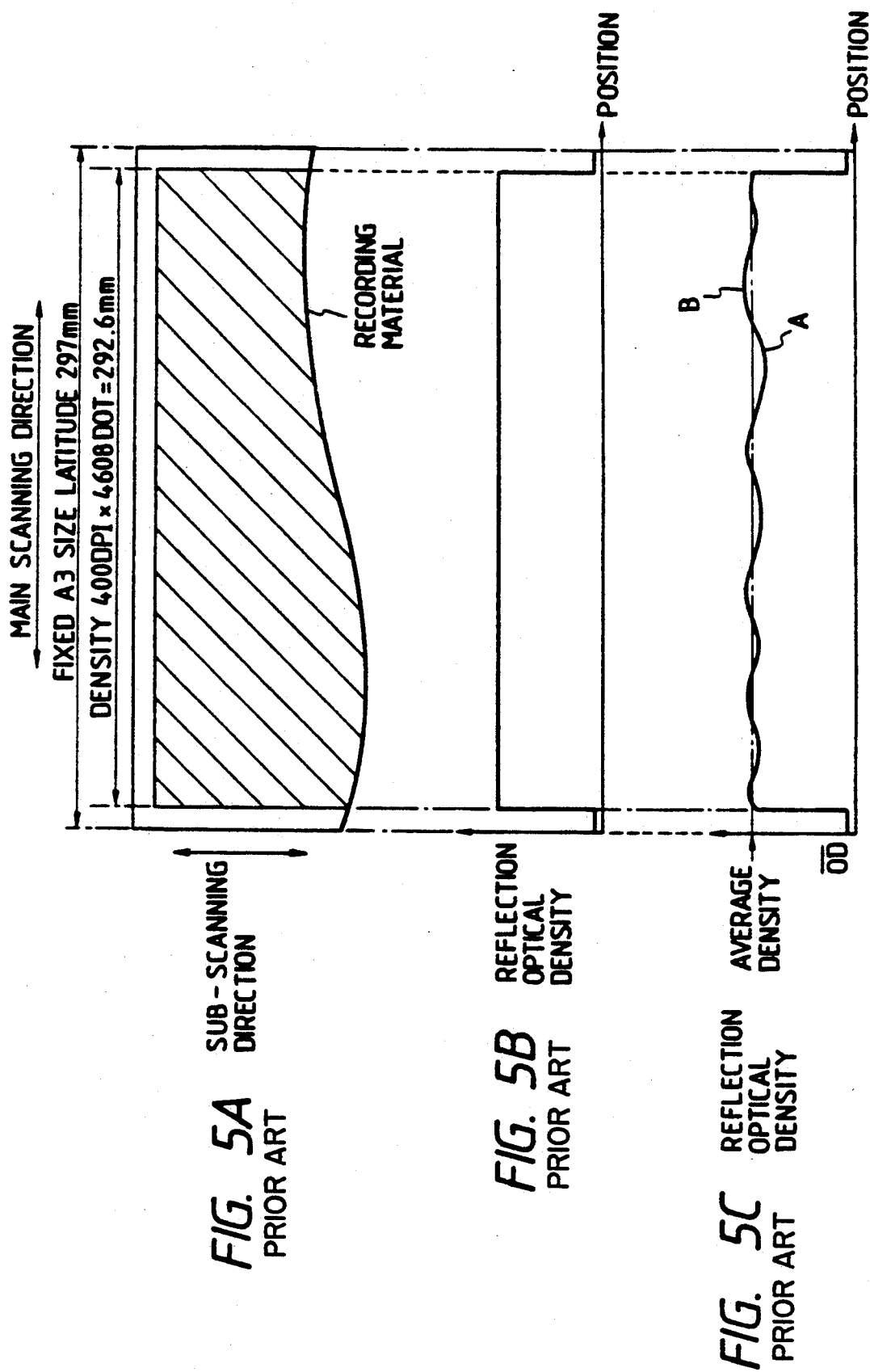

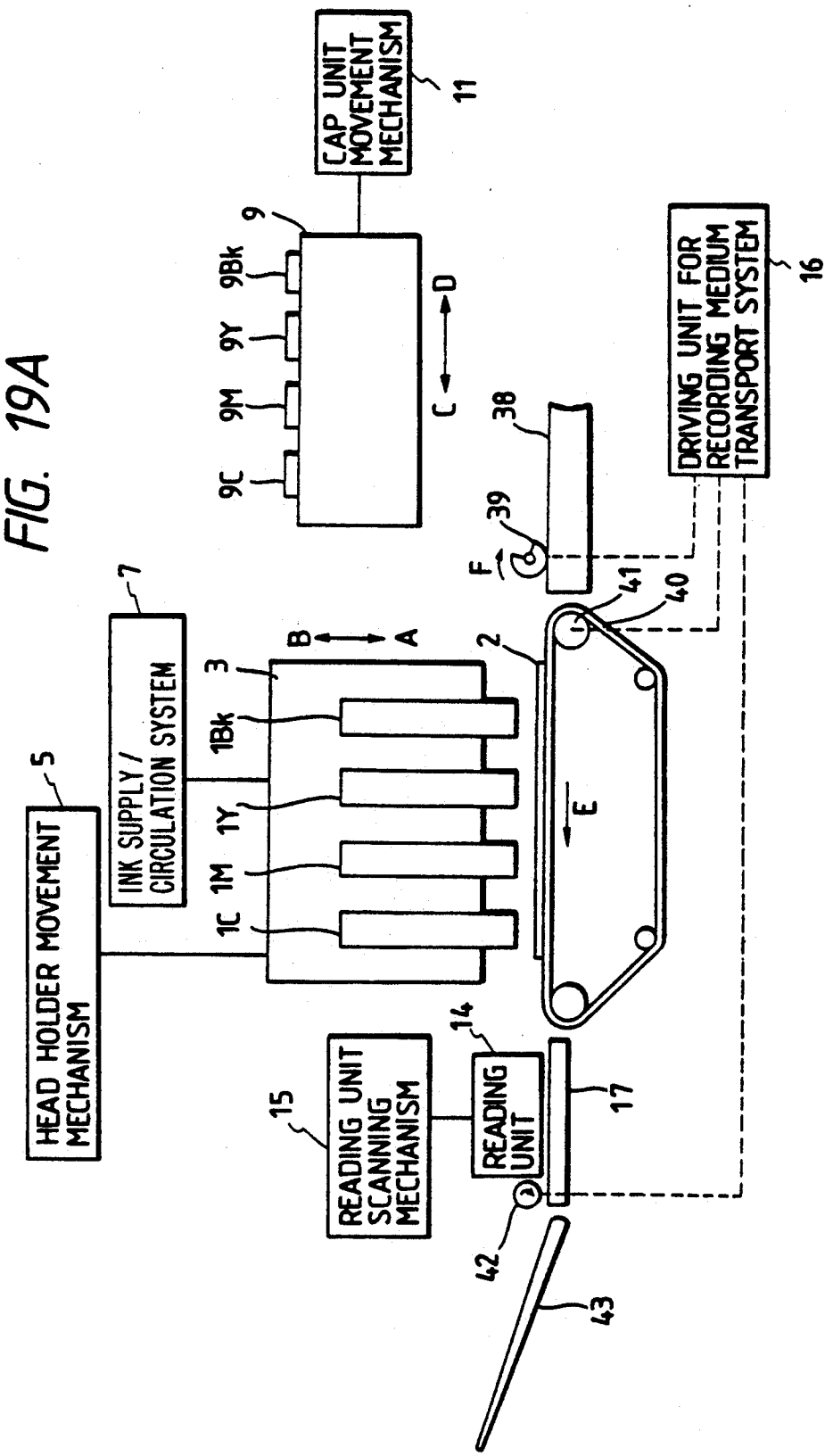

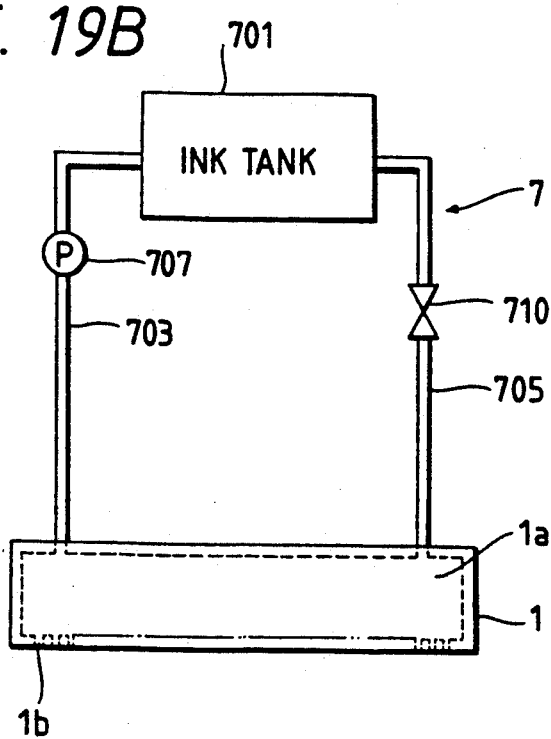
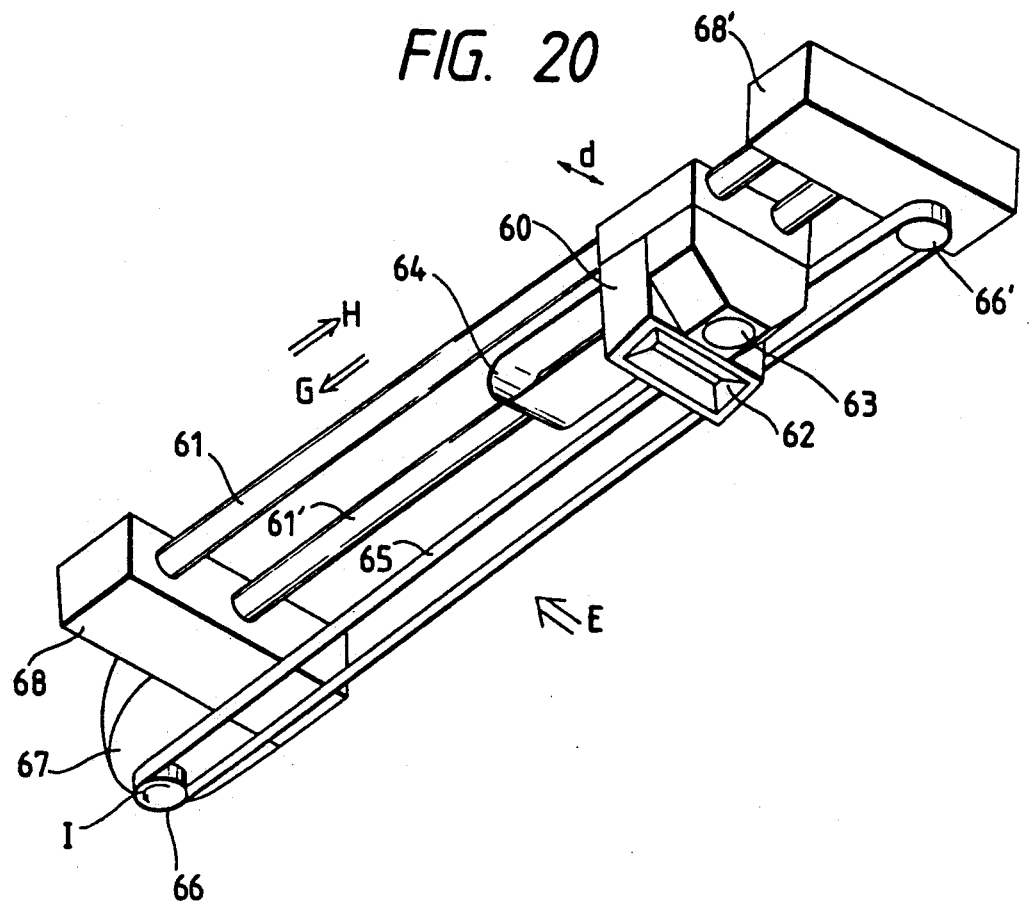

DRIVING FREQUENCY OF
STEPPING MOTOR

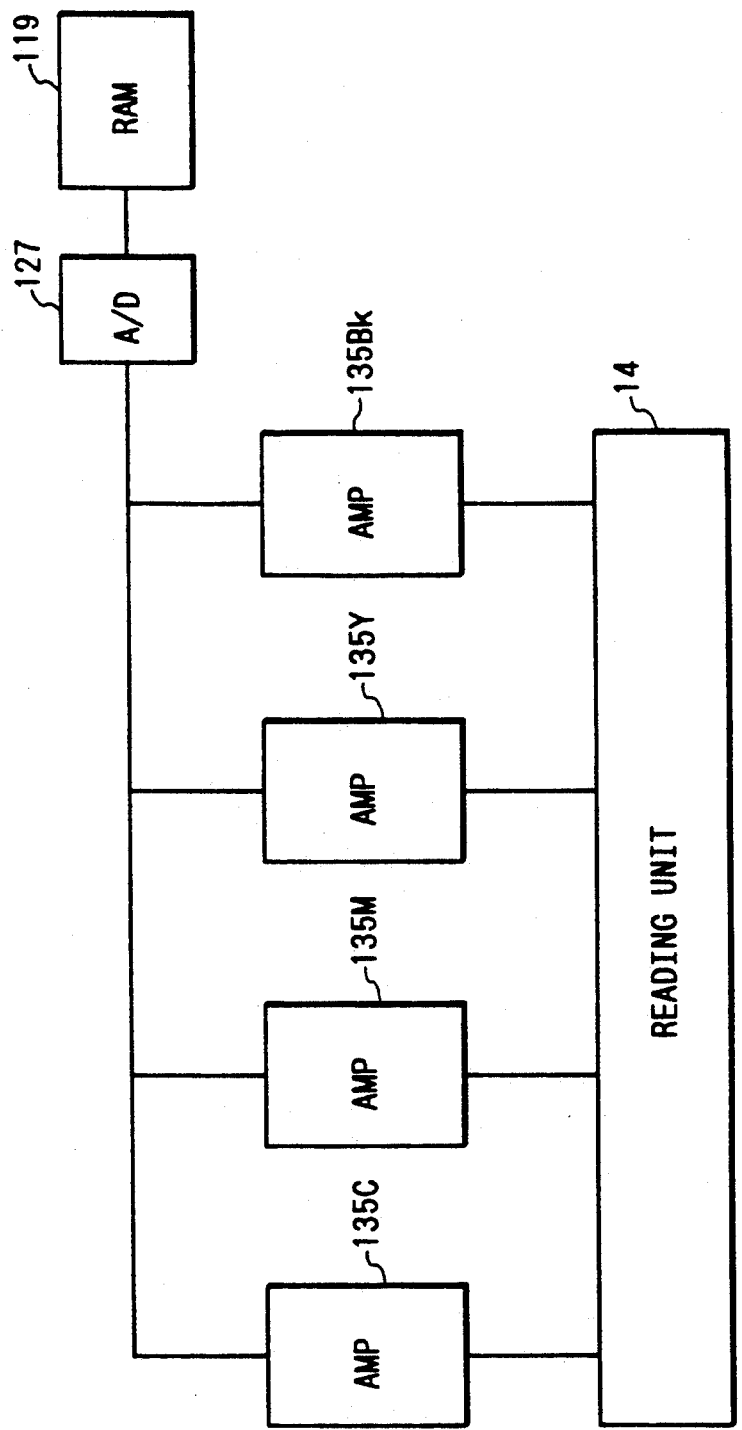

RECORDING APPARATUS FOR PERFORMING UNIFORM DENSITY IMAGE RECORDING UTILIZING PLURAL TYPES OF RECORDINGS HEADS

BACKGROUND OF THE INVENTION

1. Field of the Invention

The present invention relates to an image forming apparatus and an image reading apparatus and, more particularly, to an image forming apparatus and an image reading apparatus for the image forming apparatus for performing image formation using a recording head having an array of a plurality of recording elements.

More particularly, the present invention relates to an apparatus having a mechanism for automatically adjusting print characteristics of a recording head in an ink-jet recording apparatus and is especially effective in an apparatus for forming a multi-gradation color image by overlapping ink droplets.

2. Related Background Art

Along with development of information processing equipment (e.g., a copying machine, a wordprocessor, and a computer) and communication equipment, apparatuses for performing digital image recording using a recording head by using an ink-jet scheme, a thermal transfer scheme, or the like have been very popular as image forming (recording) apparatuses for equipment such as information processing equipment and communication equipment. In such a recording apparatus, a recording head having an array of a plurality of recording elements (to be referred to as a multi-head hereinafter) is generally used to increase a recording speed.

For example, a multi-nozzle head having a plurality of ink orifices and a plurality of liquid paths is generated used in an ink-jet recording head. A plurality of heaters are generally stacked in a thermal transfer or thermal head.

It is very difficult to uniformly manufacture recording elements of a multi-head due to variations in characteristics during the fabrication process and variations in properties of head constituting materials. Variations occur in the characteristics of the respective recording elements. For example, in the above multi-nozzle head, variations occur in shapes of the orifices and liquid paths. In the above thermal head, shapes of heaters and resistances inevitably vary. Nonuniformity of characteristics between the recording elements appears as nonuniformity of sizes of dots recorded by the respective recording elements and as uneven image densities of the resultant image.

To cope with the above problems, various methods are proposed in which an uneven image density is visually found or an adjusted image is visually checked, a signal applied to each recording element is manually corrected, thereby obtaining a uniform image.

For example, in a multi-head 330 having recording elements 331 arranged as shown in FIG. 1A, assume that input signals to the respective recording elements are uniform, as shown in FIG. 1B, and that an uneven image density is visually found, as shown in FIG. 1C. In this case, an input signal is corrected, as shown in FIG. 1D. More specifically, a large input signal is supplied to a recording element corresponding to a low image density, and a small input signal is supplied to a recording element corresponding to a high image density, thereby generally performing manual adjustment.

In a recording scheme capable of modulating a dot diameter or dot density, the diameter of a dot to be recorded by each recording element is modulated in accordance with an input to achieve gradation recording. For example, if modulation of a drive voltage applied to each injection energy generating element (e.g., a piezoelectric element or an electricity-heat conversion element) in an ink-jet recording head according to a piezoelectric scheme or a scheme utilizing heat energy, or a drive voltage applied to each heater in a thermal head or a pulse width of the drive voltage in accordance with an input signal is utilized, a dot diameter or a dot density of each recording element can be made uniform, and a density distribution can be made uniform, as shown in FIG. 1E. Alternatively, assume that it is difficult to modulate a drive voltage or pulse width or it is difficult to perform density adjustment in a wide range even if the drive voltage or pulse width is modulated. In this case, if one pixel is constituted by, e.g., a plurality of dots, the number of dots to be recorded in accordance with an input signal is modulated. A larger number of dots are assigned to a portion having a low density, while a smaller number of dots are assigned to a portion having a high density. If one pixel is constituted by one dot, the number of orifice-use times (the number of injection cycles) per pixel is modulated in the ink-jet recording apparatus, thereby changing the dot diameter. Therefore, the density distribution can be made uniform, as shown in FIG. 1E.

Japanese Patent Laid-Open Application No. 57-41965 filed by the present applicant discloses that a color image is automatically read by an optical sensor, and a correction signal is supplied to each ink-jet recording head to form a desired color image. In this prior-art invention, basic automatic adjustment is disclosed, and an important technique is thus disclosed. Various problems may be posed when this prior-art invention is embodied in a variety of practical applications as various apparatuses. However, technical problems addressed in the present invention are not solved in this prior-art invention.

Techniques except for a density detection scheme are disclosed in Japanese Laid-Open Patent Application No. 60-206660, U.S. Pat. No. 4,328,504, and Japanese Patent Laid-Open Application Nos. 50-147241 and 54-27728. A landing position of a liquid droplet is automatically read, and the read position data is corrected to perform landing to an accurate position. Although these schemes are common as automatic adjustment techniques, the technical problems addressed in the present invention are not solved in these prior-art inventions.

According to the above method, even if an uneven image density can be corrected once, a correction quantity of an input signal must be changed when the uneven image density is changed. In an ink-jet head, a precipitate of an ink may be attached to a portion near an ink orifice, or a foreign substance may be attached thereto, and the density distribution may often be changed. In thermal transfer, degradation of each heater and its change of properties occur to result in a change in density distribution. In this case, an initial input correction quantity does not allow sufficient uneven image density correction. For this reason, an uneven image density becomes conspicuous in long-term use, resulting in inconvenience.

In order to cope with the above problem, an uneven image density reading unit is arranged in an image forming apparatus, and an uneven image density distribution within the array of recording elements is periodically read to rewrite an unevenness correction data, thus providing an effective countermeasure. According to this technique, even if the uneven image density distribution of the head is changed, the unevenness correction data is rewritten accordingly, thereby always obtaining a uniform image free from unevenness. Such an image recording apparatus is proposed by the present applicant (U.S. Ser. No. 480,041 filed on Feb. 14, 1990; and U.S. Ser. No. 516,129 filed on Apr. 27, 1990).

A schematic arrangement obtained by applying the above proposal to an ink-jet recording apparatus is shown in FIG. 2.

Multi-nozzle ink heads 1C, 1M, 1Y, and 1Bk are of a cyan ink, a magenta ink, a yellow ink, and a black ink, respectively. Each ink-jet head has a density of 400 dpi, the number of nozzles as 4,736, and a width of about 300 mm and can selectively inject an ink (i.e., so-called on-demand scheme) for a recording material of a fixed A3 size (latitude: 297 mm) or less such as a recording material of a B4 or A4 size upon movement of the recording material. An image can be formed on the entire surface of the recording material upon a single movement of the recording material.

This ink-jet head can be realized by an ink-jet head for supplying electrical pulses to heating resistor elements formed utilizing, e.g., a semiconductor fabrication process, to heat an ink so as to form a bubble, thereby injecting or ejecting an ink droplet by its pressure. By utilizing four of these ink-jet heads, a high-speed full-color image recording apparatus having a speed of about 30 cpm (copies per minute) can be arranged. The full-color image recording apparatus includes a cassette 602 for storing recording materials 603 (not shown in FIG. 2). The recording material 603 (not shown in FIG. 2) is picked up by a pickup roller 604 and is electrostatically attracted to a conveyor belt 608 through first resist rollers 605, a guide plate 606, and second resist rollers 607, so that ink-jet recording is performed on a platen 609.

When normal ink-jet recording is to be performed, a test pattern reading system consisting of a lamp source 610 and an optical sensor 611 is not operated. The recording material on which a desired image is recorded is discharged onto a discharge tray 614 through a guide plate 612 and discharge rollers 613.

When ink-jet recording of a test pattern for correcting an uneven image density is to be performed, the test pattern reading system consisting of the lamp source 610 and the optical sensor 611 is operated. More specifically, the lamp source 610 is turned on, and the optical sensor 611 receives light reflected by the recorded test pattern and outputs an electrical signal proportional to a light reception quantity. Each of the lamp source 610 and the optical sensor 611 has a width equal to or larger than that of the ink-jet head 1. Alternatively, the lamp source 610 and the optical sensor 611 may be arranged such that scanning is performed in a direction perpendicular to the drawing surface (FIG. 2) along a guide rail (not shown) to read the recording characteristics of a plurality of recording elements (a plurality of nozzles in this case).

FIG. 3 shows an uneven image density reading unit 506 used in the above method. A recording medium 501 has an unevenness measurement test pattern. The reading unit 506 includes a light source 502 for illuminating a surface of the recording medium, a reading sensor 503 for reading light reflected by the surface of the recording medium, and lenses 504 and 505. The reading unit 506 having the above arrangement is scanned to read an unevenness distribution, thereby rewriting unevenness correction data.

FIG. 4 shows another uneven image density reading unit. The reading unit comprises a line sensor 520 comprising a CCD or the like having read pixels 521, and an unevenness correction test pattern 524 in which a recording element is formed by a width d in the y direction. The density of the test pattern is read by a recording head while the line sensor 520 is scanned in the x direction. Data read by the pixels 521 of the line sensor 520 correspond to density data formed by the respective recording elements of the recording head.

An algorithm of uneven image density correction proposed above will be briefly described with reference to FIGS. 5A to 5C and FIGS. 6A and 6B.

A test pattern (FIG. 5A) obtained by driving a plurality of recording elements (nozzles in this case) under the same condition, i.e., by the same drive image signal (the drive signal is defined as $S_0$ in this case) is recorded. An optical density of the test pattern is not uniform due to variations caused by fabrication of the respective recording elements and variations caused by deteriorations over time, as shown in FIG. 5B. An uneven image density is caused, as shown in FIG. 5C. A drive signal S for the recording head in response to the read signal is corrected in units of recording elements in accordance with the read signal, thereby preventing an uneven image density.

More specifically, light is incident on the test pattern (FIG. 5A), and light reflected by the test pattern is received. The received light quantity is A/D-converted into digital data, thereby measuring a distribution $E_i$ (where i is a recording area of the ith nozzle) ($S_0$) of quantities of reflected light. ($S_0$) represents that $E_i$ is a function of S. If $S=S_0$, then $E_i$ is obtained. Light quantity to density conversion is performed to convert the distribution $E_i(S_0)$ of quantities of reflected light into a distribution $OD_i(S_0)$ optical densities. An average density $\overline{OD}(S_0)$ is calculated, and a reciprocal ratio $\overline{OD}(S_0)/OD_i(S_0)$ for the average density $\overline{OD}(S_0)$ of the optical density $OD_i(S_0)$ of each portion is multiplied with the drive signal for driving the ith recording element, thereby correcting the uneven image density (to be described later), thereby obtaining a uniform image free from an uneven image density.

An example of the above operation will be briefly described below. Assume that a proportional relationship between the drive signal S and the optical density $OD_i(S)$ of the recording material is established, as shown in FIG. 6A. If no proportional relationship is established, the drive signal S is corrected so as to obtain a proportional relationship by using a look-up table or the like. Since all the recording elements are driven by the same drive signal $S_0$, optical densities vary depending on the respective recording elements (i values), as shown in FIG. 6A. The second recording element, i.e., $i=2$ will be taken as an example (FIG. 6B). The optical density of a portion to be recorded by the second recording element is $OD_2(S_0) = a_2 \times S_0$ as opposed to the average density $\overline{OD}(S_0) = \overline{a} \times S$ of the entire image, so that the portion to be recorded by the second recording element has a lower density than the average density. The drive signal for driving the second recording element is corrected to $\overline{OD}(S_0)/OD_2(S_0) \times S_0$. Since condition $\overline{OD}(S_0)/OD_2(S_0) = (\bar{a} \times S_0)/(a_2 \times S_0) = \bar{a}/a_2$ is established, the drive signal for driving the second recording element is given as $\overline{OD}(S_0)/OD_2(S_0) \times S_0 = \bar{a}/a_2 \times S_0$. This correction value is proved to be a correct correction value (correction value for eliminating an uneven image density) as follows.

As is apparent from FIG. 6B, since $\Delta ABC \alpha \Delta ADE$ is established, $$BC:DE = AC:AE$$

$$BC:DE = a_2 \times S_0 : \bar{a} \times S_0 = a_2 : \bar{a}$$

and $$AC:AE = a_2 : \bar{a}, \ AC = S_0$$

then $$AE = \bar{a}/a_2 \times S_0$$

When the second recording element is driven with $\bar{a}/a_2 \times S_0$, the optical density is given as $\bar{a} \times S_0$ which is equal to the average density from FIG. 6B. The unevenness of this portion can be apparently corrected. A correction value of the drive signal for driving the second recording element is thus confirmed to be $\overline{OD}(S_0)/OD_2(S_0)$ (this value is multiplied with the drive signal). This can also be applied to other recording elements. When a correction value $\overline{OD}/OD_i$ is multiplied with a drive signal for driving the ith recording element, the uneven image density of the recorded image can be corrected and made uniform. Since any $S_0$ value can be selected, the uneven image densities of all the drive signal values can be corrected and made uniform.

In summary, light is incident on the test pattern shown in FIG. 5A and a quantity of light reflected by the test pattern is measured. A correction quantity is calculated by performing the above calculations, and the recording head is driven by the corrected drive signals. The uneven image densities caused by variations in recording elements can be corrected, and a desired recorded image can be obtained.

In an image recording apparatus for performing image recording using the cyan, magenta, yellow, and black recording heads described above, recording characteristics of the recording heads are to be often detected and then an uneven image density is to be corrected. When light is incident on test patterns (of different colors) recorded by the respective recording heads, and conversion parameters for converting signals proportional to the quantities of reflected light into signals proportional to optical densities, are common to all the color components (i.e., cyan, magenta, yellow, and black), the quantities of reflected light cannot be accurately transformed into optical densities. For this reason, the uneven image density cannot be perfectly corrected.

When light is to be incident on the test patterns (of different colors) recorded by the respective recording heads, and analog data proportional to the distribution of the quantities of reflected light are to be converted into digital data, reference analog values for A/D conversion for cyan, magenta, yellow, and black recording heads are the same. For this reason, resolutions (representing a minimum density difference determination range) for the densities of the read data of the uneven image densities of the yellow, magenta, and cyan recording heads are decreased, and uneven image density correction precision is degraded, resulting in inconvenience.

In the above operations, it is generally difficult to actually obtain an image perfectly free from an uneven image density by a single calculation cycle. The calculations must be repeated until an image perfectly free from the uneven image density is obtained. When the operations are terminated after satisfactory unevenness density correction of an image with the resultant correction data is confirmed, a sufficient unevenness correction effect can be obtained.

Even if correction data is obtained by the above method, a sufficiently effective correction effect often cannot be obtained for an image if a large difference exists between the image and the test image used in unevenness correction.

For example, when correction data is rewritten by using a halftone image 50% duty this data is effective for the unevenness correction effect in 50% halftone. However, this data may not be effective for halftone of 0 to 15% or 75 to 85% because the gradation characteristics of the recording head are not necessarily linear, as those shown in FIG. 6A. The effect obtained by correction shown in FIG. 6B is not always valid throughout the entire range of the input signal.

If an image forming apparatus includes an image reading apparatus, converts an original image into an electrical signal, and performs image recording in accordance with the electrical signal, the original image reading apparatus can be conveniently used as a reading unit for the uneven image density of a test image without any modifications.

In an image forming apparatus having such an image reading apparatus, and particularly, an apparatus capable of reading or forming a color image, the reading apparatus outputs red (R), green (G), and blue (BL) signals. In this case, it is possible to read all color patterns.

Unevenness is a delicate phenomenon, and it is preferable to read each test image with high precision. In a normal copying mode, i.e., in a mode for reading an original image and copying the read image by a recording head, it is preferable not to sacrifice color reproducibility.

Another uneven image density reading head 506 used in the above method is shown in FIG. 7. This head comprises a lamp 502, a photo-diode 503, and lenses 504 and 505. The head can read an unevenness measurement pattern printed on recording sheet 501.

Light from the lamp 502 is collimated by the lens 504, and the collimated light is incident on an unevenness measurement pattern on the recording sheet 501. Light reflected by the recording sheet 501 is incident on the photo-diode 503 through the lens 505 and an aperture 507 having an opening of size $d_0$. At this time, light incident on the photo-diode 503 falls within the range of $d_1$ on the unevenness measurement pattern, so that an average value of the unevenness pattern within the range of $d_1$ is detected. When unevenness correction data is rewritten on the basis of this detection result, a uniform image can always be obtained.

Still another uneven image density reading method will be described with reference to FIG. 8. A recording sheet and a CCD are denoted by reference numerals 520 and 521. An unevenness correction pattern printed by a multi-element head having a total width d of recording elements in the y direction. In this case, the number of recording elements in the multi-element head is 256, and the number of read pixels of the CCD is also 256. The density of a pattern printed with the multi-element head is read while the CCD is scanned in the direction of arrow 525.

Data read by the pixels of the CCD correspond to densities of the respective recording elements of the multi-element head, respectively.

When unevenness correction data are formed directly using the pixel data, an image contains a large number of noise components for the following reason.

Assume that dots D are formed in an uneven image density correction pattern in FIG. 9. The dot sizes are uneven in the x direction because diameters of dots recorded by one recording element of the multi-element head are changed. Density measurement results vary greatly depending on measurement timings. The dots are not equidistantly arranged in the y direction because dot recording position precision varies in the y direction. At this time, when a measurement is performed, a density corresponding to a reading element 521b is high, and a density corresponding to a reading element 521c is low.

For this reason, the read data of a predetermined area in the x and y directions are averaged, and the average value serves as data of the central reading pixel of this area. Unevenness correction is performed on the basis of the data obtained as described above, and a uniform image can always be obtained.

However, when an aperture size is fixed, as shown in FIG. 7, or when the size of the data averaging area is fixed, as shown in FIG. 8, the following drawback is present.

The aperture size and the size of the data averaging area are important factors in unevenness reading. When the size of the data averaging area is excessively large, a complicated unevenness pattern cannot be read. In this case, it is difficult to correct fine unevenness having a short period. To the contrary, when the data averaging area is too large, noise in a read pattern is extracted, and stable unevenness correction cannot be performed. Therefore satisfactory uniform image cannot be obtained by a single unevenness correction cycle. In order to obtain a satisfactory image, read and unevenness correction must be repeated a plurality of times.

For this reason, the aperture size and the size of the data averaging area must be set to optimal values. However, these optimal values change in accordance with print conditions. Assume that a large image is output and used for a poster or the like. In this case, since the poster is not observed from a position close to it, fine unevenness is not so conspicuous, so that correction of an uneven image density having a long period is the primary concern. In this sense, the aperture size and the size of the data averaging area are preferably large. On the other hand, in the case of a small image which is observed close at hand, elimination of fine unevenness becomes the primary concern. In this case, it is preferable to reduce the aperture size and the size of the data averaging area.

In this manner, an optimal aperture size and an optimal size of a data averaging area vary depending on output images.

Optimal values also change depending on time required for forming unevenness correction data.

In the market, servicemen often replace an old head with a new one. At this time, he forms unevenness correction data. In this case, it is better to the time to perform high-precision unevenness correction, and the aperture size and the size of the data averaging area are preferably set to be small.

When an ordinary user performs unevenness correction during use, unevenness correction of a given level or more can be performed within a short period of time by setting the aperture size and the size of the data averaging area to be large.

These optimal values are also changed depending on the number of head-use times.

When a new head is used immediately after its replacement, print position precision of each dot is relatively good. Read noise caused by variations in print position precision, shown in FIG. 9, is small. The aperture size and the size of the data averaging area can be small. In an old head, however, since print position precision of each dot has degraded, the aperture size and the size of the averaging area are preferably set to be large.

Optimal values of the aperture size and the size of the data averaging area vary depending on various conditions. Fixed values for the size of the aperture and data averaging area cannot cope with various conditions.

A read speed and a focus state of a read optical system are used as factors having the same effects as the aperture size and the size of the data averaging area.

When the read speed is high, fine unevenness tends not to be read. However, when the read speed is low, high-precision reading can be performed, although noise in a pattern tends to be picked up.

Fine unevenness tends not to be read when a defocus state is set. However, when an in-focus state is set, noise in the pattern tends to be picked up.

When predetermined read conditions are set, it is difficult to perform optimal reading.

Types of unevenness correction patterns, and a method of calculating unevenness correction data in addition to the various read conditions are often preferably changed depending whether fine unevenness correction requiring a long period of time, or coarse unevenness correction requiring a short period of time is appropriate. For example, precision can be improved by correcting a plurality of patterns instead of correcting one type of pattern because a calculation method suitable for a specific purpose must be used. When there is only one method of calculating unevenness correction patterns, optimal unevenness correction data suitable for various conditions cannot be formed.

SUMMARY OF THE INVENTION

It is an object of the present invention to eliminate the conventional drawbacks described above and to provide an image recording apparatus free from variations in recorded images which are caused by variations in recording characteristics of recording elements constituting an array.

It is another object of the present invention to provide an image forming apparatus for making different densities in the entire range of input uniform and, particularly, to provide an image forming apparatus capable of performing printing at an accurate image density for target recording images whose image densities vary in a wide range.

It is still another object of the present invention to provide an image forming apparatus having high color reproducibility and capable of reading a test image having any color with sufficiently high precision.

It is still another object of the present invention to provide an image recording apparatus capable of always performing optimal image reading and forming unevenness correction data.

In order to achieve the above objects according to an aspect of the present invention, there is provided an image recording apparatus for performing image recording on a recording medium by using plural types of recording heads each having a plurality of recording elements constituting an array, comprising:

test pattern forming means for forming test patterns on the recording medium by using the plural types of recording heads;

reading means for reading the test patterns recorded by the test pattern recording means; and correcting means for correcting drive signals for driving the recording elements in correspondence with the recording elements and types of the recording heads on the basis of data read by the reading means.

In order to achieve the above objects according to another aspect of the present invention, there is provided an image forming apparatus comprising:

a recording head having a plurality of recording elements for forming an image on a recording medium, the plurality of recording elements constituting an array;

test pattern formation control means for causing the recording head to form plural types of test patterns having different densities;

density reading means for reading densities of the plural types of test patterns; and uneven image density correcting means for forming, on the basis of a reading result of the plural types of test patterns, correction data for uniforming image formation densities for the densities read by the density reading means and for correcting drive conditions of the plurality of recording elements on the basis of the correction data.

In order to achieve the above objects according to still another aspect of the present invention, there is provided an image forming apparatus comprising:

a recording head having a plurality of recording elements for forming an image on a recording medium, the plurality of recording elements constituting an array;

means for relatively moving the recording head and the recording medium, giving different drive conditions to the plurality of recording elements upon relative movement between the recording head and the recording medium, and forming test patterns having areas of different densities in a relative movement direction;

reading means for reading densities of the test patterns in units of density areas; and uneven image density correcting means for correcting drive conditions of the plurality of recording elements at the time of image formation so as to uniform image formation densities on the basis of a reading result of the reading means.

In order to achieve the above objects according to still another aspect of the present invention, there is provided an image forming apparatus for performing recording on a recording medium by using a recording head having a plurality of recording elements constituting an array, comprising:

reading means for reading an image and outputting color signals corresponding to the image;

color correction processing means for performing color correction processing of the output from the reading means;

test pattern forming means for forming predetermined test patterns by the recording head;

correcting means for causing the reading means to read the predetermined test patterns formed by the test pattern forming means, obtaining correction data from the color signals color-corrected by the color correction processing means, and correcting image formation drive conditions of the plurality of recording elements on the basis of the correction data; and color correction control means for causing the color correction processing means to perform different color correction processing operations in a test pattern reading mode and a normal original image reading mode.

In order to achieve the above objects according to still another aspect of the present invention, there is provided an image forming apparatus for performing recording using a plurality of recording elements constituting an array, comprising:

test pattern forming means for forming test patterns on a recording medium by using a recording head;

reading means for optically reading densities of the test patterns recorded on the recording medium by the test pattern forming means in accordance with predetermined reading conditions;

means for calculating correction data on the basis of the densities read by the reading means;

image signal correcting means for correcting an image signal applied to the recording elements on the basis of the correction data calculated by the calculating means; and control means for setting variable one of a formation condition of the test pattern forming means, a reading condition of the reading means, and a method of calculating the correction data by the calculating means.

BRIEF DESCRIPTION OF THE DRAWINGS

FIGS. 5A, 5B, 5C, 6A and 6B are views for explaining an uneven image density correction algorithm;

FIGS. 19A and 19B are side views showing a line printer type ink-jet recording apparatus according to the sixth embodiment of the present invention;

FIG. 20 is a perspective view showing an arrangement of a reading unit and its scanning mechanism shown in FIGS. 19A and 19B;

FIG. 44 is a block diagram showing an arrangement for correcting an output magnitude difference caused by colors of unevenness reading sensors;

DETAILED DESCRIPTION OF THE PREFERRED EMBODIMENTS

Preferred embodiments of the present invention will be described in detail with reference to the accompanying drawings.

Figure 1A:
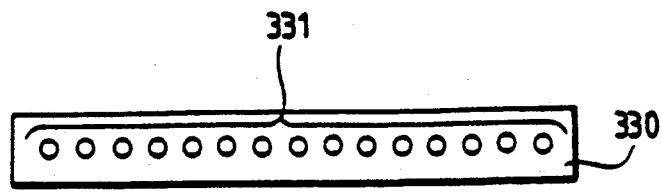
FIGS. 1A, 1B, 1C, 1D and 1E are views for explaining an uneven image density correction mode in a multi-nozzle head.
Figure 1B:
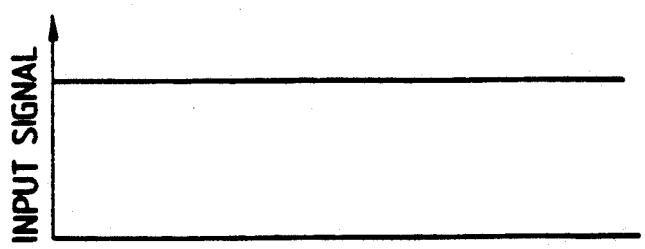
Figure 1C:
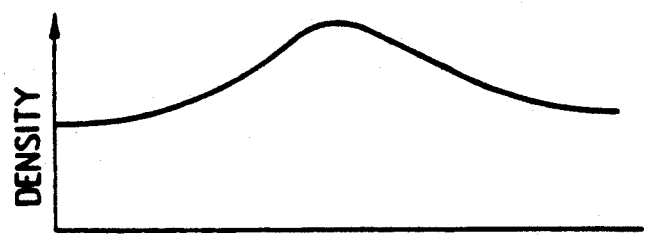
Figure 1D:
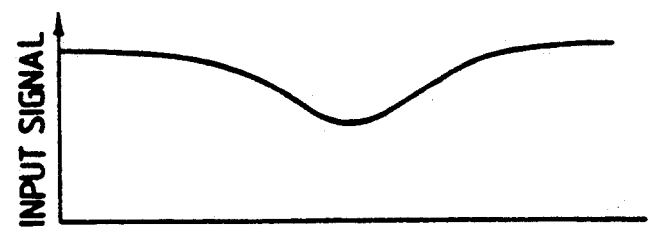
Figure 1E:
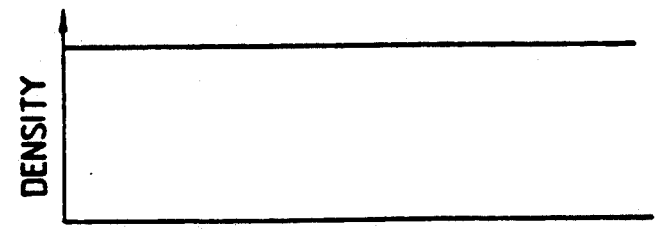
Figure 2:
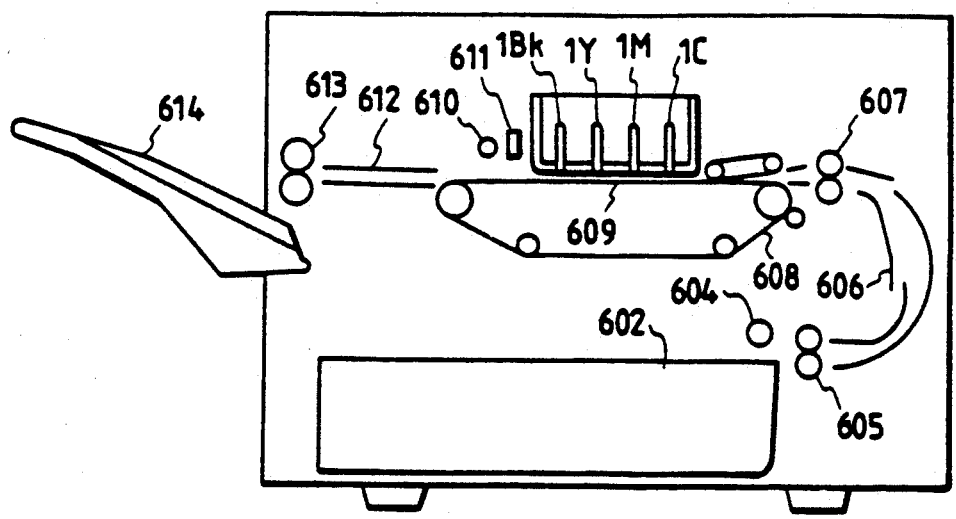
FIG. 2 is a schematic sectional view showing a conventional ink-jet recording apparatus.
Figure 3:
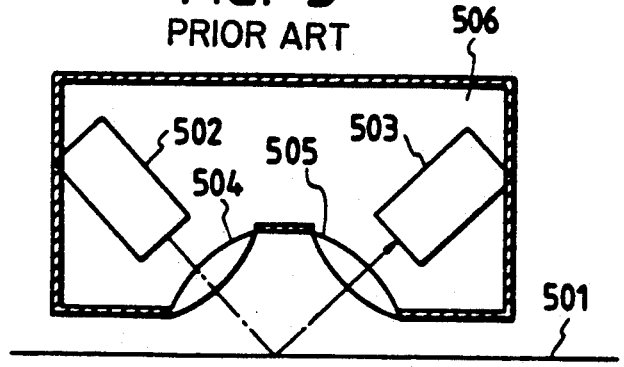
FIGS. 3, 4, 7, 8, and 9 are views for explaining a reading unit for performing uneven image density correction.
Figure 4:
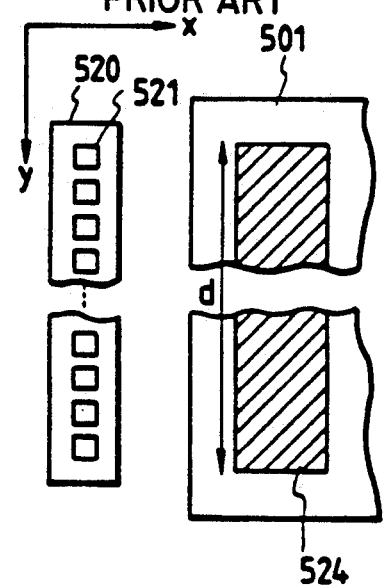
Figure 6A:
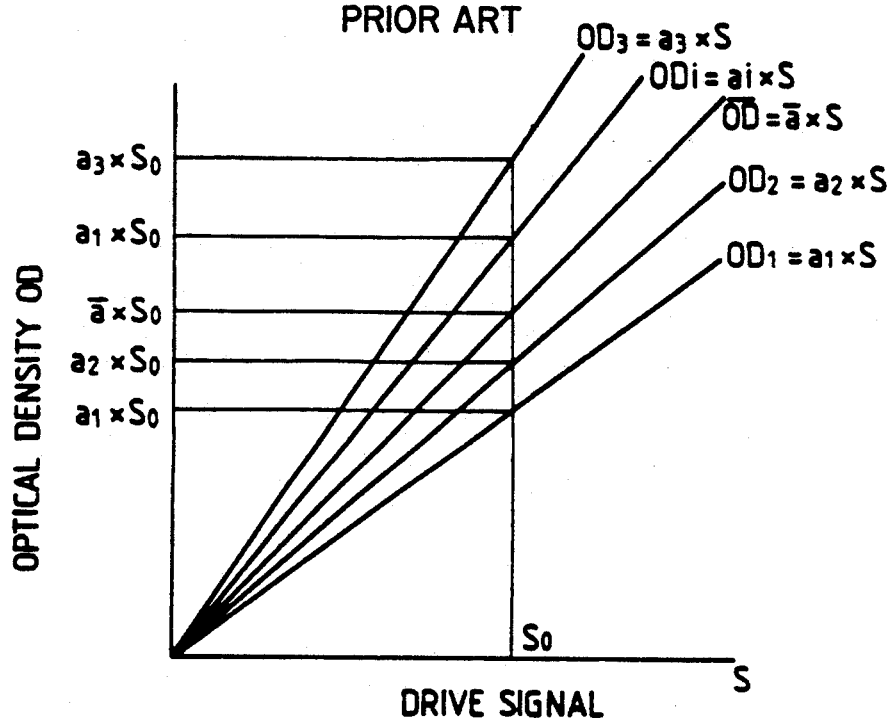
Figure 6B:
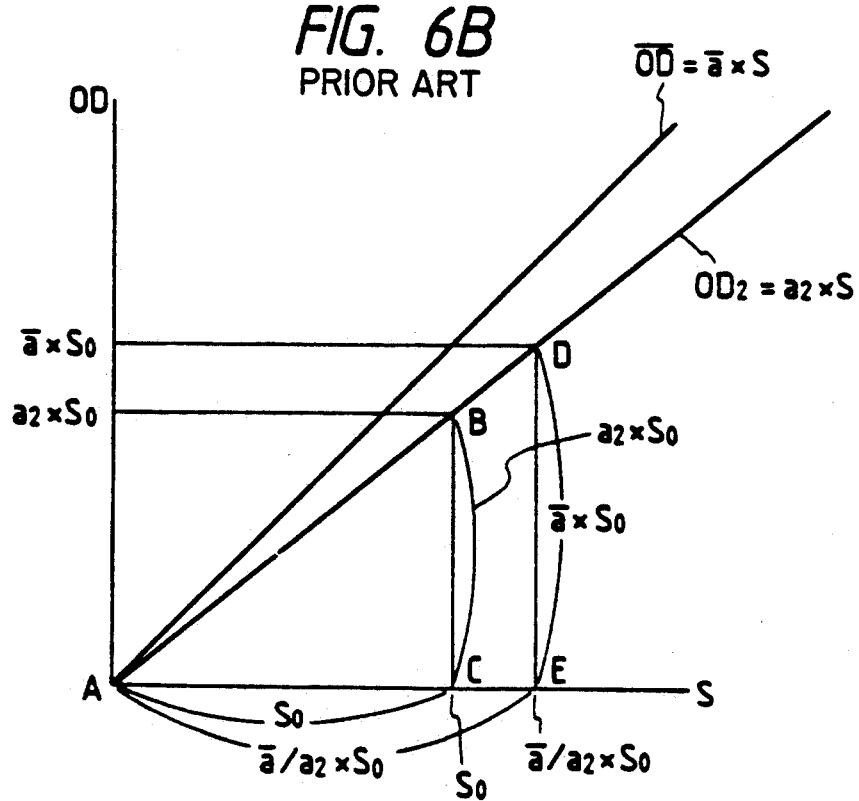
Figure 7:
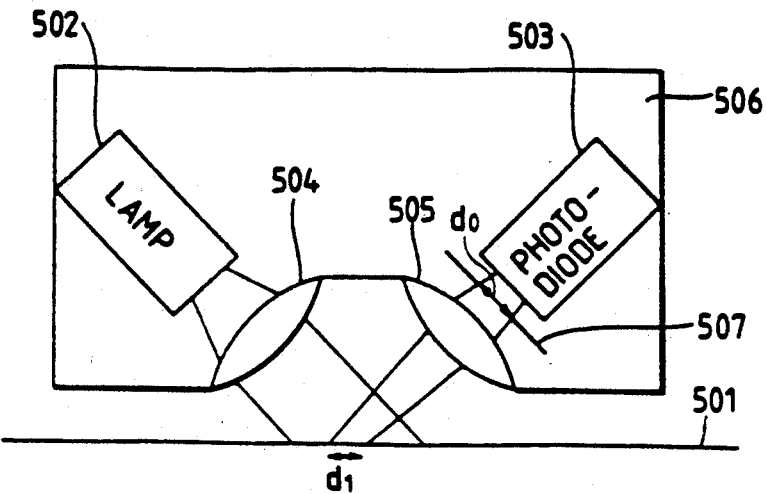

An uneven image density correction sequence of the first embodiment of the present invention will be described with reference to the block diagram of FIG. 10. In this embodiment, a color image recording apparatus (FIG. 2) having four recording heads, i.e., cyan, magenta, yellow, and black recording heads is described. The same effect as in the color image recording apparatus can be obtained in a monochromatic image recording apparatus having a light black ink head and a dark black ink head.

Figure 11:
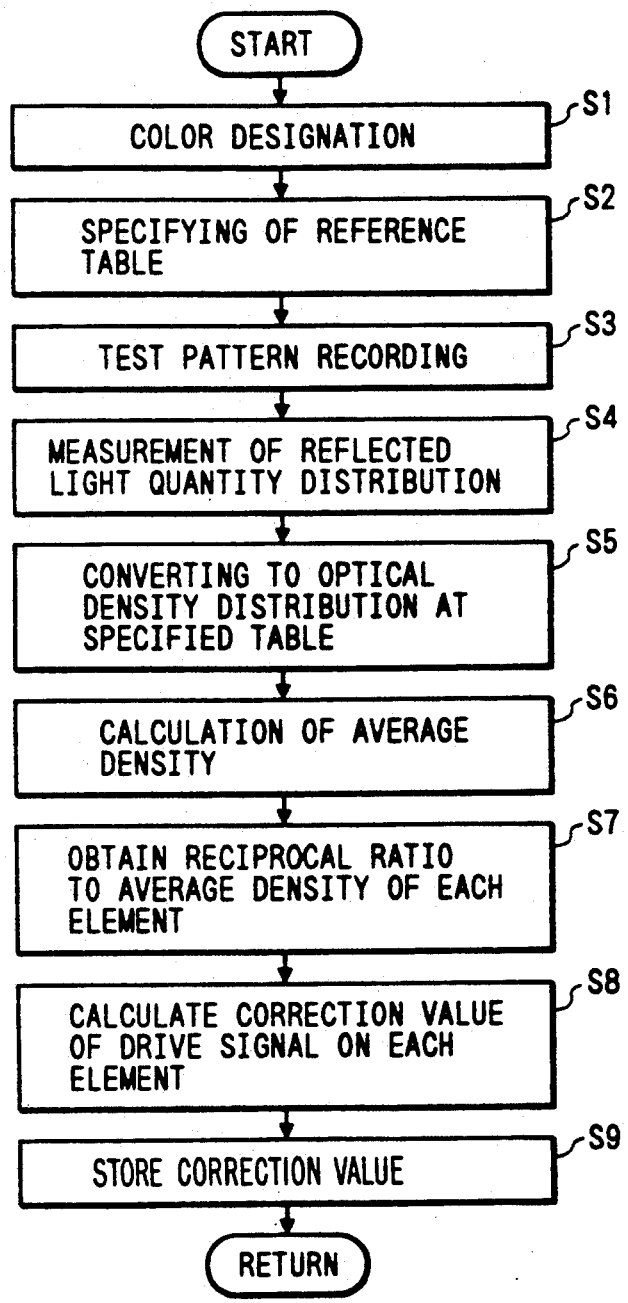
FIG. 11 is a flow chart showing a correction sequence of the first embodiment.

FIG. 11 is a flow chart showing a correction sequence of this embodiment.

Uneven image density correction is started upon depression of an uneven image density correction head designation key of a corrected-head designation unit 91 for designating a color of a head subjected to uneven image density correction (step S1). A signal is output to a light quantity to density conversion unit 93 so that, of all the cyan, magenta, yellow, and black look-up tables (FIG. 12) retained and stored in the light quantity to density conversion unit 93, a designated color look-up table is selected in response to a designation signal from the corrected-head designation unit 91 (step S2).

When the corrected-head designation unit 91 designates a head having a color subjected to uneven image density correction, a pattern for driving all recording elements of the recording head in response to the same drive signal is generated by a pattern generator (not shown), and the head subjected to uneven image density correction is used to record a test pattern (step S3). A test pattern reading system 94 emits light onto this test pattern and receives light reflected by the test pattern. The test pattern reading system 94 outputs a signal proportional to the reception light quantity to an A/D conversion unit 97, and the signal is converted into digital data by the A/D conversion unit 97 and the digital signal is output to the light quantity to density conversion unit 93 (step S4). The light quantity to density conversion unit 93 converts the signal proportional to the light quantity into a signal proportional to the density by using the look-up table of the designated color (step S5). The look-up table shown in FIG. 12 converts an 8-bit light quantity signal into an 8-bit density signal.

A method of forming this look-up table will be briefly described with reference to FIG. 13.

Figure 12:
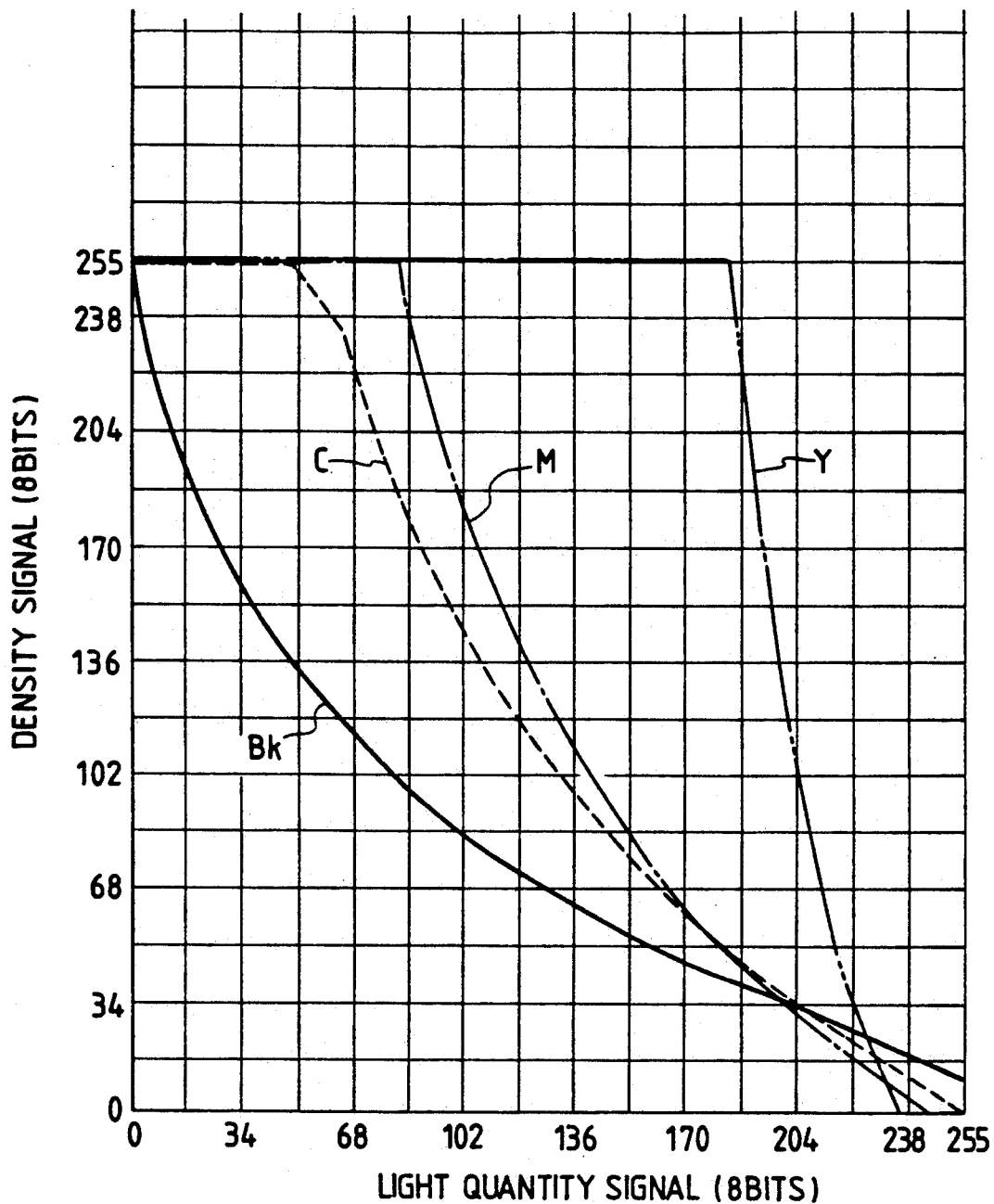
FIGS. 12 and 13 are graphs for explaining a look-up table of a light quantity to density conversion unit.

Cyan, magenta, yellow, and black gradation patterns are recorded. By using a density measuring unit for measuring a degree of density recognition close to that of a human eye (this may be a conventional density measuring unit; in general, cyan, magenta, and yellow color filters), densities of gradation levels of the respective color components, i.e., cyan, magenta, yellow, and black are measured. The gradation patterns are read by the test pattern reading system 94 to measure quantities of reflected light. FIG. 13 is a graph obtained by plotting the densities along the abscissa and the quantities of reflected light along the ordinate (provided that the quantities of reflected light are A/D-converted values). A look-up table shown in FIG. 12 is obtained by reversing the ordinate and the abscissa of FIG. 13. This look-up table is used to obtain a density signal proportional to the light quantity.

The light quantity to density conversion is performed by the light quantity to density conversion unit 93 by using this look-up table. The correction value described with reference to the prior art is calculated by a correction value calculation unit 95 (steps S6 to S8). Correction values calculated in units of recording elements or every several recording elements by a recording element drive signal correction unit 96 are stored in a correction value storage unit 96a (step S9). An input image signal is corrected by these correction values, and the corrected image signal components drive the recording elements. By driving the recording elements as described above, an uneven image density can be corrected with high precision to obtain a good image free from the uneven image density regardless of a relationship between colors of heads for performing uneven image density correction.

The second embodiment of the present invention will be described below.

In the first embodiment, a head subjected to uneven image density correction is designated. The second embodiment eliminates such a designation operation.

Figure 14:
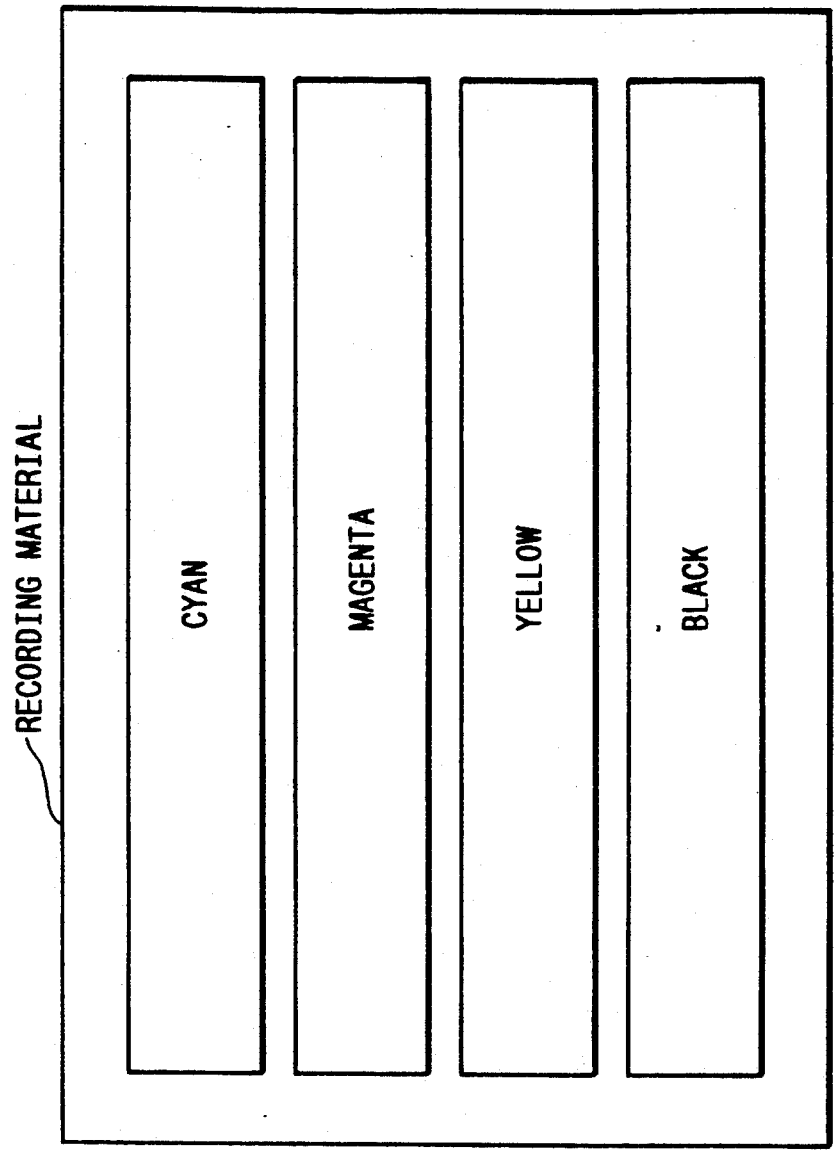
FIG. 14 is a view showing a test pattern of the second embodiment.

In the second embodiment, uneven image density correction is performed every predetermined number of recording sheets (i.e., the number of recording sheets is counted by a counter; when a count of the counter reaches a predetermined value, uneven image density correction is automatically started). Test patterns to be recorded are identical to those in the previous embodiment. However, as shown in FIG. 14, cyan, magenta, yellow, and black patterns are recorded on a single recording material. A test pattern reading system 94 reads patterns in the following order cyan, magenta, yellow, and black patterns. In synchronism with this, an indication unit 92 for change of conversion parameter outputs a conversion table change signal to a light quantity to density conversion unit 93. The light quantity to density conversion unit 93 performs light quantity to density conversion by using the look-up tables of the respective color components. The same effect as in the first embodiment can be obtained by the above sequence without designating a head subjected to uneven image density correction.

It is apparent that the second embodiment can also be applied to a recording apparatus other than an ink-jet recording apparatus. When the correction values are to be calculated from read signals from the test pattern reading means, conversion parameters used in the light quantity to density conversion are changed with accordance in units of colors. However, any other arithmetic method may be changed in accordance with colors.

As described above, according to this embodiment, since light quantity to density conversion can be accurately performed regardless of differences in the recording colors of a plurality of recording heads. Correction of an uneven image density can be accurately performed for a recording head of any color, thereby outputting a good image free of uneven image density.

The third embodiment of the present invention will be described below. In the first and second embodiments described above, the conversion parameters of light quantity to density conversion are changed. However, in the third embodiment, conversion reference values of A/D conversion are changed in the third embodiment.

Figure 15:
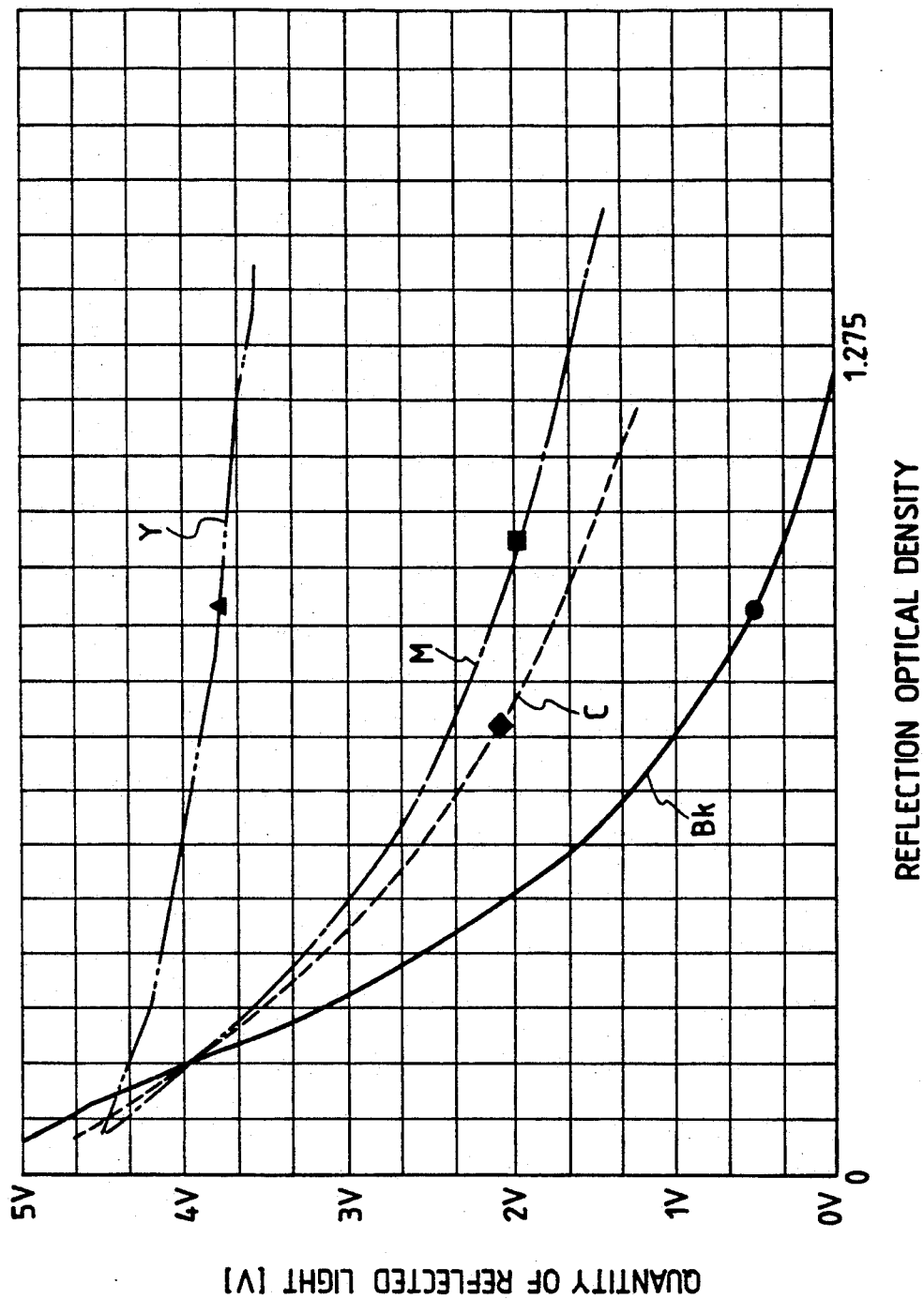
FIGS. 15 and 16 are graphs for explaining the third embodiment.

FIG. 15 shows analog data read by the test pattern reading system after a gradation pattern is recorded by each of the cyan, magenta, yellow, and black ink-jet heads. Reflection optical densities of gradation levels of each gradation pattern are represented by OD values measured by a density measuring unit having a degree of density recognition close to that of a human eye (i.e., this measuring unit is a conventional density measuring unit; cyan, magenta, and yellow color filters are used). Electrical analog signal values (more specifically, these values are values amplified by an amplifier) proportional to light reflected by each pattern and received by a test pattern reading system are plotted along the ordinate.

An appropriate recording duty of a test pattern recorded for the uneven image density correction is generally about 50% according to studies by present inventors. An electrical analog signal value proportion to the quantity of light reflected from each test pattern of a 50% duty is about 0.5 V for black, about 2 V for cyan and magenta, and about 4 V for yellow (represented by ●, ■ and the like in FIG. 15). When this analog data is to be converted into digital data, e.g., when the analog data is converted into 8-bit digital data on the basis of a predetermined reference value without regard to difference in colors, the results shown in FIG. 13 are obtained in the previous embodiment.

Figure 13:
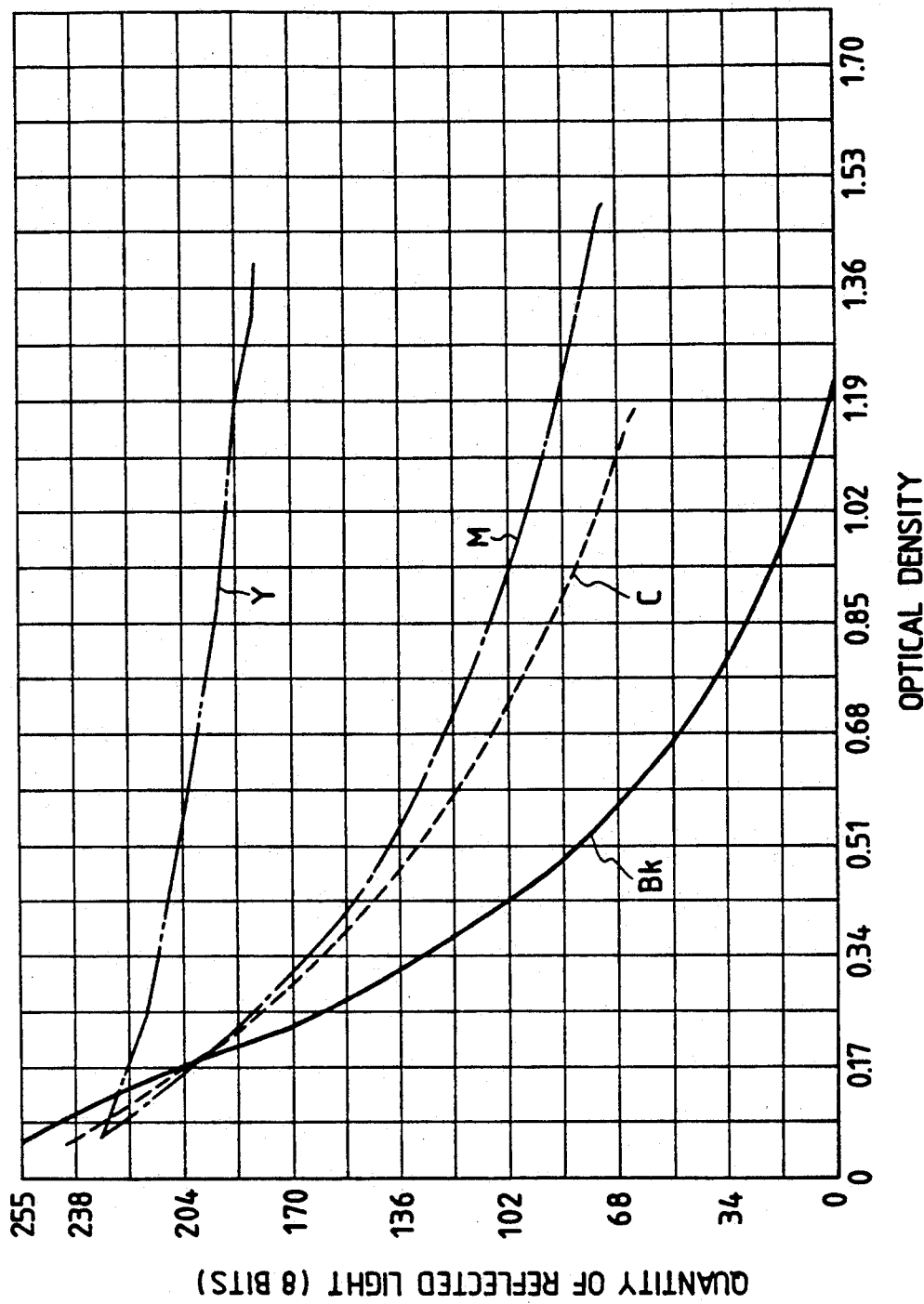

A resolution for the density is high when a gradient of a curve in FIG. 13 is increased because a difference in output voltages with respect to a density difference is increased. When a gradient of a curve in FIG. 13 is small, a difference between output values is small even if a small density difference is present. In this case, an uneven image density caused by a small density difference cannot be read, and uneven image density correction precision is not high. When the A/D conversion reference value is a predetermined value, correction precision of yellow, magenta, and cyan components are degraded.

Figure 10:
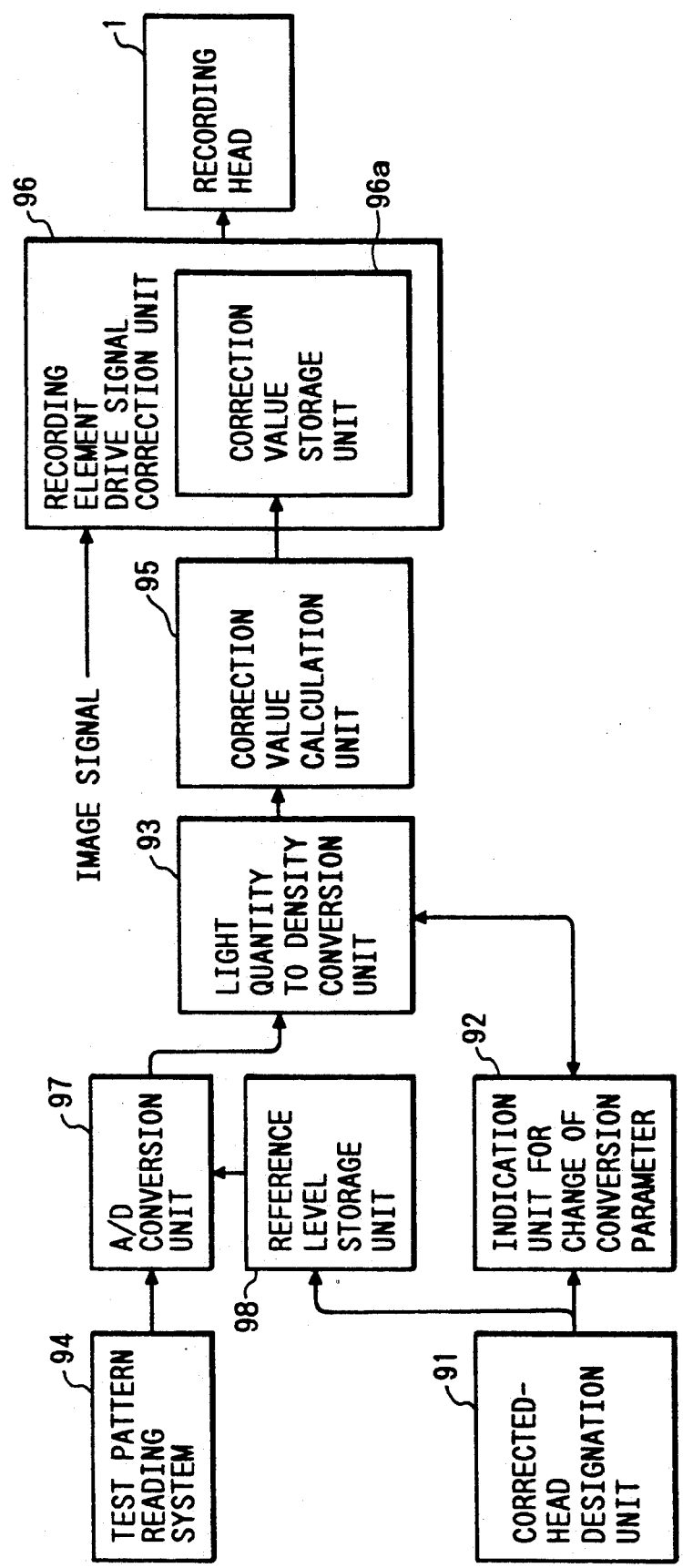
FIG. 10 is a block diagram showing an arrangement according to the first embodiment of the present invention.
Figure 16:
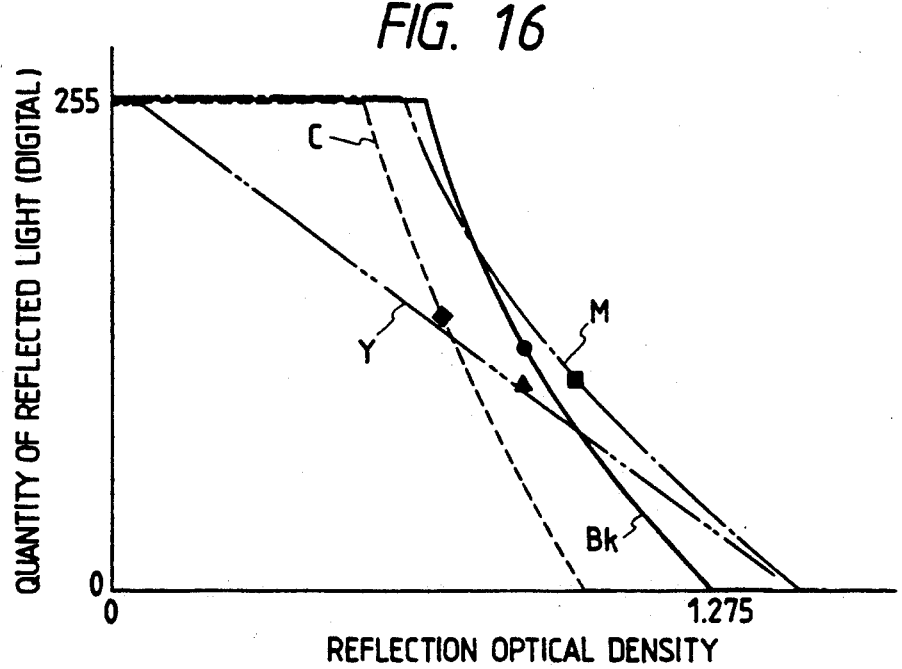

As shown in FIG. 10, value in a reference level storage unit 98 are changed in correspondence with designation by a corrected-head designation unit 91, so that the A/D conversion reference values are changed in units of recording heads (i.e., in units of colors). FIG. 16 shows a graph similar to that of FIG. 13 where levels "0" and "255" of black are set to 0 V and 1 V, respectively, levels "0" and "255" of each of cyan and magenta are set to 1.5 V and 2.5 V, and levels "0" and "255" of yellow are set to 3.5 V and 4.5 V, respectively. As is apparent from this graph, the A/D conversion reference value is changed in units of colors to increase the density resolutions of the respective colors and actually improve uneven image density correction precision.

A monochromatic ink-jet recording apparatus according to the fourth embodiment of the present invention will be described below. An ink-jet recording apparatus for improving image texture is proposed as a binary recording type ink-jet recording apparatus using two ink-jet heads, i.e., a light black ink head and a dark black ink head. In such an ink-jet recording apparatus, when an uneven image density is to be corrected, an optical density of a test pattern recorded at a 50% duty varies depending on the respective recording heads. Analog output values read by the test pattern reading system are different between the light black ink head and the dark black ink head.

It is very effective to change the analog values serving as A/D conversion reference values in units of recording heads as in the previous embodiment. In practice, the uneven image density correction was greatly improved.

The fifth embodiment of the present invention will be described below. In each embodiment described above, so-called shading correction for correcting changes in light quantity of a light source and changes in output characteristics of an optical sensor is not performed. In the fifth embodiment, densities of a standard white plate and a standard black plate are read to perform this shading correction.

Figure 17:
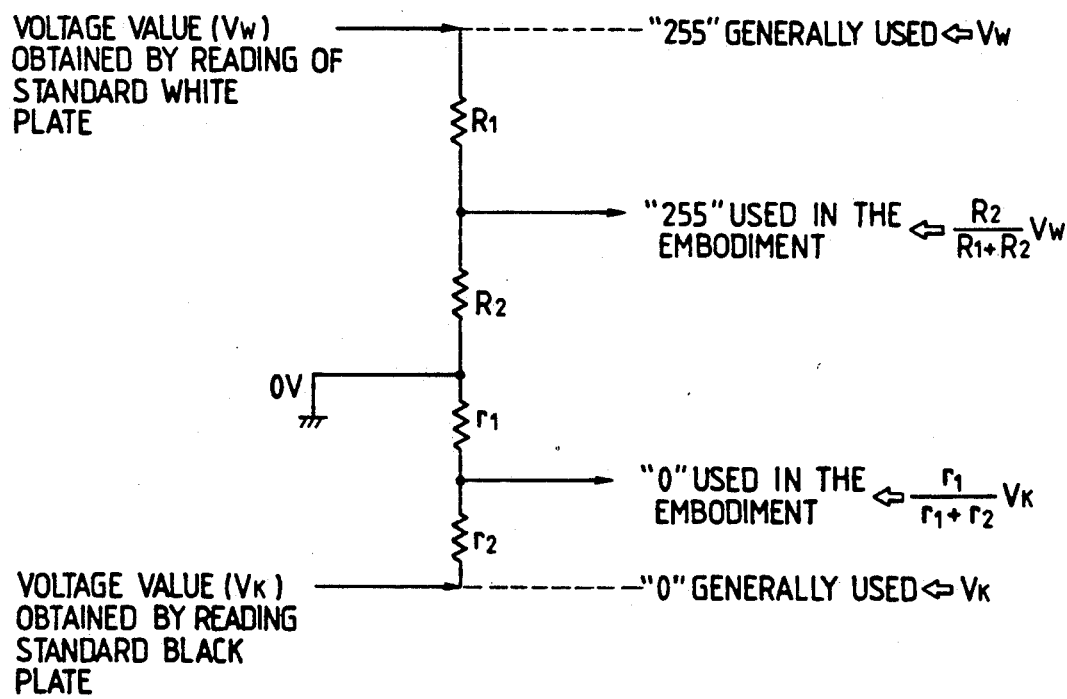
FIG. 17 is a diagram of an A/D conversion reference voltage transforming circuit according to the fifth embodiment of the present invention.

At the time of shading correction, in general, an analog output value obtained by reading the density of the standard white plate by the test pattern reading system is given as "255", and an analog output value obtained by reading the density of the standard black plate by the test pattern reading system is given as "0", thereby performing A/D conversion. At this time, two voltage values are converted by an electrical circuit, shown in FIG. 17, and the converted voltage values are used as A/D conversion reference values. Therefore, the same effect as in each embodiment described above is obtained by changing an analog value serving as an A/D conversion reference value between different recording heads.

With the above arrangement, the same effect as in each embodiment described above can be obtained in a system for performing shading correction for correcting noise such as a change in light quantity of a light source.

As described above, according to this embodiment, an analog value serving as an A/D conversion reference is set variably in each recording head for recording a test pattern, and optimal values are set for all the test patterns recorded by the corresponding recording heads. Resolutions for ink densities can be increased, and readable density difference values are reduced, thereby improving uneven image density correction precision.

According to the present invention, there is provided an image recording apparatus wherein recorded image variations caused by variations in recording characteristics of recording elements constituting an array are improved in the respective ink recording heads.

The sixth embodiment of the present invention will be described in detail with reference to the accompanying drawings in the following order.

(1) General Description (FIG. 18)
(2) Mechanical Structure of Apparatus (FIGS. 19A and 19B)
(3) Reading System (FIGS. 20 to 32C)
(4) Control System (FIGS. 33 to 35)
(5) Unevenness Correction Sequence (FIGS. 36 to 45B)

(1) General Description

Figure 18:
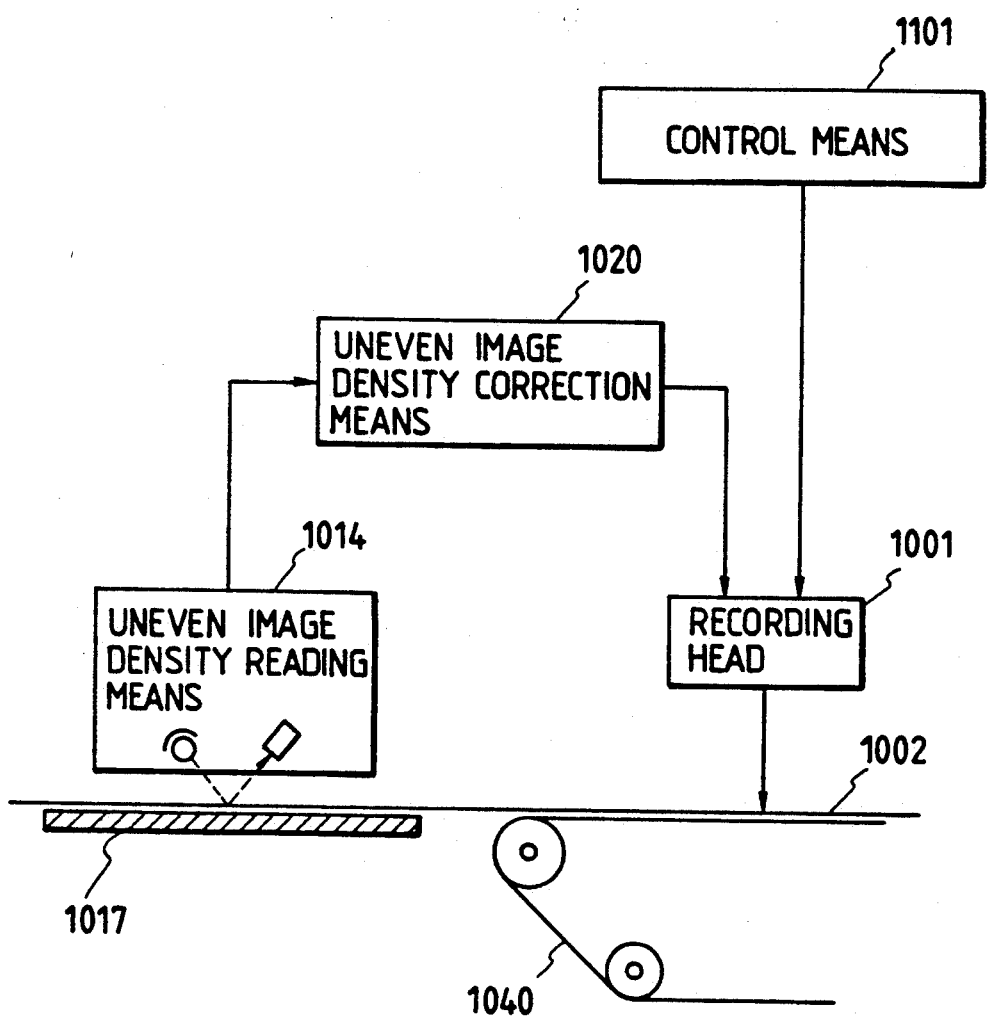
FIG. 18 is a diagram for explaining the principle of the sixth embodiment of the present invention.

FIG. 18 is a schematic view showing the main part of the sixth embodiment. One or a plurality of recording heads 1001 are arranged in accordance with the form of an image forming apparatus. Each recording head 1001 is a so-called full multi-type ink-jet recording head in which a plurality of orifices are aligned in a range corresponding to the width of a recording medium 1002. A convey means 1040 conveys the recording medium 1002 to a recording position of the recording head 1001.

An uneven image density reading means 1014 causes the recording head 1001 to read a test pattern formed on the recording medium 1002. The uneven image density reading means 1014 includes a light source for illuminating the surface of the recording medium, a sensor for receiving light reflected by the surface of the recording medium, and an appropriate converter. An uneven image density correction means 1020 corrects a recording head drive condition in accordance with the uneven image density read from the test pattern. A platen 1017 ensures the recording medium is flat at the test pattern read position. A control means 1101 forms a plurality of patterns having different densities.

In this embodiment, the plurality of test patterns having different densities are read to obtain correction data, respectively, and these correction data are averaged to obtain final correction data, thereby performing optimal correction regardless of densities.

(2) General Description of Mechanical Structure of Apparatus

FIG. 19A shows a general structure of an ink-jet recording apparatus according to this embodiment of the present invention.

Recording heads 1C, 1M, 1Y, and 1BK correspond to cyan, magenta, yellow, and black inks, respectively. Each head is a full-line head having orifices at a density of 400 dpi (dots per inch) in a range corresponding to the width of the recording medium convey direction, e.g., the length of a short side of an A3 size recording medium. A head holder 3 holds the recording heads 1C to 1BK and can be moved in the A direction toward the recording position and the B direction away from the recording position by means of a head holder moving mechanism 5. The head holder moving mechanism 5 includes a driving source such as a motor, a transmission mechanism for transmitting a driving force to the head holder 3, and a guide member for guiding the head holder 3. The head holder 3 is moved in the appropriate A or B direction to the recording position at which the recording medium opposes the orifices of the recording heads 1C to 1BK with a gap or in a retracted position for allowing reception of a cap unit (to be described later), or a position where each head is capped.

An ink supply/circulating system unit 7 includes supply paths for supplying color inks to the corresponding recording heads, circulating paths for performing ink refreshing, and an appropriate pump. At the time of injection recovery, the pump is driven to compress the ink supply path, thereby forcibly discharging the ink from each recording head.

A cap unit 9 opposes the recording heads 1C, 1M, 1Y, and 1BK can be brought into contact with them. The cap unit 9 includes caps 9C, 9M, 9Y, and 9BK made of an elastic material such as rubber, an absorbing member for absorbing an ink (waste ink) from the recording heads at the time of injection recovery and waste ink paths for receiving the waste inks to waste ink tanks (not shown). The cap unit 9 is moved by a cap unit moving mechanism 11. The cap unit moving mechanism 11 includes a motor, a transmission mechanism, and a guide member and moves the cap unit 9 in the C or D direction. Therefore, the cap unit 9 can be set to a position immediately below the head holder 3 when the head holder 3 is located at the retracted position, and a position wherein there is no interference with downward movement of the head holder 3.

At the time of injection recovery, the head unit 3 is moved upward in the B direction to a position where there is no interference with entrance of the cap unit 9. The cap unit 9 is inserted into the formed space, and the cap unit 9 is set at a position where the corresponding head opposes each cap. In this state, wherein the orifice formation portion of the recording head opposes the cap unit with a small gap upon downward movement of the head holder 3, or wherein the orifice formation portion of the recording head is in contact with the cap, a pump or the like of the ink supply/circulating unit, 7 is driven, the ink is forcibly discharged. At the same time injection defect factors such as dust, bubbles, and viscous ink are removed, thereby stabilizing the ink injection state during recording. The recording head may be driven as in the recording mode in the above state to inject an ink (i.e., preliminary injection), thereby eliminating injection defect factors. At the end of recording or upon its interruption, the heads may be capped to prevent the orifices from drying.

A cassette 38 stores recording media 2 such as OHP films. The recording media 2 stored in the cassette 38 are separated and fed one by one by a pickup roller 39 rotated in the F direction. A conveyor belt 40 conveys the fed recording medium 2 to the recording position of the recording heads 1C to 1BK in the E direction. The conveyor belt 40 is looped around rollers 41. In order to improve tight contact between the conveyor belt 40 and the recording medium and assure smooth conveyance of the recording medium, and at the same time to obtain an optimal distance (head gap) between the head and the recording medium, a means for performing electrostatic attraction or air suction, or a member such as a press roller for the recording medium may be provided.

The recording medium 2 is discharged by discharge rollers 42 upon completion of recording. A tray 43 stacks discharged recording media.

An uneven image density reading unit 14 is located between the recording position of the recording heads 1C to 1BK and the discharge rollers 42 so as to oppose a recording surface of the recording medium 2. The uneven image density reading unit 14 reads a pattern formed on the recording medium 2 during uneven image density correction. A mechanism 15 (to be described later with reference to FIG. 20) scans the reading unit 14. A driving unit 16 drives the respective convey members associated with the recording medium 2, i.e., the feed rollers 39, the rollers 41, and the discharge rollers 42.

At the time of uneven image density correction, a recording medium (a fixed size sheet in this embodiment) stored in the cassette 38 is fed out onto the conveyor belt 40 as in the normal recording mode upon rotation of the pickup roller 39 in the F direction. Upon rotation of the rollers 41, the recording medium 2 is conveyed together with the conveyor belt 40 in the E direction. At this time, each recording head is driven, and a test pattern is recorded on the recording medium 2.

Thereafter, the recording medium 2 to which this test pattern is recorded is conveyed to the uneven image density reading unit 14. The recorded test pattern is read by a reading sensor or the like, and then the recording medium is discharged onto the tray 43.

In this embodiment, since the fixed size sheet on which a test pattern is formed is used, an arrangement for feeding a sheet other than paper feed by using the cassette 38 (so-called manual paper feed) in favor of better operability may be employed.

FIG. 19B illustrates an ink system comprising a recording head (the recording heads 1C, 1M, 1Y, and 1BK are collectively illustrated) 1, and an ink supply/circulating system unit 7.

In the recording head, a common liquid chamber 1a is connected to an ink pipe connected to an ink source and communicates with each ink orifice 1b through a liquid path. An injection energy generation element such as an electricity-heat conversion element is arranged in each liquid path, and an ink is injected from an orifice upon energization of the corresponding injection energy generation element.

An ink tank 701 serves as an ink source and is connected to the common liquid chamber 1a in the recording head 1 through ink paths 703 and 705. A pump 707 is arranged midway along the ink path 703, and a valve 710 is arranged midway along the ink path 705.

When the ink system is arranged as described above, the operating state of the pump 707 and the open/closed state of the valve 710 are appropriately switched to set the ink system in each of the following modes.

① Print Mode

An ink necessary for recording is supplied from the ink tank 701 to the head 1. Since this embodiment exemplifies an on-demand ink-jet printer, ink is not pressurized during recording, and the pump 56 is not driven. The valve 701 is open.

In this mode, the ink is supplied to the head 1 through the ink path 705 upon injection of the ink from the head 1.

② Circulation Mode

This mode is set when ink is circulated to supply ink to each head in initial use of the apparatus or when a bubble in the head or supply path is removed and at the same time the ink is refreshed. This mode is used after the ink-jet printer is left unused for a long period of time.

In this mode, since the valve 710 is open and the pump 707 is operated, the ink is circulated to the ink tank 701 through the ink tank 701, the ink path 703, the head 1, and the ink path 705.

③ Pressure Mode

When an ink inside the orifices of the head 1 has an increased viscosity or clogging occurs in the orifices or the liquid paths, the ink is pressurized to forcibly inject the ink from the orifices 1b, thereby removing the ink.

In this mode, the valve 710 is open and the pump 707 is operated. The ink is supplied to the recording head 1 from the ink tank 701 through the ink path 703.

(3) Reading System

FIG. 20 shows the reading unit and its scanning mechanism according to this embodiment.

A flat recording medium guide portion serving as a platen (a portion denoted by reference numeral 17 in FIG. 19A) is disposed below a scanning portion of the reading head 60, the recording medium 2 is conveyed onto this guide portion, and an image formed on the recording medium is read by the reading head 60 at this position. The read position of the reading head 60 in FIG. 20 serves as the home position of the reading head 60. This home position is preferably a position laterally spaced apart from the recording medium convey range so reading members can get rid of attachment of water droplets caused by ink evaporation.

Referring to FIG. 20, the read head 60 is slid along a pair of guide rails 61 and 61' to read an image. The reading head 60 includes an original illumination light source 62, and a lens 63 for focusing an original image on a photoelectric conversion element group such as a CCD. A flexible cable 64 supplies power to the light source 62 and the photoelectric conversion elements and transmits image signals from the photoelectric conversion elements.

The reading head 60 is fixed to a driving force transmission portion 65, such as a wire, in a main scanning (G and H directions) direction perpendicular to the recording medium convey direction. The driving force transmission portion 65 in the main scanning direction is looped between pulleys 66 and 66' and is moved upon rotation of a main scanning pulse motor 67. Upon rotation of the pulse motor 67 in the I direction, the reading head 60 is moved in the G direction and reads line information of an image perpendicular to the main scanning G direction in units of bits corresponding to the photoelectric conversion element group.

When image reading is performed by a predetermined width, the main scanning pulse motor 67 is rotated in the reverse direction, and the reading head 60 is moved in the H direction to the initial or home position. Support members 68 and 68' are fixed to both ends of the pair of rails 61 and 61'.

When one main scanning cycle is to be performed for uneven image density reading, the reading operations are completed as described above. However, when uneven image densities of a plurality of colors are to be read or when reading of one color is repeated a plurality of times and an average value is to be obtained, after main scanning G of a given color or one main scanning cycle is completed, the recording medium 2 is conveyed by the conveyor belt 40 or the discharge rollers 42 in the E direction by a predetermined distance (FIG. 19A) (one pitch between adjacent color patterns or the same distance d as the read image width in one main scanning G cycle). The recording medium 2 is then stopped. In this state, main scanning G is repeated. This main scanning G operation, and the main scanning reverse H operation, movement of the recording medium (subscanning) are repeated to read the uneven image densities of different colors or of one color a plurality of times. In the above operation, the reading unit may be sub-scanned instead of conveying the recording medium 2. When the sensor is a full-line sensor, a mechanism associated with main scanning can be eliminated.

An image signal thus obtained is supplied to an image forming unit and is used for correcting drive conditions of the recording heads (to be described later).

In the present invention, elimination of the uneven image density during image formation indicates has at least one of the following effects. Image densities by liquid droplets from a plurality of orifices of the recording head can be made uniform by the corresponding recording head itself. Image densities in units of recording heads can be made uniform. A desired color can be obtained by mixing a plurality of ink colors, or a desired density can be obtained by mixing a plurality of ink colors. A plurality of these effects are preferably satisfied.

An unevenness correction means is preferably a means for automatically reading a standard print for obtaining a correction condition and automatically determining a correction condition. This means may include a fine adjustment unit or a manual adjustment unit operated by a user.

Correction conditions include optimal print conditions, a condition for adjusting a value to fall within a predetermined range including an allowable range, and a condition for a reference density changed in response to a desired condition. In fine adjustment all conditions associated with correction are included in the above correction conditions.

Uneven image density correction of a multi-element head having a recording element count N to converge print outputs from all elements into average density values will be described below.

Figure 21:
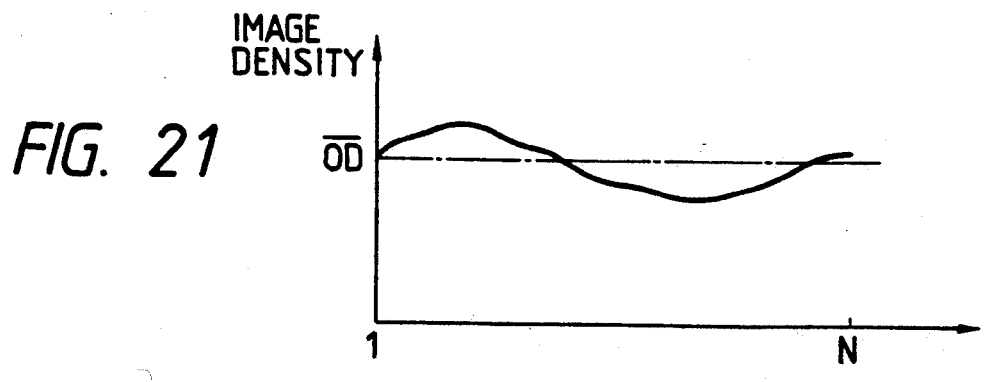
FIGS. 21, 22 and 23 are graphs for explaining a density correction mode in a multi-nozzle head.

Assume that a density distribution is obtained by driving and printing all the elements (1 to N) in accordance with a given uniform image signal S, as shown in FIG. 21. Partial densities $OD_1$ to $OD_N$ corresponding to all the recording elements are measured, and an average density as the correction target is obtained as follows:

$$\overline{OD} = \sum_{n=1}^{N} OD_n/N$$

This average density need not be obtained by simply averaging the densities of all recording elements. For example, quantities of reflected light may be integrated and the integral values are averaged to obtain an average value, or another known method may be used to obtain an average value.

Figure 22:
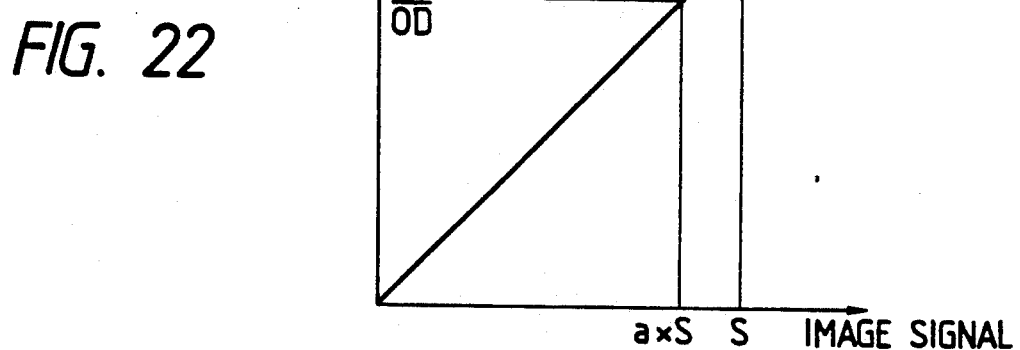
Figure 23:
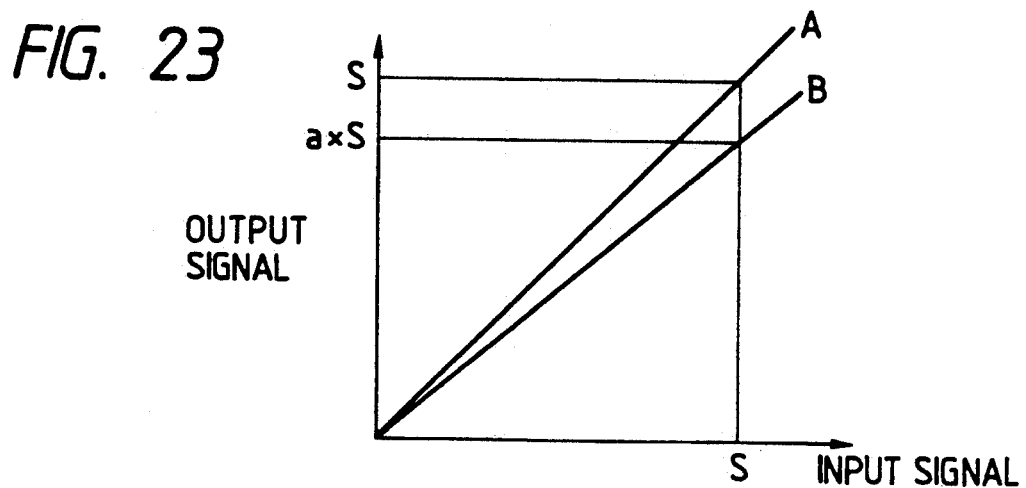

If a relationship between image signal values and an output density of a given element or a given element group is given as shown in FIG. 22, a signal actually supplied to this element or this element group is obtained by correcting the signal S to obtain a correction coefficient $\alpha$ for obtaining the target density $\overline{OD}$. A correction signal $\alpha \cdot S$ obtained by correcting the signal S to $\alpha \times S = (\overline{OD}/OD_n) \times S$ is supplied to the element n or the element group. More specifically, table conversion shown in FIG. 23 is performed for the input image signal in practice. Referring to FIG. 23, a straight line A is a line having a gradient of 1.0. This table is a table for performing no conversion of an input signal and directly outputting the input signal. A straight line B is a straight line having a gradient of $\alpha = \overline{OD}/OD_n$. This table is a table for converting the input signal S into an output signal $\alpha \cdot S$. The table representing the straight line B in FIG. 23 is used for the image signal corresponding to the nth recording element, and table conversion having a correction coefficient $\alpha_n$ is performed. Thereafter, when the head is driven, the densities of the portion recorded by the N recording elements are equal to $\overline{OD}$. This processing is performed for all the recording elements to correct the uneven image densities, thereby obtaining a uniform image. That is, when data corresponding to a given table conversion coefficient and an image signal of each recording element is obtained, unevenness correction can be performed.

The above correction for density comparison may be performed for each nozzle group (3 to 5 nozzles) to perform correction in accordance with approximation of unevenness correction.

Although the uneven image density can be corrected by the above method, unevenness in image density may occur due to a change in uneven image density state prior to correction or a time change in correction circuit. In order to cope with this situation, an input signal correction quantity must be changed since this is caused by the following drawbacks. When an ink-jet recording head is used for a long period of time, a precipitate from an ink may become attached to a portion near an orifice, or an external foreign substance is attached thereto, thereby changing the density distribution. This can also be expected by a density distribution change caused by heater degradation and a change in properties thereof in a thermal head. In this case, the initial input correction quantities set during the manufacture cannot sufficiently perform uneven image density correction. An uneven image density is gradually increased during long-term use, so that this problem must be solved.

Although a distance between the reading unit and the recording medium on which the test pattern is recorded varies depending on reading precision, it is preferable to obtain a predetermined distance. In order to hold the distance to a predetermined value, an arrangement shown in FIGS. 24 to 26 can be employed.

Figure 24:
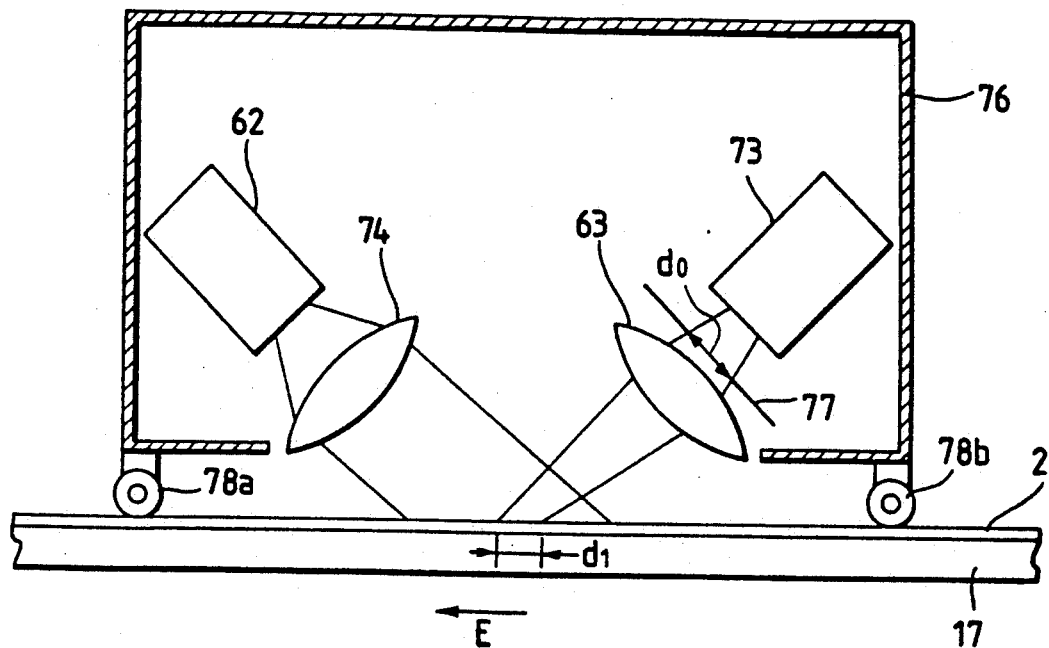
FIGS. 24, 25 and 26 are side views showing arrangements each for holding a distance between the reading unit and a recording medium.

FIG. 24 illustrates an arrangement for the above purpose. Press rollers 78a and 78b engaged with the recording medium 2 are mounted on a housing 76 for storing the reading unit 14 and the scanning mechanism 15 therein. Since these rollers 78a and 78b are rotated in the recording medium convey direction, no problem is posed in conveyance of the recording medium. This arrangement prevents floating of the recording medium 2, and the housing 76 is displaced in accordance with the recording medium 2, so that the distance between the reading unit 14 and the recording medium can be kept constant.

The arrangement in FIG. 24 includes a lens 74 for collimating light emitted from a light source 62, a sensor 73 having a photoelectric transducer element group, a lens 63 for focusing light reflected by the recording medium, and a filter 77 having an opening having an aperture diameter $d_0$. By the scanning mechanism shown in FIG. 23, the lenses, the sensor, the light source, the filter, and the like are scanned in the G and H directions (perpendicular to the plane in FIG. 24) within the housing 76.

The light reflected by the recording medium is incident on the sensor 73 through the lens 3 and the filter 77 having the aperture diameter $d_0$. This incident light is light falling within a range $d_1$ on the test pattern. Therefore, an average value obtained by averaging the uneven image densities within this range is detected. According to experiments of the present inventors, a good result was obtained when the aperture diameter was about 0.2 to 1 mm. When unevenness correction is performed on the basis of the detection result, a uniform image can be obtained.

When the reading unit including a lens, a sensor, and a light source is vertically displaceable in FIG. 20 with respect to the scanning mechanism 15, rollers serving as press members may be mounted on the reading unit itself. In this case, when each roller has a caster structure, conveyance of the recording medium and movement of the reading unit can be smoothly performed, when reading is performed while the recording medium is in motion, the scanning direction is inclined to read the recording medium with a small load.

Figure 25:
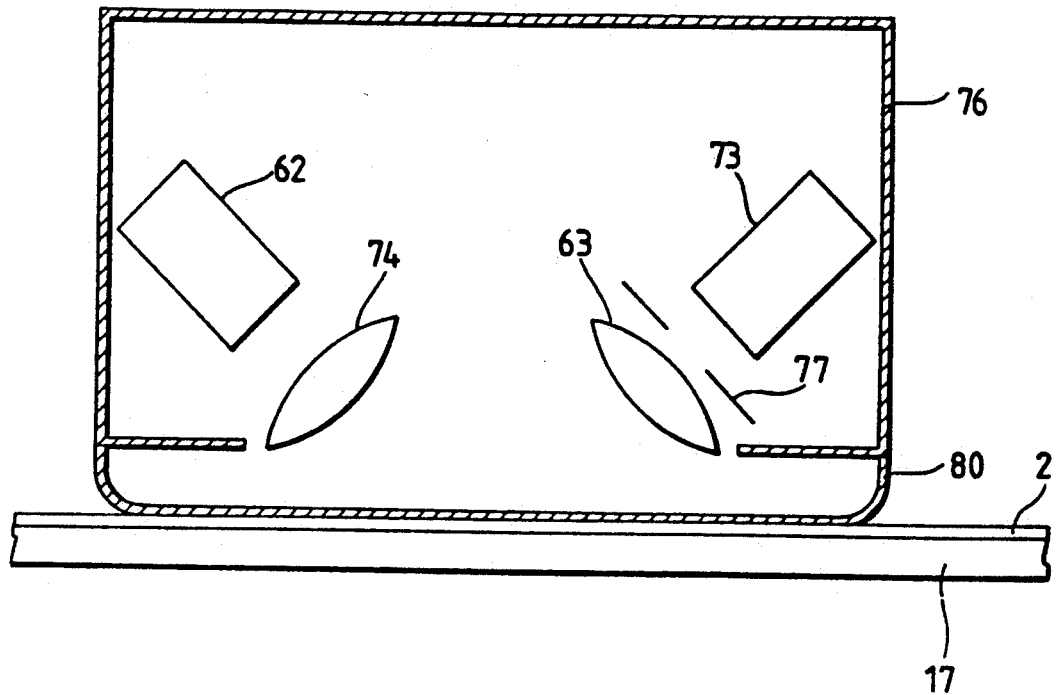

FIG. 25 shows another arrangement for keeping a distance between the reading unit and the recording medium constant. In this structure, a press member 80 made of a transparent plastic material is formed at the bottom of a housing 76.

In this structure, the housing 76 which stores the reading unit and the scanning mechanism is spaced apart from the platen 17 by about 10 mm. When the recording medium 2 on which a test pattern is recorded comes below the reading unit, the housing is moved downward to cause the transparent plastic pressure member 80 to hold the recording medium 2. The reading head 60 scans the recording medium 2 to detect an uneven image density. In this case, it is preferable that an image is completely fixed.

With this structure, paper floating can be prevented, and accurate reading can be performed. Contamination of a light source 62 and a sensor 73 can be prevented by the transparent plastic press member 80 which covers the lower portion of the housing.

Figure 26:
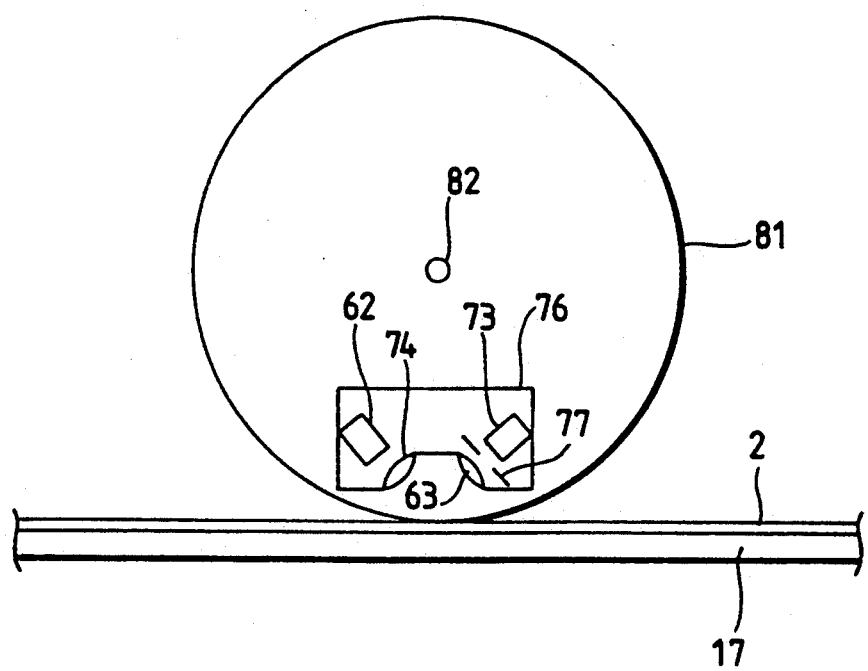

FIG. 26 shows still another arrangement for keeping a distance between the reading unit and the recording medium constant. Referring to FIG. 26, a housing 76 is vertically fixed but a cylindrical roller 81 made of a transparent plastic material which is pivotal about a shaft 82. The recording medium 2 is pressed by the transparent cylindrical roller 81. An uneven image density can be read from the inside of the transparent cylindrical roller 81 while paper floating is prevented. In this structure, an uneven image density can be accurately detected.

In addition to the above arrangements, if an apparatus main body has recording medium clamping means on the upstream and downstream sides, and the recording medium is read between the upstream and downstream clamping means, high-precision reading is possible.

When color image recording is to be performed using three colors, i.e., cyan (C), magenta (M), and yellow (Y), or four colors, i.e., the above colors and black (Bk), in order to rewrite unevenness correction data, correction test patterns must be recorded by the corresponding heads, uneven image densities must be read, and unevenness correction data for these heads must be rewritten.

Figure 27A:
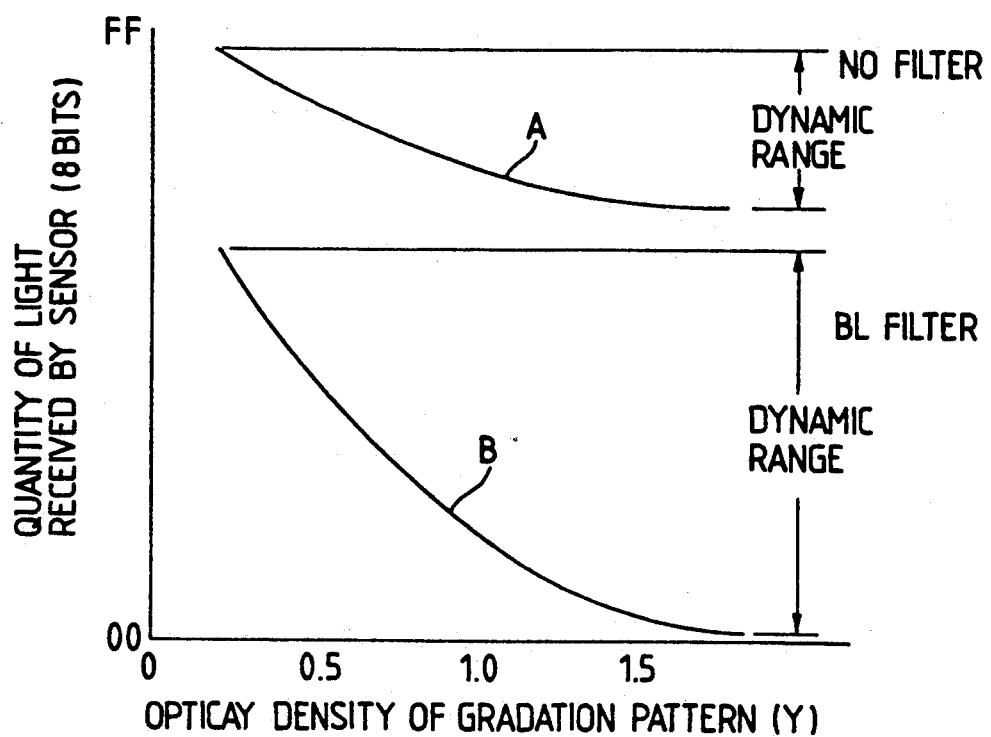
FIGS. 27A, 27B and 27C are views for explaining a mode for increasing a dynamic range of a sensor light reception quantity corresponding to each color.
Figure 27B:
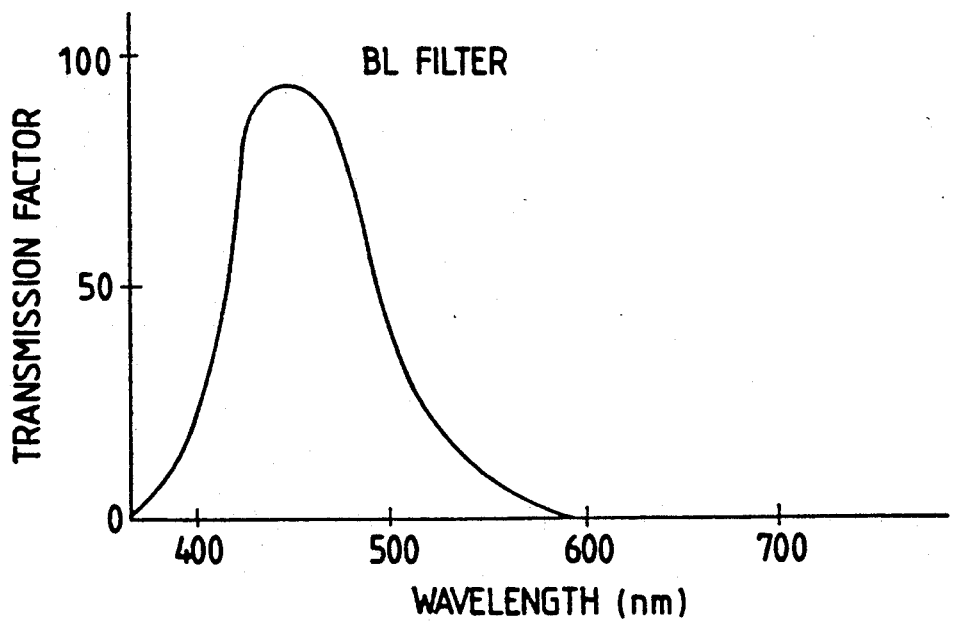

In unevenness reading of the C, M, and Y components, and particularly the Y component, when white color light is radiated on a Y test pattern, and light reflected by this test pattern is received without being through a filter, a quantity of light received by the sensor 73 has a narrow dynamic range as indicated by a curve A in FIG. 27A. In this case, it is difficult to accurately read unevenness (an optical density difference is as small as about 0.02 to 0.15). When light passing through a BL (blue) filter as shown in FIG. 27B is used, the quantity of light received by the sensor can be reduced, but the dynamic range is increased, as indicated by a curve B in FIG. 27A. In this case, unevenness reading precision can be increased. This can apply to the C and M components when R (red) and G (green) filters are used.

Figure 28:
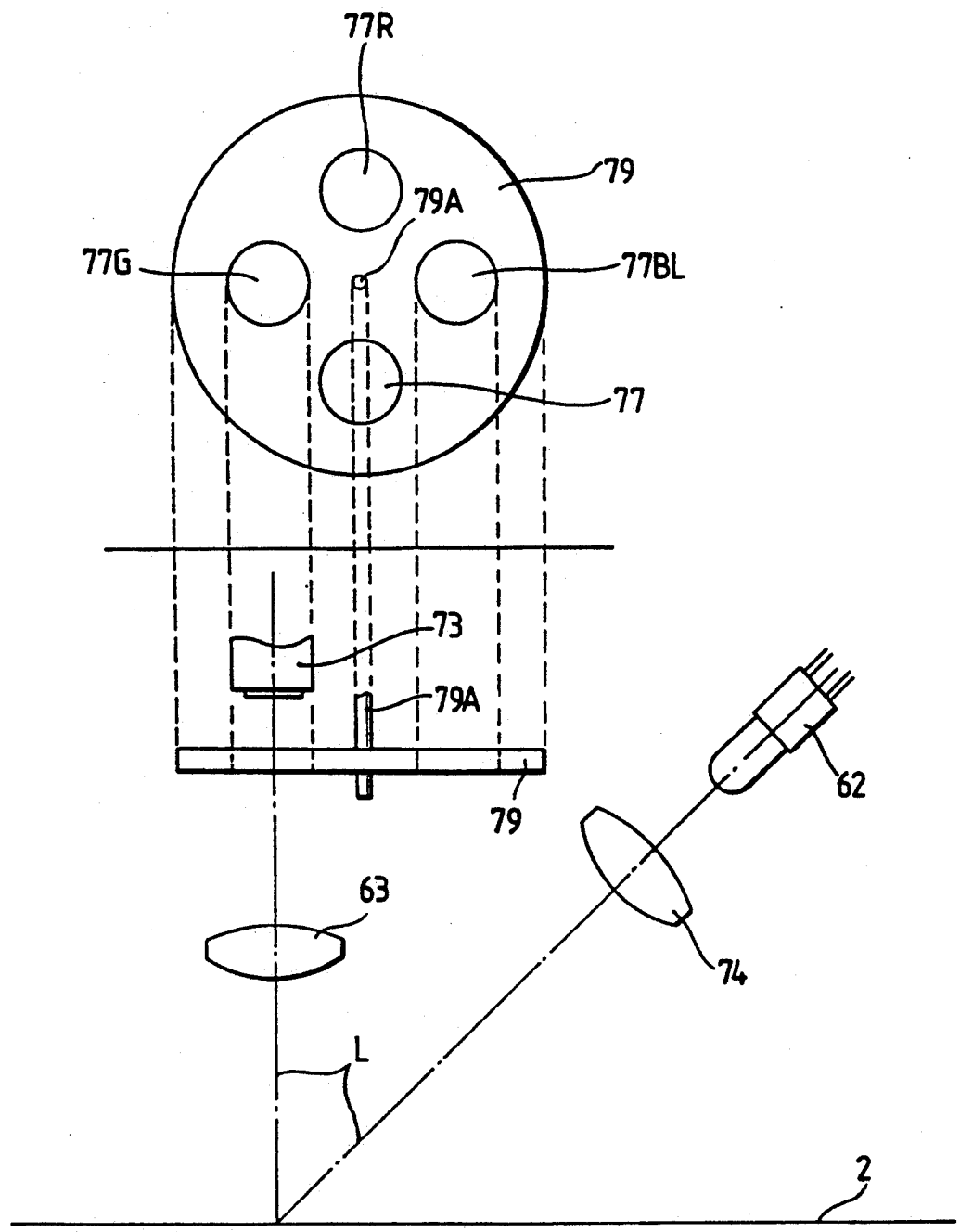
FIGS. 28, 29 and 30 are views showing arrangements of a portion for reading an uneven image density of a test pattern in correspondence with its color.

FIG. 28 shows an arrangement for switching these color filters. A color filter switching portion 79 can be pivoted about a shaft 79A to properly and selectively locate an R filter 77R, a G filter 77G, BL filter 77BK, or a BK opening (no filter) 77BK on an optical path to the sensor 73 during reading of the test pattern of each color. The opening for each filter has a diameter as in $d_0$ described above.

Unevenness correction of each color can be accurately performed by using the single unevenness reading sensor 73 and the light source 62.

Figure 27C:
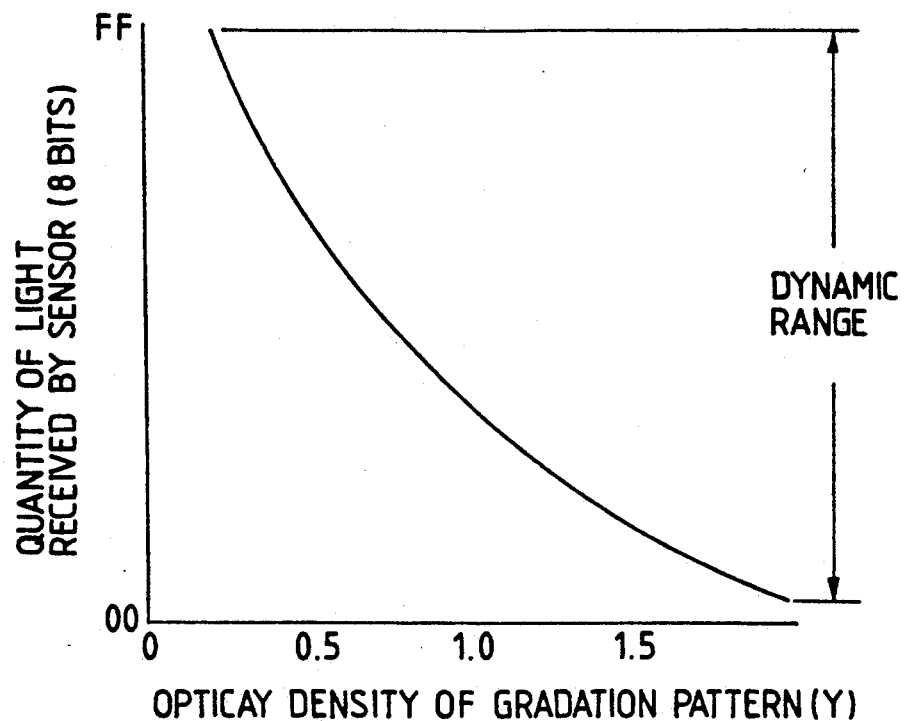

The positions of the filter are not limited to specific positions on the optical path L extending from the light source 62 to the sensor 73. In order to correct the quantity of received light whose magnitude is reduced by filtering through the filters, a quantity of light emitted from the lamp source can be increased to compensate for its decrease, thereby widening the dynamic range, as shown in FIG. 27C. In a manner to be described later, an appropriate constant may be multiplied or a signal may be amplified in accordance with a given color (to be described later).

In addition, light sources may be switched instead of switching the color filters described above.

Figure 29:
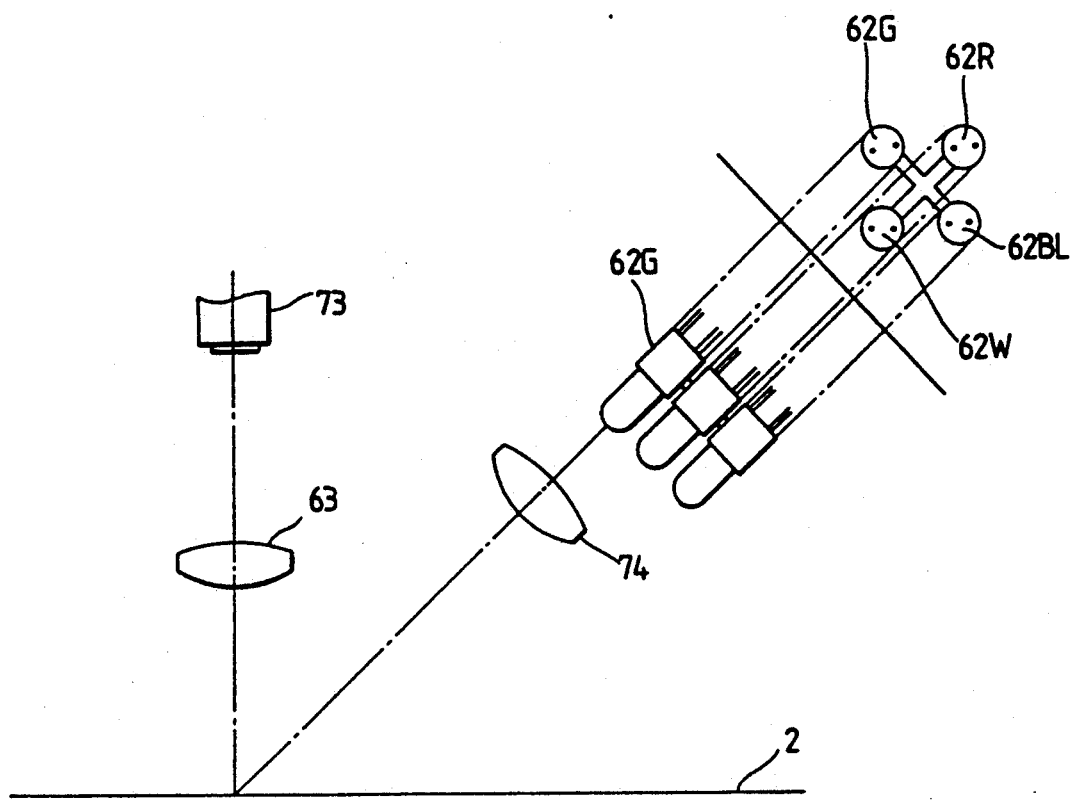

FIG. 29 shows an arrangement for switching between light sources. Four light sources 62R, 62G, 62BL and 62W having R, G, BL, and white spectral characteristics are switched as in the above arrangement, thereby obtaining the same effect as in the above arrangement.

A mechanism for preventing floating of the recording medium 2 and an arrangement for increasing the dynamic range in accordance with colors can be integrally formed.

Figure 30:
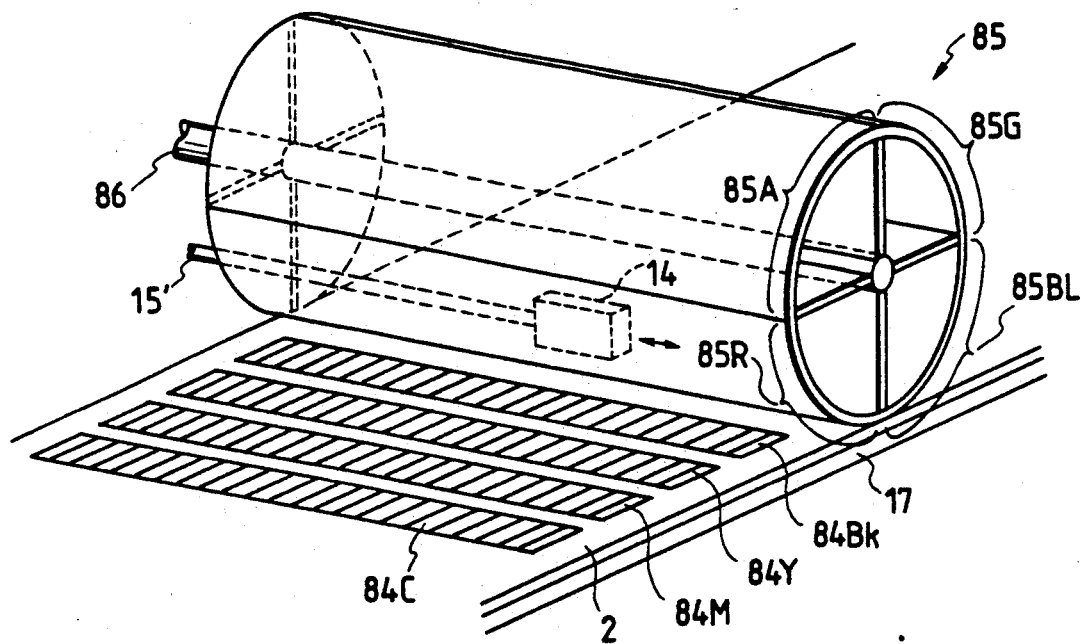

FIG. 30 shows an arrangement integrally having the mechanism for preventing floating of the recording medium 2 and the arrangement for increasing the dynamic range in accordance with colors. A transparent press roller 85 has four portions equally divided in its circumferential direction. These four portions consist of a transparent portion 85A, a red filter portion 85R, a green filter portion 85G, and a blue filter portion 85BL. A test pattern 84BK on the recording medium 2 is formed by the black head 1BK, a test pattern 84C is formed by the cyan head 1C, a test pattern 84M is formed by the magenta head 1M, and a test pattern 84Y is formed by the yellow head 1Y.

The reading unit 14 which can be inserted inside the transparent roller 85 is supported by a support rod 15'. The support rod 15' can be moved in directions indicated by a double-headed arrow.

When unevenness of the test pattern 84BK is to be read by the black head 1BK, the roller 85 is rotated. The unit 14 is inserted while the recording medium is held by the portion 85A. Similarly, when the test pattern 84C of the cyan head 1C is to be read, the recording medium is held at the position corresponding to the portion 85R. When the test pattern 84M formed by the magenta head 1M is to be read, the recording medium is held at a position corresponding to the portion 85G. When the test pattern 84Y formed by the yellow head 1Y is to be read, the recording medium is held at a position corresponding to the portion 85BL.

In this arrangement, the uneven image densities of the color heads can be read through the filters with high precision, and at the same time paper floating can be prevented. Therefore, accurate reading can be performed.

Scanning of the reading head having the arrangement shown in FIG. 20 will be described below.

As described above, the recording medium on which a test pattern is recorded is conveyed to the reading unit 14 located to face the recording surface of the recording medium on the downstream side of the recording head with respect to the convey direction. Thereafter, the pulse motor 67 is driven, and the reading unit 14, i.e., the reading head 60 fixed to the driving force transmission portion 65 such as a wire or timing belt connected to the pulse motor 67 is scanned in the main scanning or G direction, thereby causing the reading sensor 73 to read the test pattern recorded on the recording medium 2.

In this embodiment, when the pulse motor 67 is to be driven by a control circuit (to be described later) to convey the reading unit 14, the pulse motor 67 is driven at a frequency different from a resonance frequency of the reading unit convey system.

Figure 31:
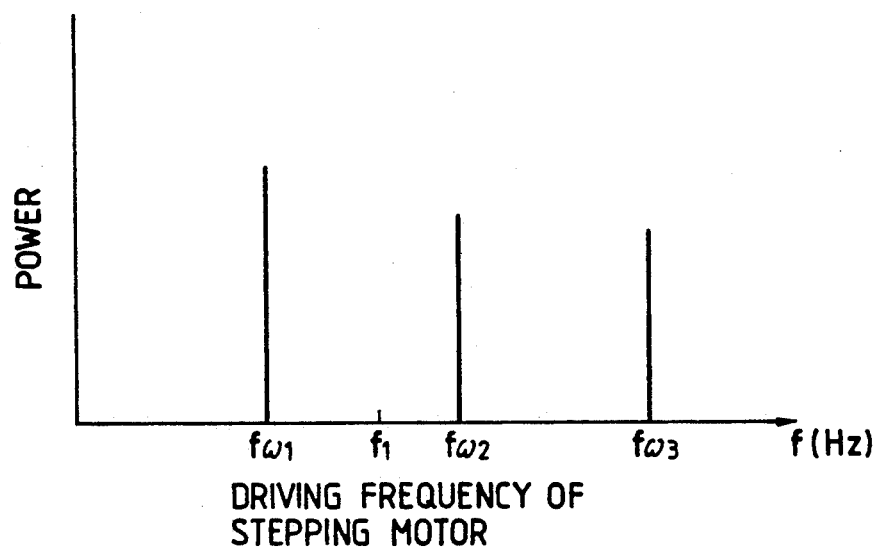
FIG. 31 is a view for explaining a scanning drive mode of the reading unit of this embodiment.
Figure 32A:
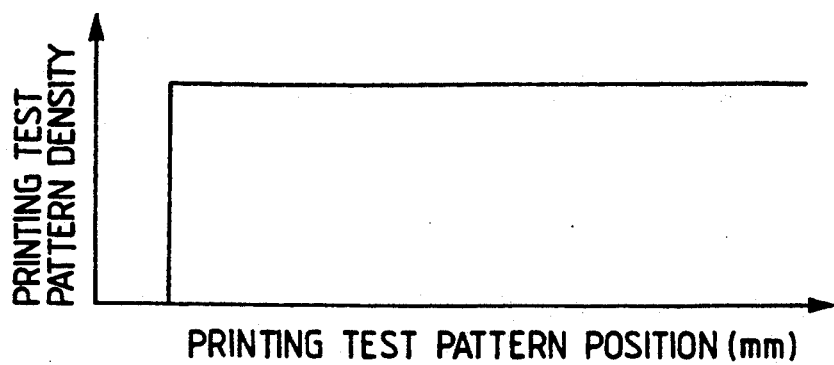
FIGS. 32A, 32B, and 32C are views for explaining variations in values read corresponding to variations in scanning rate of the reading unit.
Figure 32B:
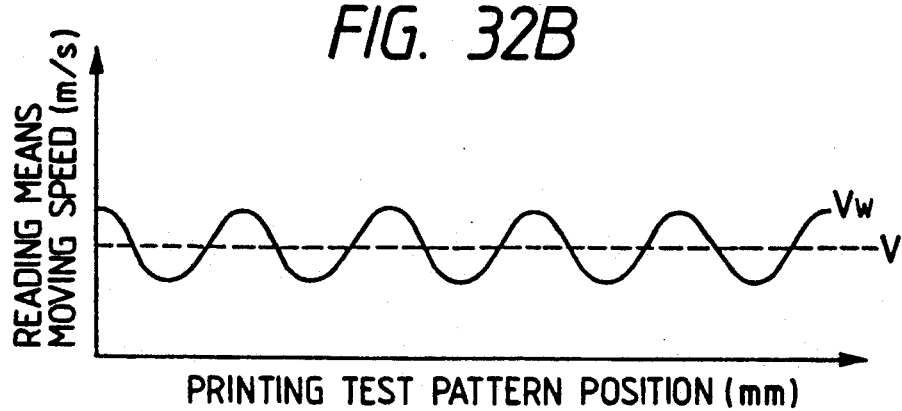

When the pulse motor 67 is driven to convey the reading unit convey system, vibrations of the reading unit convey system are increased at resonance frequencies $f\omega_1, f\omega_2, f\omega_3, \ldots$, as shown in FIG. 31. When the reading unit 14 is conveyed at resonance frequencies which cause large vibrations of the system, the following problem is posed. That is, as shown in FIG. 32A, even if the recording density of the test pattern recorded on the recording medium 2 is uniform, a convey speed $V\omega$ of the reading unit 14 may be changed, as shown in FIG. 32B. In this case, a read output from the reading unit 14 has output characteristics having a pitch error such as $k\omega$ shown in FIG. 32C. As a result, a recording density of the test pattern recorded on the recording medium 2 cannot be accurately read.

In this embodiment, in order to eliminate this drawback, the reading unit 14 is driven at a frequency $f_1$ other than the resonance frequencies or the reading unit convey system. The test pattern is read at a predetermined read speed v, thereby accurately reading the test pattern recording density free from influences of vibrations of the convey system.

(4) Arrangement of Control System

A control system operates of this system by connecting the respective components described above and will be described below.

Figure 33:
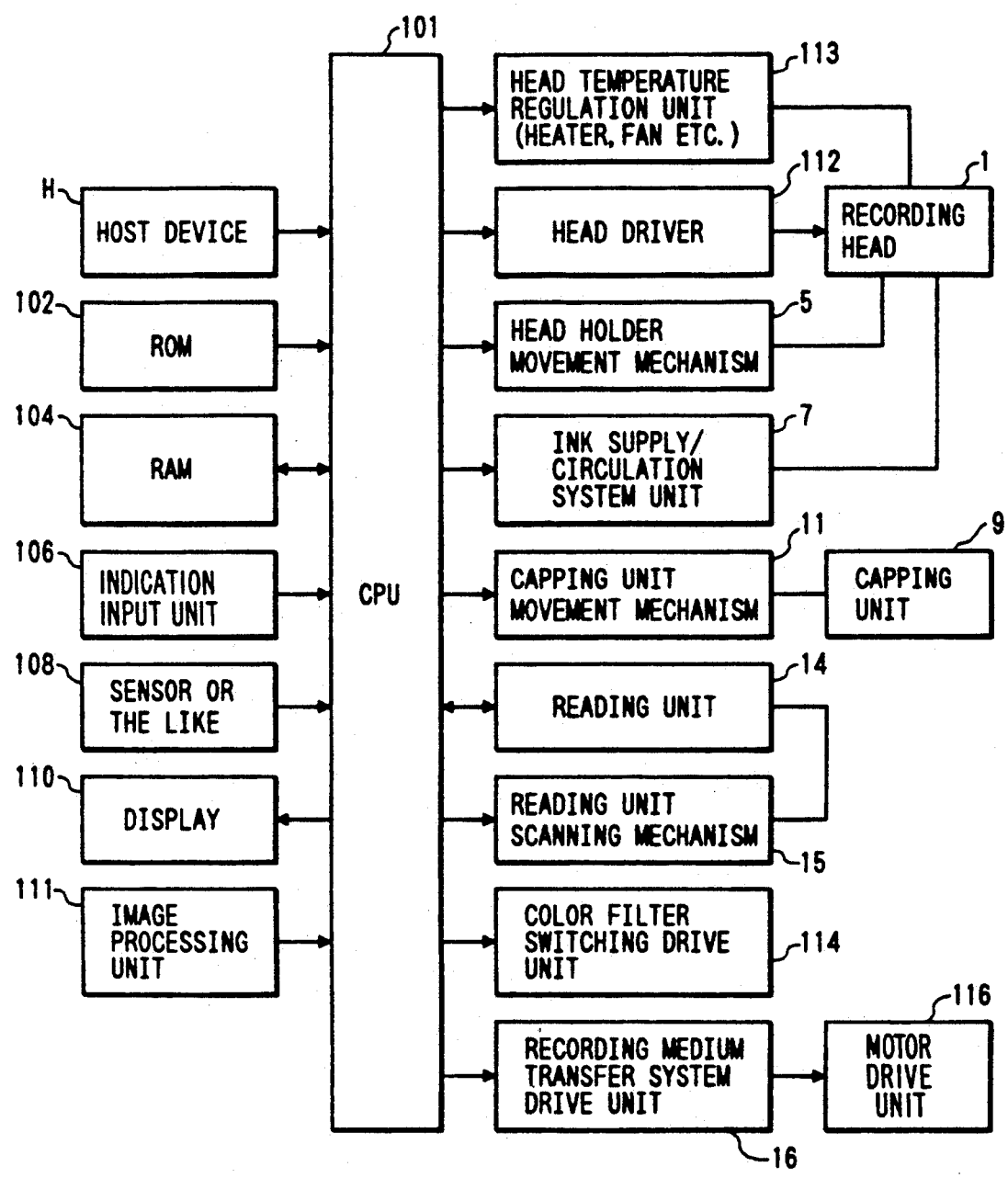
FIG. 33 is a block diagram showing an arrangement of a control system in an ink-jet recording apparatus according to this embodiment.

FIG. 33 shows an arrangement of the control system. A host unit 33H supplies recording image data and various commands to the apparatus of this embodiment. The host unit H is a computer, an image reader or another arrangement. A CPU 101 serves as a main control unit of the apparatus of this embodiment. The CPU 101 has a form of a microcomputer and controls the respective circuit components in accordance with processing sequences (to be described later). A ROM 102 stores programs corresponding to the processing sequences and other permanent data. A RAM 104 has temporary storage areas of image data and work areas used in various control operations.

An indication input unit 106 includes an on-line switch for allowing the apparatus to communicate with the host unit H and inputs a recording start command, a command for recording a test pattern for uneven image density correction, and information representing a type of recording medium. Sensor unit 108 detects the presence/absence of the recording medium, its convey state, the presence/absence of an ink, and other operating states. A display unit 110 is used to display operating and setup states of the apparatus, and the presence/absence of an abnormal event. An image processing unit 111 performs logarithmic transformation, masking, UCR (Under Color Removal) and, color balance control of image data associated with recording.

A head driver 112 drives each ink injection energy generation element of the recording head 1 (the heads 1Y, 1M, 1C, and 1BK are collectively represented). A temperature regulation or adjustment unit 113 adjusts a temperature of the recording head 1. More specifically, the temperature adjustment unit 113 includes heating and cooling fans arranged in correspondence with the head 1. A driving unit 114 drives the color filter switching unit 79 described with reference to FIG. 28, and a motor driving unit 116 drives the respective motors for driving the recording medium convey system.

Figure 34:
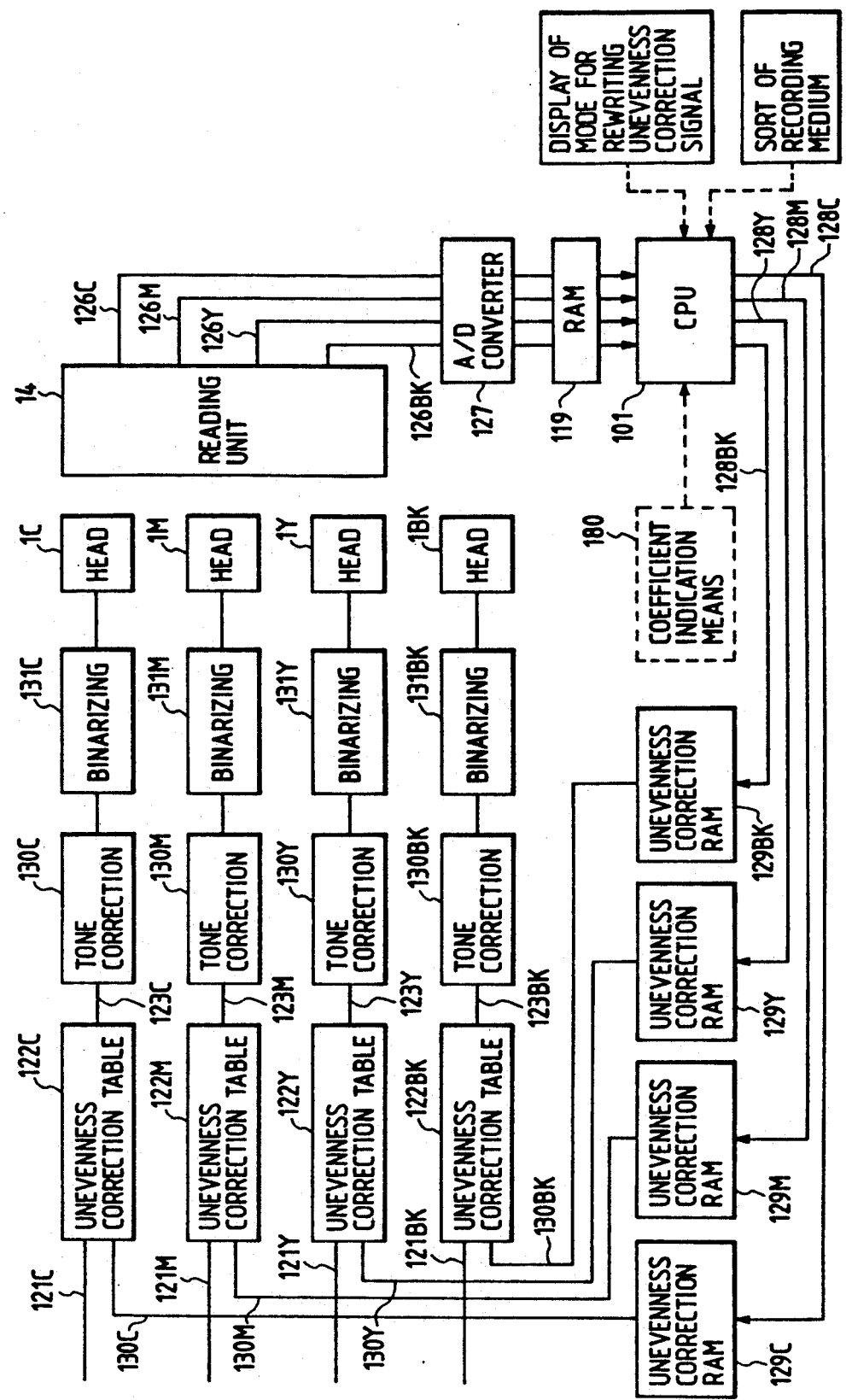
FIG. 34 is a block diagram showing a detailed arrangement for an uneven image density correction system.

FIG. 34 is a block diagram showing a detailed arrangement of the system for correcting the uneven image density in the arrangement shown in FIG. 33.

The image processing unit 111 outputs cyan, magenta, yellow, and black image signals 121C, 121M, 121Y, and 121BK. Unevenness correction tables 122C, 122M, 122Y, and 122BK are arranged to receive the cyan, magenta, yellow, and black components, respectively. The unevenness correction tables 122C, 122M, 122Y, and 122BK can be stored in the area of the ROM 102 and output corrected image signals 123C, 123M, 123Y, and 123BK. Binarizing circuits 131C to 131BK use a dither method, an error diffusion method, or the like and supply binary signals to the color heads 1C to 1BK through drivers 112 (not shown in FIG. 34).

The reading unit 14 reads color signals 126C, 126M, 126Y, and 126BK through the respective color filter and the opening shown in FIG. 28. These color signals are input to an A/D converter 127. An output from the A/D converter 127 is temporarily stored in a RAM area 119 which is an area of the RAM 104. The CPU 101 calculates corrected data 128C, 128M, 128Y, and 128BK on the basis of the stored signals. Unevenness correction RAMs 129C to 129BK are arranged for the cyan, magenta, yellow, and black components, respectively, and are in areas of the RAM 104. Corrected signals 130C to 130BK output from the unevenness correction RAMs 129C to 129BK are supplied to the unevenness correction tables 122C to 122BK. The image signals 121C to 121BK are converted to correct unevenness of the heads 1C to 1BK.

Figure 35:
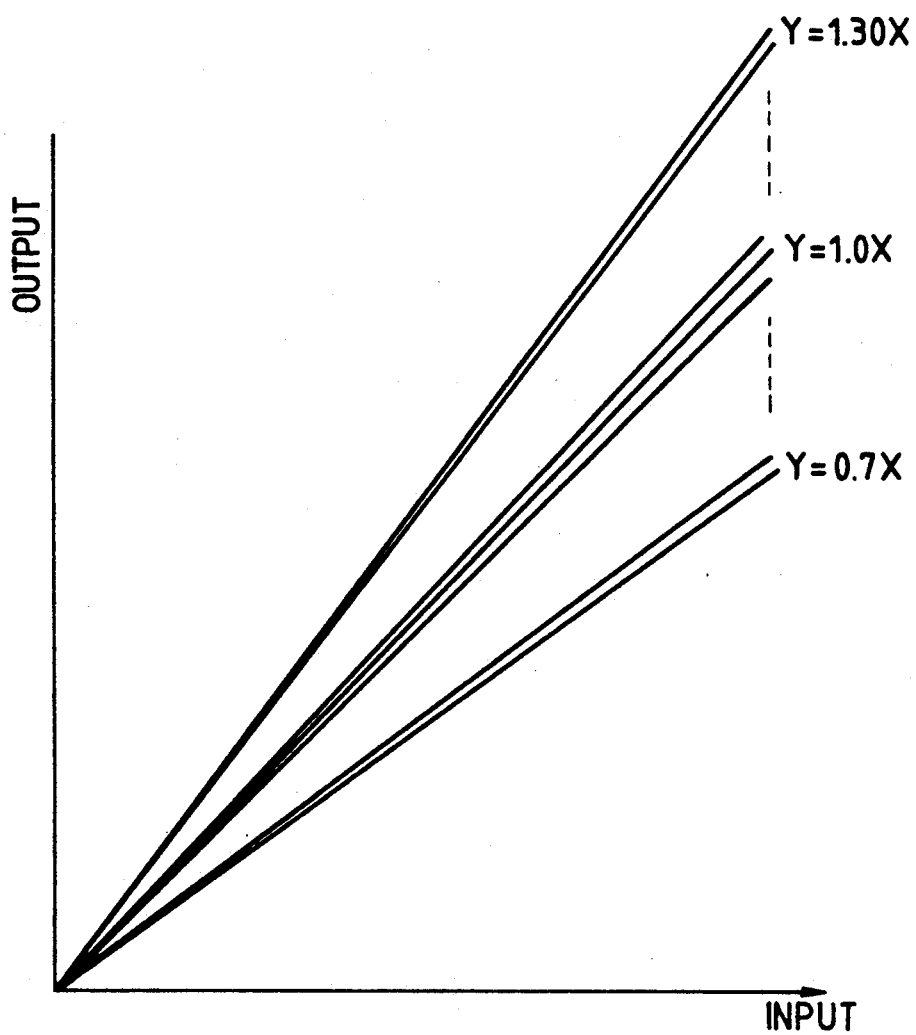
FIG. 35 is a graph for explaining an uneven image density correction table used in this embodiment.

FIG. 35 shows an unevenness correction graph or table. In this arrangement, 61 straight correction lines having a gradient $Y=0.70X$ to $Y=1.30X$ in units of 0.01 are available. The correction straight lines are selectively used in accordance with the unevenness correction signals 130C to 130BK. For example, when a pixel signal representing recording using an orifice having a large dot diameter is input, a correction straight line having a small gradient is selected. However, a correction straight line having a large gradient is selected when an orifice having a small dot diameter is selected, thereby correcting the image signal.

The unevenness correction RAMs 129C to 129BK store selection signals of correction straight lines necessary for correcting unevenness of the heads. More specifically, correction signals, the number of which is equal to the number of orifices and each of which have 61 different values of "0" to "60", are stored in the unevenness correction RAMs 129C to 129BK. The unevenness correction RAMs 129C to 129BK output the unevenness correction signals 130C to 130BK in synchronism with input image signals. The signals 123C to 123BK whose unevenness is corrected by $\gamma$ lines selected by the unevenness correction signals are input to gradation correction tables 130C to 130BK, respectively. The gradation characteristics of the input signals are corrected, and the resultant signals are output. These signals are binarized by the binarizing circuits 131C to 131BK. The binary signals drive the heads 1C to 1BK through head drivers, thereby forming a color image.

(5) Sequence of Unevenness Correction

The following processing with the above arrangement is performed to accurately perform unevenness correction.

By performing the unevenness correction processing, an injection energy generation element corresponding to an orifice for a high density portion of the head is set to have a lower driving energy (e.g., driving duty).

However, an injection energy generation element corresponding to an orifice having a low density of the recording head is set to have a high driving energy. As a result, the uneven image density of the recording head can be corrected, and a uniform image can be obtained. When the uneven image density pattern of the head is changed during use, the present unevenness correction signal becomes inappropriate, so that unevenness occurs in the image. In this case, the correction signal rewriting mode indication switch arranged in the indication input unit 106 is operated to perform unevenness correction data rewriting, thereby starting the following sequence.

Figure 36:
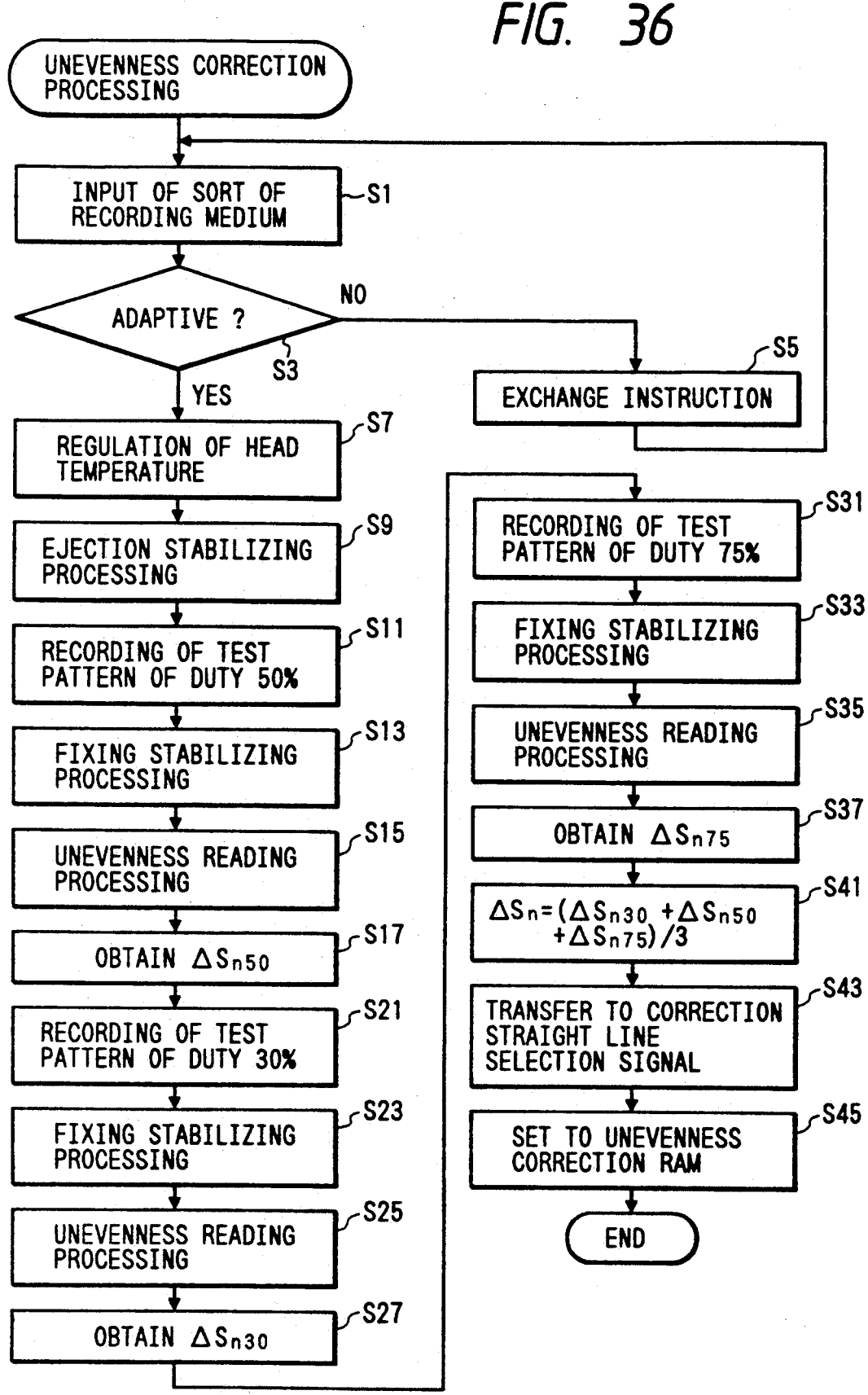
FIG. 36 is a flow chart showing an uneven image density correction sequence of this embodiment.

FIG. 36 shows an unevenness correction processing sequence of this embodiment.

When this sequence is started, an input representing a type of recording medium is accepted in step S1. A message of "Input the type of currently used recording sheet." is displayed on the display unit 110 of, e.g., a liquid crystal panel. The operator designates the type of currently used recording medium with a switch or the like arranged in the indication input unit 106 in accordance with this message. Determination is performed in step S3. When the type of input recording sheet is not a suitable sheet such as an OHP sheet or a sheet coated with a small amount not suitable for uneven image density detection, the message "Use a specified sheet" is displayed on the display unit 110 in step S5. As a result, when the current sheet is replaced with the specified sheet and the designated type of sheet is input, or when the type of input recording medium is the designated one from the beginning, the following operation is performed.

In this embodiment, every time the unevenness correction data rewriting mode is set, the type of recording medium is input. It is then determined whether the unevenness correction data is rewritten in accordance with the input data. Information representing the type of recording medium often represents the medium already designated in the recording mode. Since color tones of recording outputs often vary depending on types of recording media, image processing factors such as masking coefficients are changed in accordance with the type of recording medium.

In a modification of this embodiment, the type of recording medium used in the normal recording mode is input. When the unevenness correction data rewriting mode is set, it is determined by the previously input type of recording medium whether unevenness data rewriting is performed. For this reason, the type of recording medium need not be input this time.

In this embodiment, the recording medium must be designated upon depression of the switch. Still another modification of this embodiment need not perform depression of the switch.

Figure 37:
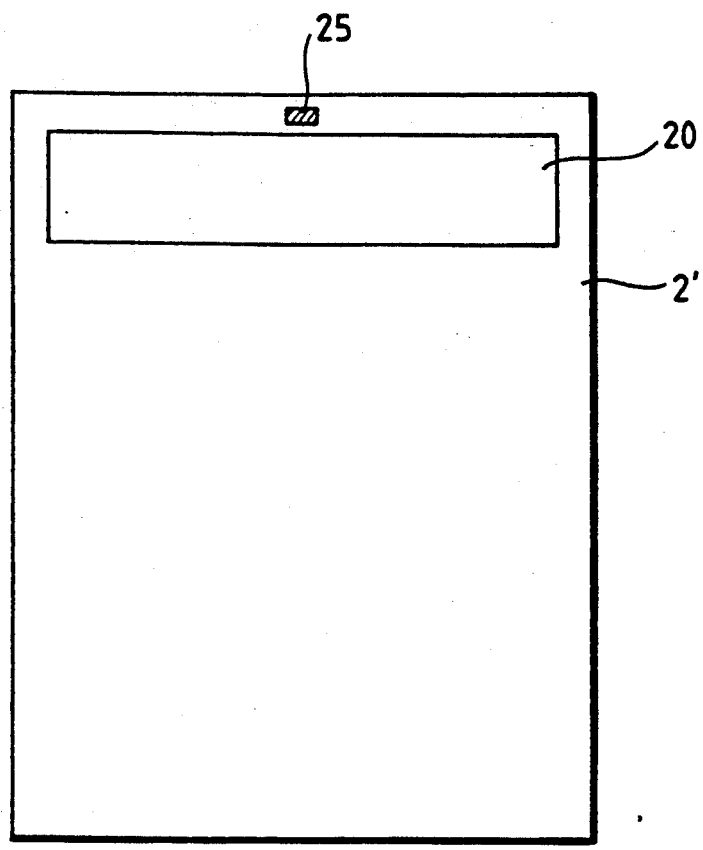
FIG. 37 is a view showing a state wherein an ID mark for performing uneven image density correction in accordance with types of recording media is formed on a recording medium.

FIG. 37 shows a recording medium 2' used for this purpose. An unevenness correction pattern 20 is recorded on the recording medium 2'. A recording medium identification mark 25 is formed in a leading end margin of the recording medium 2' to represent a density in accordance with the type of recording medium 2'. The identification mark 25 is read by the uneven image density reading unit 14 prior to reading prior to the unevenness correction pattern 20.

When the currently used sheet is determined to be a specified or fixed sheet, the unevenness correction data is started to be rewritten. Otherwise, a message is displayed to change the currently used recording medium to a designated sheet, and the unevenness correction data rewriting operation is inhibited.

With the above technique, the type of recording medium need not be input.

In still another modification of this embodiment, the same effect as in use of the identification mark can be obtained even if no identification mark is used. For this purpose, a sensor unit for detecting the type of recording medium is provided in addition to the uneven image density reading unit 14. An arrangement of this additional sensor unit is almost the same as that in FIG. 28. An ultraviolet lamp is used as the lamp for this additional sensor unit, and a sensor has a sensitivity in an ultraviolet range. In this case, the type of recording medium is discriminated in accordance with the quantity of light reflected from a margin of the recording medium. In general, a coated sheet for ink-jet recording often contains a fluor to make the sheet color whiter. For this reason, when the ultraviolet lamp is used, the type of recording medium can be discriminated from light reflected by the coated sheet. That is, when the quantity of light reflected by a sheet is large, it is determined to be a sheet having a thick coating layer. When the quantity of light reflected by a sheet is medium, it is discriminated as a sheet having a thin coating layer. When the quantity of light reflected by a sheet is almost zero, it is determined to be an OHP film. When the quantity of reflected light is large and the sheet is determined to be a designated sheet suitable for uneven image density detection, the uneven image density is read and the unevenness correction data is rewritten. Otherwise, the same message described above is displayed to inhibit uneven image density reading and unevenness correction data rewriting. Therefore, since the operator inputs the type of recording medium, the same effect as described above can be obtained without forming the identification mark.

Referring back to FIG. 36, when a recording medium is suitable for unevenness correction processing, the flow advances to step S7 to perform temperature adjustment for the following reason.

In an ink-jet recording apparatus, each recording head is maintained within a predetermined temperature range (e.g., about 40° C. as a first temperature adjustment standard) to generally suppress variations in image density and perform stable injection. When this sequence is initiated to record a test pattern, recording is performed at 40° C. serving as the first temperature adjustment standard of the recording head temperature, as indicated by a region a in FIG. 38. On the other hand, when continuous image recording is performed in practice, the head is heated, and recording is performed at a maximum temperature of 50° C. serving as a second temperature adjustment reference, as indicated by a region b in FIG. 38.

Figure 39A:
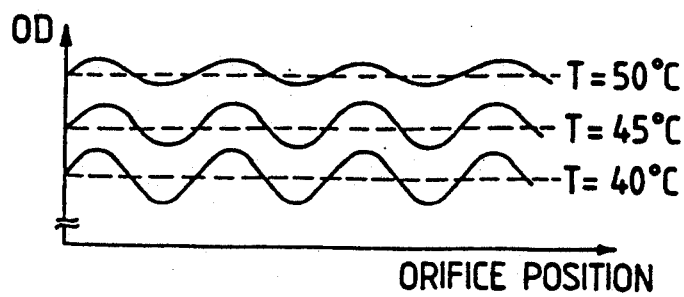
FIGS. 39A, 39B and 39C are views for explaining a mode for performing stable uneven image density correction without depending on temperatures.
Figure 39B:
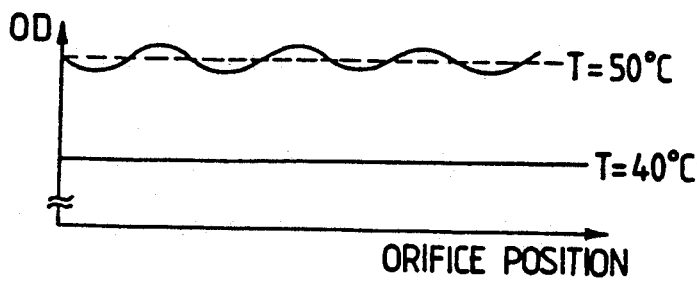

According to experimental results, as shown in FIG. 39A, it is known that a magnitude of a density (OD value) is changed in accordance with a change in temperature of the recording head. In this case, as shown in FIG. 39B, when unevenness correction at 40° C. is performed, a uniform image can be obtained at a head temperature of 40° C. However, unevenness is still present in an image formed at a head temperature of 50° C.

Figure 38:
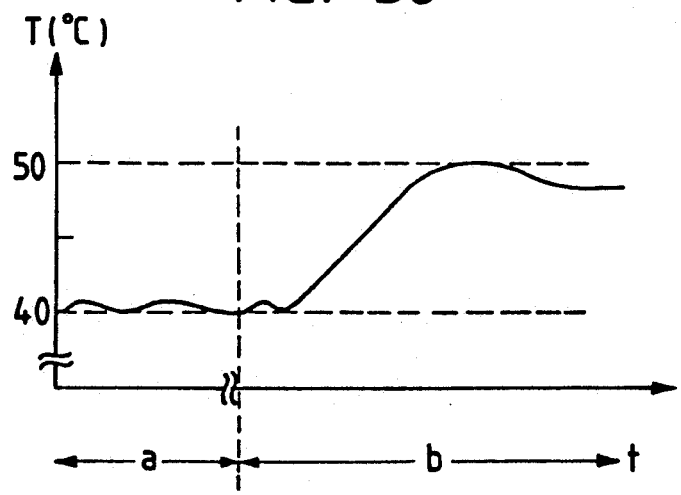
FIG. 38 is a graph for explaining a change in temperature of a recording head.
Figure 39C:
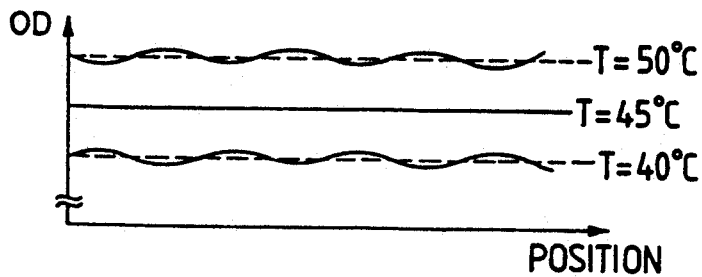

In the apparatus of this embodiment, the temperature adjustment unit 113 (heater and fan) are properly turned on/off in accordance with the temperature of the recording head 1 in the normal recording mode or a recording standby mode, thereby maintaining the recording head temperature within a predetermined temperature range (about 40° C.), as shown in FIG. 38. But, in uneven image density correction processing, a setup temperature is increased to 45° C. More specifically, the temperature adjustment standard in test pattern printing is set higher than the temperature adjustment standard in the normal recording mode. By appropriately turning on/off the heater and the fan, the head temperature is increased to about 45° C., and an uneven image density check test pattern is recorded, thereby performing uneven image density correction on the basis of the recorded test pattern. In this manner, recording of a recording head can be stably performed by temperature adjustment. That is, for example, a test pattern is formed at the head temperature of 45° C., and the uneven image density correction is performed on the basis of the test pattern, as shown in FIGS. 39A to 39C, thereby performing almost uniform uneven image density correction.

In this embodiment, test patterns are printed at the head temperature of 40° C. as the first temperature adjustment standard and 50° C. as the maximum temperature (i.e., the second temperature adjustment standard), uneven image densities of these two test patterns are detected, and correction may be performed by an average value of the uneven image densities (i.e., first and second density data).

In order to shorten the total uneven image density correction time and increase the head temperature from, e.g., 40° C. to 45° C., an electrical pulse which does not allow ink injection may be applied to recording elements (electricity-heat conversion elements) in addition to the temperature adjustment heater to shorten a rise time of the head temperature, thereby shortening a predetermined period of time until uneven image density correction is started.

Alternatively, in order to record the following uneven image density correction test pattern, perform correction, and decrease the head temperature (45° C. 40° C.) to the normal recording state, the fan is driven and the ink circulation as previously described is performed to shorten a period of time required until a recordable state is set.

In addition, the adjustment temperature in the test pattern recording mode can be appropriately determined in association with the temperature adjustment range in the normal recording mode, as a matter of course.

Referring back to FIG. 36, an injection or ejection stabilizing operation is performed in step S9 for to the following reason. When a recording head does not have normal injection characteristics due to an increase in viscosity of an ink, and mixing of dust and bubbles, and when uneven image density correction processing is performed in this state, accurate head characteristics (i.e., faithful unevenness) cannot be recognized.

In injection stabilizing processing, the recording heads 1C to 1BK are set to oppose the cap unit 9, the pressure mode is set, and the ink is forcibly discharged from orifices. Orifice surfaces can be cleaned by bringing the ink absorbing member arranged in the cap unit into contact with the orifices or by air blowing or wiping the orifice surfaces. The recording head can be driven in the same manner as in the normal recording mode to perform preliminary injection. Note that the driving energy at the time of preliminary injection is not necessarily equal to that in the recording mode. That is, the same operation as in a so-called injection recovery operation in the ink-jet recording apparatus may be performed.

In place of the above operations or after it, an injection stabilizing pattern may be recorded on a recording medium.

Figure 40:
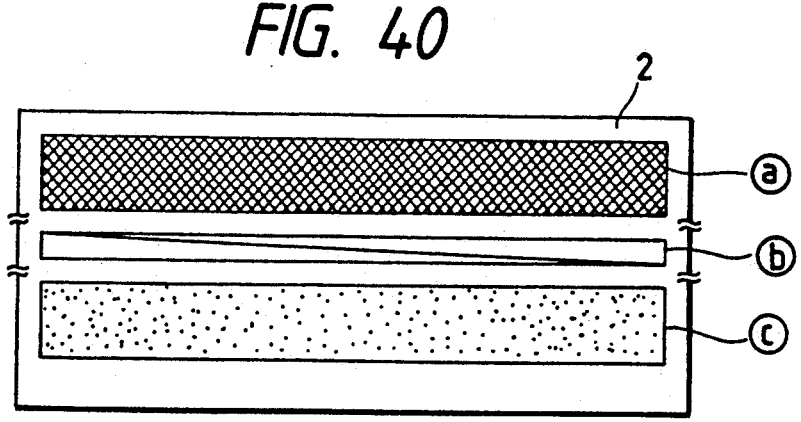
FIG. 40 is a view showing a case wherein an injection stabilizing pattern, an injection defect detection pattern, and an uneven image density correction test pattern are formed on a recording medium.

FIG. 40 shows recording of these patterns. A pattern (a) is an injection stabilizing pattern, a pattern (b) is a test image pattern for testing the presence/absence of non-injection (this pattern is formed by sequentially driving orifices while a recording medium is being fed in FIG. 40), and a pattern (c) is a test pattern for detecting an uneven image density. The injection stabilizing pattern is obtained by driving all the orifices of all the recording heads, i.e., a 100% duty. By recording this injection stabilizing pattern, the head temperature is stabilized, the ink supply system is set in a steady state, conditions for normal recording are given, and the presence/absence of injection errors or orifice defects during actual printing and the uneven image density can be accurately detected.

In an apparatus having the full multi-recording head 1 and a regist adjustment such that a maximum recording width is a slightly larger than an image recording width. The recording width of the test pattern during recording is preferably larger than the normal image recording width. Assume that a maximum sheet size is an A3 size, that a maximum recording sheet size is about 293 mm determined by considering right and left margins with respect to 297 mm, i.e., the short side of the A3 size or the long side of an A4 size, and that a maximum recording width of the recording head is 295 mm. The orifice array range is electrically adjusted, and positional errors between the mechanical heads and between the recording media are corrected. In this case, a test of the width of 295 mm as the orifice array range, and a test pattern having a length of 295 mm is recorded.

Figure 41:
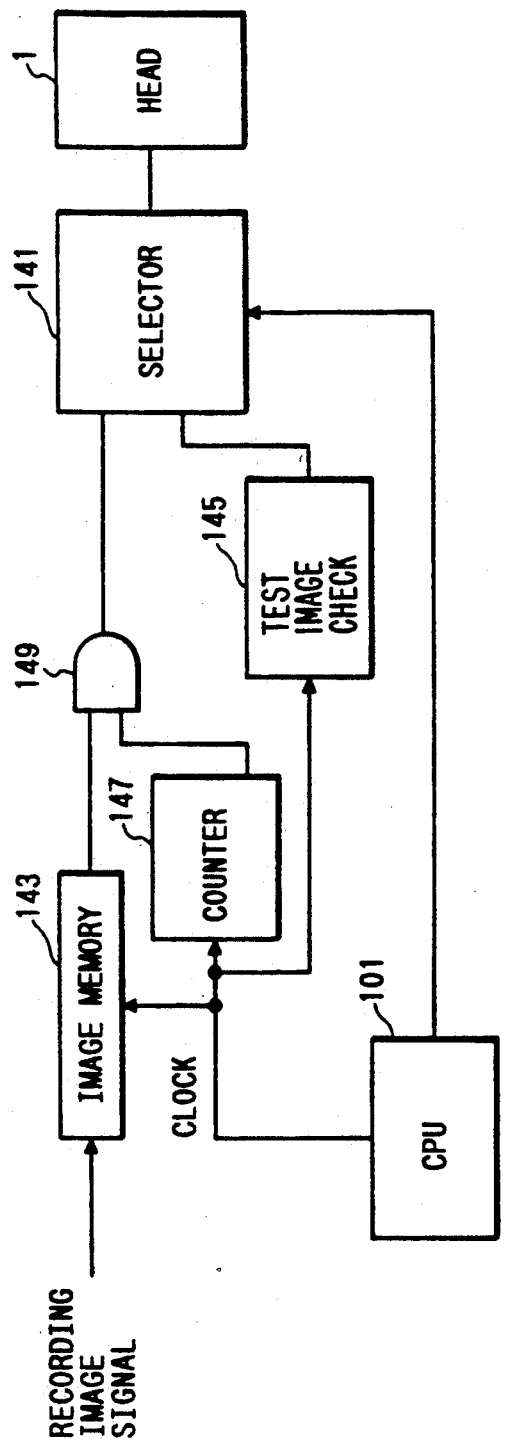
FIG. 41 is a block diagram showing an arrangement of a main part of a control system for performing uneven image density correction for all the orifices of a recording head of a full multi-type recording head of this embodiment.

FIG. 41 is a block diagram showing an arrangement of a circuit for performing the above operation. A selector 141 selects data to be supplied to the recording head in accordance with image data to be recorded and test pattern data. Memories 143 and 145 store the image data to be recorded and test pattern data, respectively. A counter 147 is arranged to cause an AND gate 149 to select an actual orifice array range in actual recording. In the above arrangement, the AND gate 149 outputs image data, corresponding to 293 mm in actual recording, to the selector 141. In the test pattern recording mode, the test pattern data corresponding to 295 mm is output from the test image memory 145 to the selector 141. Therefore, a test can be performed using a test pattern having a length of 295 mm.

When the above injection stabilizing processing is completed, desired test patterns are recorded by the recording heads 1C to 1BK in steps from step S11, uneven image densities are read from these test patterns, and unevenness correction data are obtained. In this embodiment, an operation for one test pattern recording and reading cycle will be described with reference to a timing chart in FIG. 42.

Figure 42:
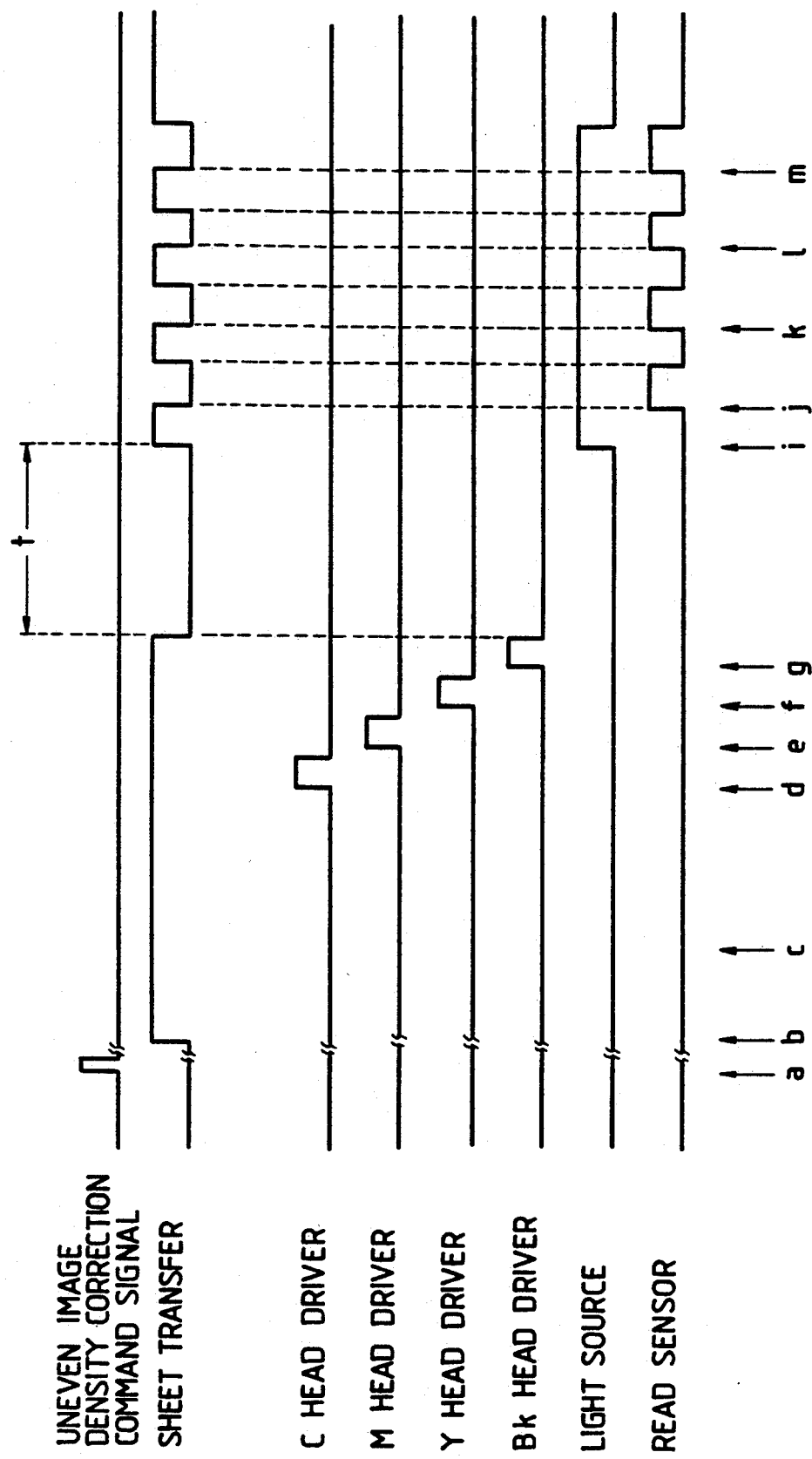
FIGS. 42 and 43 are timing charts showing apparatus operations starting with test pattern recording and terminating with uneven image density reading.

FIG. 42 is a timing chart showing an operation of the apparatus of this embodiment. An uneven image density correction sequence is started at a times a in FIG. 42. After the above processing is completed, when the recording medium 2 is conveyed to the image forming area at a times b, the main scanning motor is driven at a times c. Drivers for the cyan, magenta, yellow, and black recording heads 1C, 1M, 1Y, and 1BK are driven at times d, e, f, g. In steps S11, S21, and S31 of FIG. 36, test patterns are recorded on the recording medium 2. This test pattern is used to read an uneven image density. In this case, the unevenness correction tables represent straight lines having a gradient of 1.0, and a state in which unevenness correction is not performed is set. Test patterns are uniform halftone patterns and print ratios are about 30%, about 50%, and about 75%.

When the test patterns are to be recorded on the recording medium 2 by the corresponding recording heads, an ink cannot be instantaneously absorbed from each recording head to a recording medium, depending on the types of recording media. An uneven image density of the test pattern recorded on the recording medium is not immediately stabilized.

In this embodiment, in order not to cause the uneven image density reading unit 14 to read the uneven image density of the test pattern until the uneven image density state of the test pattern recorded by each recording head is stabilized, a recording sheet is not fed and is held for a predetermined period of time t after recording of the test pattern by the recording head is completed (steps S13, S23, and S33 in FIG. 36). After the uneven image density state of the test pattern is stabilized, the recording sheet is conveyed at a times i. When the C pattern reaches the reading apparatus, feeding of the recording medium is stopped. The reading sensor 17 is driven at a times j, and the uneven image density of the C test pattern is read by the reading unit 14. Thereafter, the uneven image densities of the M, Y, and BK color components are read at times k, l, and m, respectively (steps S15, S25, and S35 in FIG. 36).

According to an experiment conducted by the present inventors, when a test pattern was recorded on an ink-jet recording coated sheet by a recording head having a resolution of 400 dpi at a print ratio of 50%, the recording sheet stop time was as short as about 3 to 10 seconds.

Figure 43:
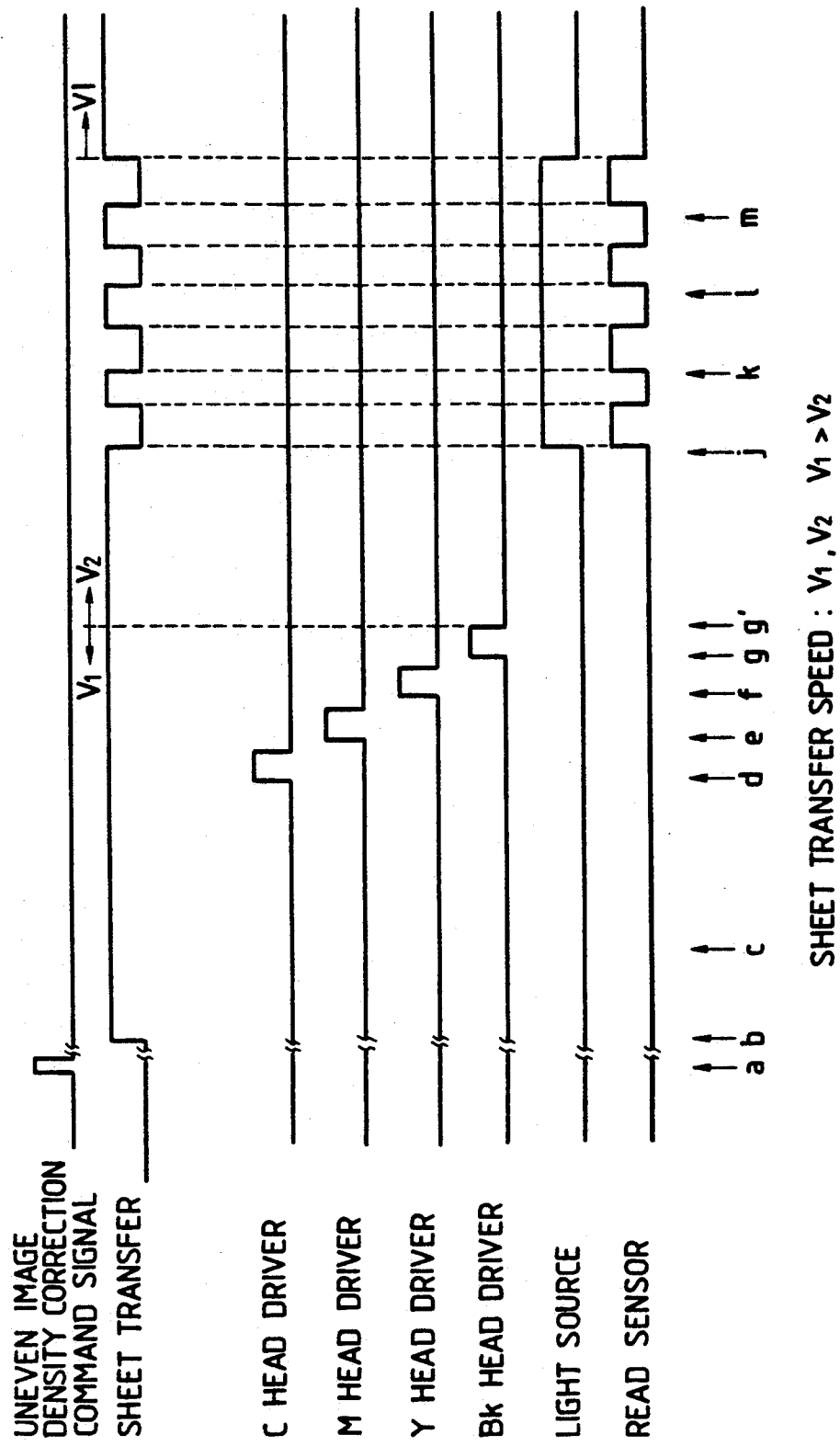

FIG. 43 is a timing chart showing another operation of the apparatus of this embodiment. In this operation, when recording of a test pattern by a recording head is completed (time g') at a speed $v_1$ of conveying the recording medium to the recording position, and then the recording medium is to be fed to the uneven image density reading unit 14, the paper feed speed is reduced to satisfy the condition $v_1 > v_2$. The same effect as in FIG. 42 is obtained.

After fixing stabilization, described above, is completed, uneven image density reading processing is performed in steps S15, S25, and S35 in FIG. 36. The unevenness values of the test patterns of the respective colors are read, and unevenness correction data corresponding to the print ratios of the heads are calculated (steps S17, S27, and S37).

In this embodiment, although the reading sensor 73 is a single unit, sensor read outputs generally change between colors. For example, when a sensor having spectral characteristics close to a luminosity factor is used, the BK component has the maximum output density, and the output densities are reduced in an order of C, M, and Y. For example, an output ratio of BK:C:M:Y is given as 1:0.8:0.75:0.25.

An uneven image density correction quantity is obtained by a ratio between an intrahead average density and a density of an orifice of interest, output differences do not pose any problem. Assume that an output for C is $K_1$ times the output for BK. An average density of the head 1BK is defined as $OD_{BK}$, a density of an orifice of interest in the head 1BK is defined as $OD_{BKn}$, an average density of the head 1C is $OD_C$, and a density of an orifice of interest in the head 1C is defined as $OD_{cn}$. If unevenness of the orifice of interest in the head 1BK is equal to that of the head 1C, sensor outputs $\overline{OD}_c = K_1 \times \overline{OD}_{BK}$ and $OD_{cn} = K_1 \times OD_{BKn}$. In this case, a correction value for the C component is equal to that of the BK component as follows:

$$\frac{\overline{OD}_c}{OD_{cn}} = \frac{K_1 \times \overline{OD}_{BK}}{K_1 \times OD_{BKn}} = \frac{\overline{OD}_{BK}}{OD_{BKn}}$$

For this reason, output differences between the color components do not pose any problem.

When an uneven image density correction value is obtained from an absolute value of a density of an orifice of interest and a difference between an average density and the density of the orifice of interest, sensor output differences between the color components pose a decisive problem.

For example, when a correction value is to be obtained from a difference between an average density and a density of an orifice of interest, the following relation is established:

$$\overline{OD}_c - OD_{cn} = K_1(\overline{OD}_{BK} - OD_{BKn})$$

This value for the C component is $K_1$ times that of the BK component. Correction data for the orifice of interest is obtained on the basis of the above value. Although the uneven image densities of the heads are equal to each other, the final correction value for the BK component is different from that of the C component.

In this embodiment, a ratio of sensor outputs of the respective colors is obtained. At the time of unevenness reading, the CPU 101 multiplies the sensor outputs with a reciprocal value of this ratio. Unevenness correction is then performed on the basis of the calculated products.

If an output ratio of BK:C:M:Y is given as $1:K_1:K_2:K_3$, an output obtained upon reading of the BK component is multiplied with 1, an output obtained upon reading of the C component is multiplied with $1/K_1$, an output obtained upon reading of the M component is multiplied with $1/K_2$, and an output obtained upon reading of the Y component is multiplied with $1/K_3$.

With the above technique, the following relation is obtained:

$$1/K_1 \times (\overline{OD}_c - OD_{cn}) = 1/K_1 \{K_1 \times (\overline{OD}_{BK} - OD_{BKn})\}$$
$$= \overline{OD}_{BK} - OD_{BKn}$$

Optimal correction can be performed without being influenced by the ratio of sensor outputs of the respective colors.

Sensor output correction need not be performed by the CPU 101, but can be performed in the preprocessing section.

When the A/D converter 127 comprises, e.g., an 8-bit A/D converter, an output value of each color must be converted into 8-bit digital data of the dynamic range. This is very effective against a decrease in resolution of the read data of each color.

Figure 45A:
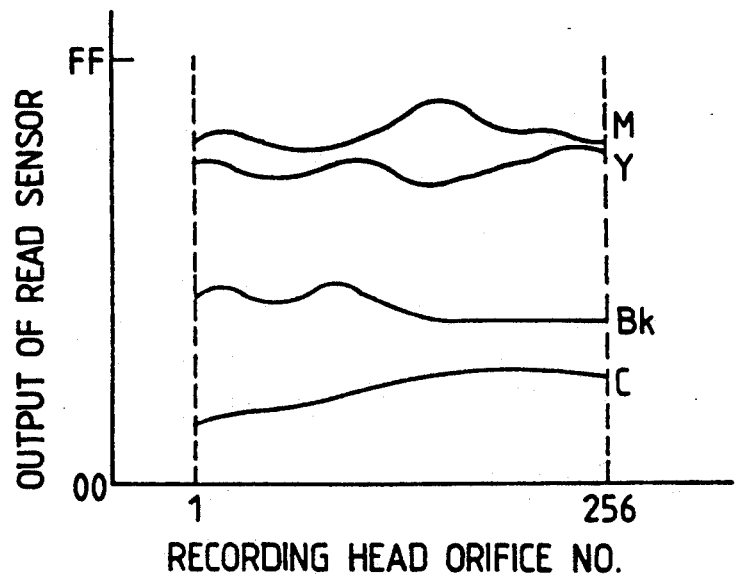
FIGS. 45A and 45B are views for explaining a correction mode in the operation in FIG. 44.
Figure 45B:
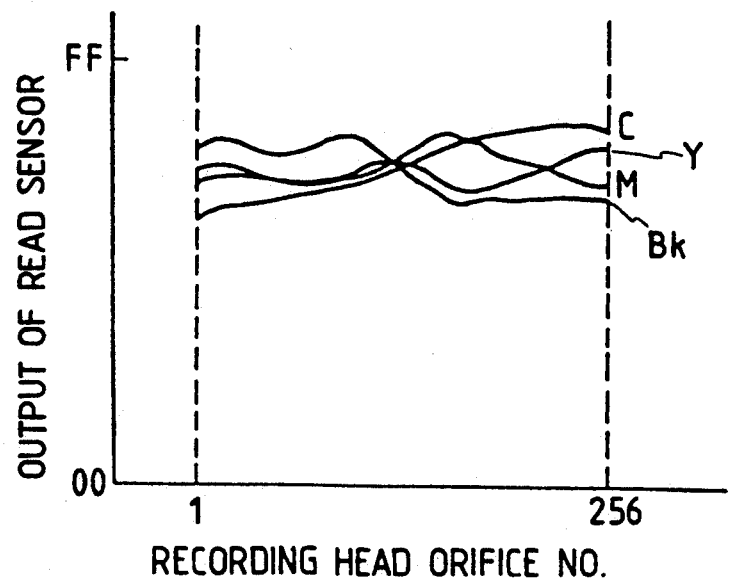

As shown in FIG. 44, amplifiers 135C, 135M, 135Y, and 135BK are arranged to amplify read signals of the respective colors. Sensor outputs of the read signals of the respective colors in FIG. 45A are set to be almost equal to each other, as shown in FIG. 45B. The read signal width for A/D-converting the read signals can be set narrow as a whole. Read data resolution in an 8-bit arrangement can be increased, and the read precision can be further improved.

On the basis of the above results, in steps S17, S27, and S37 of FIG. 36, an unevenness correction value $\Delta Sn_{50}$ at a 50% duty, an unevenness correction value $\Delta Sn_{30}$ at a 30% duty, and an unevenness correction value $\Delta Sn_{75}$ at a 75% duty are obtained. In this calculation sequence, signals are sampled from the unevenness-free signals. In this case, the number of signals corresponds to the number of orifices. The sampled data are defined as data respectively corresponding to the orifices. For example, these data are defined as $R_1, R_2, \ldots, R_N$ (N is the number of orifices) and are temporarily stored in the RAM 119. The following operation is performed by the CPU 101.

These data are processed and converted into density signals as follows:

$$C_n = -\log(R_n/R_0)$$

where $R_0$ is the constant satisfying condition $R_0 \geq R_n$; $1 \leq n \leq N$.

An average density is then calculated as follows:

$$\overline{C} = \sum_{n=1}^{N} C_n/N$$

Subsequently, an aberration of the density corresponding to each orifice from the average density is calculated as follows:

$$\Delta C_n = A \times \Delta C_n$$

More specifically, values $\Delta Sn_{50}$, $\Delta Sn_{30}$, and $\Delta Sn_{75}$ are calculated in steps S17, S27, and S37, respectively.

In the above equation, A is a coefficient determined by gradation characteristics of a head. For example, if the gradation characteristics are linear, the coefficient is $A = 1$, otherwise. Generally the coefficient A falls within the range of about 0.6 to about 1.4. When this setup operation is performed and even if an operation for obtaining a $\Delta Sn$ value is repeatedly performed, the number of repetitions can be reduced.

A final correction quantity $\Delta Sn$ is obtained as $\Delta Sn = (\Delta Sn_{30} + \Delta Sn_{50} + \Delta Sn_{75})$ from the values $\Delta Sn_{30}$, $\Delta Sn_{50}$, and $\Delta Sn_{75}$. Correction straight lines selected signals the number of which corresponds to the number of orifices and each of which as 61, i.e., "0" to "60", are obtained in accordance with $\Delta Sn$ values, and the values are stored in the unevenness correction RAMs 129C to 129BK. For example, if $\Delta Sn = 1.1$, then $Cn = C/1.1$. A density of a pixel formed by this orifice is 1/1.1 of the average density, and an unevenness correction signal for selecting a correction straight line having a gradient of 1.1 is stored in the corresponding area in the unevenness correction RAM. Correction data for selecting a correction straight line having a gradient equal to $\Delta Sn$ is stored for each orifice.

Different $\gamma$ straight lines in units of orifices are selected by the generated unevenness correction data, thereby correcting the uneven image densities. In addition to the duties of 35%, 50%, and 75% for halftone images, an appropriate duty can be obtained for a halftone image. The number of duties or duty ratios can be appropriately determined, as a matter of course.

In this embodiment, unevenness correction data representing simple average values for three halftone images of duties of 30%, 50%, and 75% are obtained. However, in an actual image, since a 75% halftone image has a considerably high tone, unevenness is not so visually conspicuous due to the considerably high tone. Similarly, a 30% halftone image does not visually have conspicuous unevenness due to its low tone as compared with a 50% halftone image. For this reason, when simple averaging is performed, an unevenness correction effect of the 50% halftone image is sacrificed to some extent. In order to improve this, the values $\Delta Sn_{30}$, $\Delta Sn_{50}$, and $\Delta Sn_{75}$ can be weighted, and the weighted values can be averaged.

The same operations as in FIG. 36 are performed until the values $\Delta Sn_{30}$, $\Delta Sn_{50}$, and $\Delta Sn_{75}$ are obtained. However, an average value is obtained as follows in step S41:

$$\Delta Sn = (a_1 \Delta Sn_{30} + a_2 \Delta Sn_{50} + a_3 \Delta Sn_{75})/(a_1 + a_2 + a_3)$$

The values $a_1$, $a_2$, and $a_3$ are preferably set to be about $a_1 = 2$, $a_2 = 3$, and $a_3 = 1$. However, these values can be arbitrarily obtained in the ranges of $0.25 < (a_1/a_2) < 1$ and $0.25 < (a_1/a_2) < 1$.

With the above technique, a sufficient unevenness correction effect for all the halftone images can be obtained in consideration of visual perception of unevenness.

The above weighting coefficients $a_1$, $a_2$, and $a_3$ can be designated. Although the $a_1$, $a_2$, and $a_3$ values are generally set to fall within the above ranges, most of the halftone images belong to 30% and 75% halftone images which are preferentially emphasized over the 50% halftone image. In order to perform unevenness correction again so as to form unevenness-free images, since other values other than the above $a_1$, $a_2$, and $a_3$ values are often better to be set, an improvement is preferable to cope with this situation.

A portion 180 represented by a broken line in FIG. 34 is a coefficient indication means capable of setting $a_1$, $a_2$, and $a_3$ values. This coefficient indication means can be set in the indication input unit 106. This setup operation can be performed in accordance with a type of recording medium used by a user and a way of causing unevenness of each head.

The $a_1$, $a_2$, and $a_3$ values may be directly set. However, a user can designate a desired halftone density, and the $a_1$, $a_2$, and $a_3$ values are automatically set in accordance with the designated halftone density, thus resulting in convenience.

For example, when a 30% halftone density is designated, then conditions $a_1 = 3$, $a_2 = 2$, and $a_3 = 1$ are given. When a 50% halftone density is designated, then $a_1 = 2$, $a_2 = 3$, and $a_3 = 1$ are set. When a 75% halftone density is designated, then $a_1 = 1$, $a_2 = 2$, and $a_3 = 3$ are set.

With the above setup operation, a desired halftone density can be arbitrarily set. At the same time, unevenness correction data for obtaining a sufficiently satisfactory unevenness correction effect can be obtained for other halftone densities.

An embodiment obtained by applying the present invention to a serial printer will be mainly described below. In the following embodiments, the same control systems and processing sequences as described above can be employed, as a matter of course.

Figure 46:
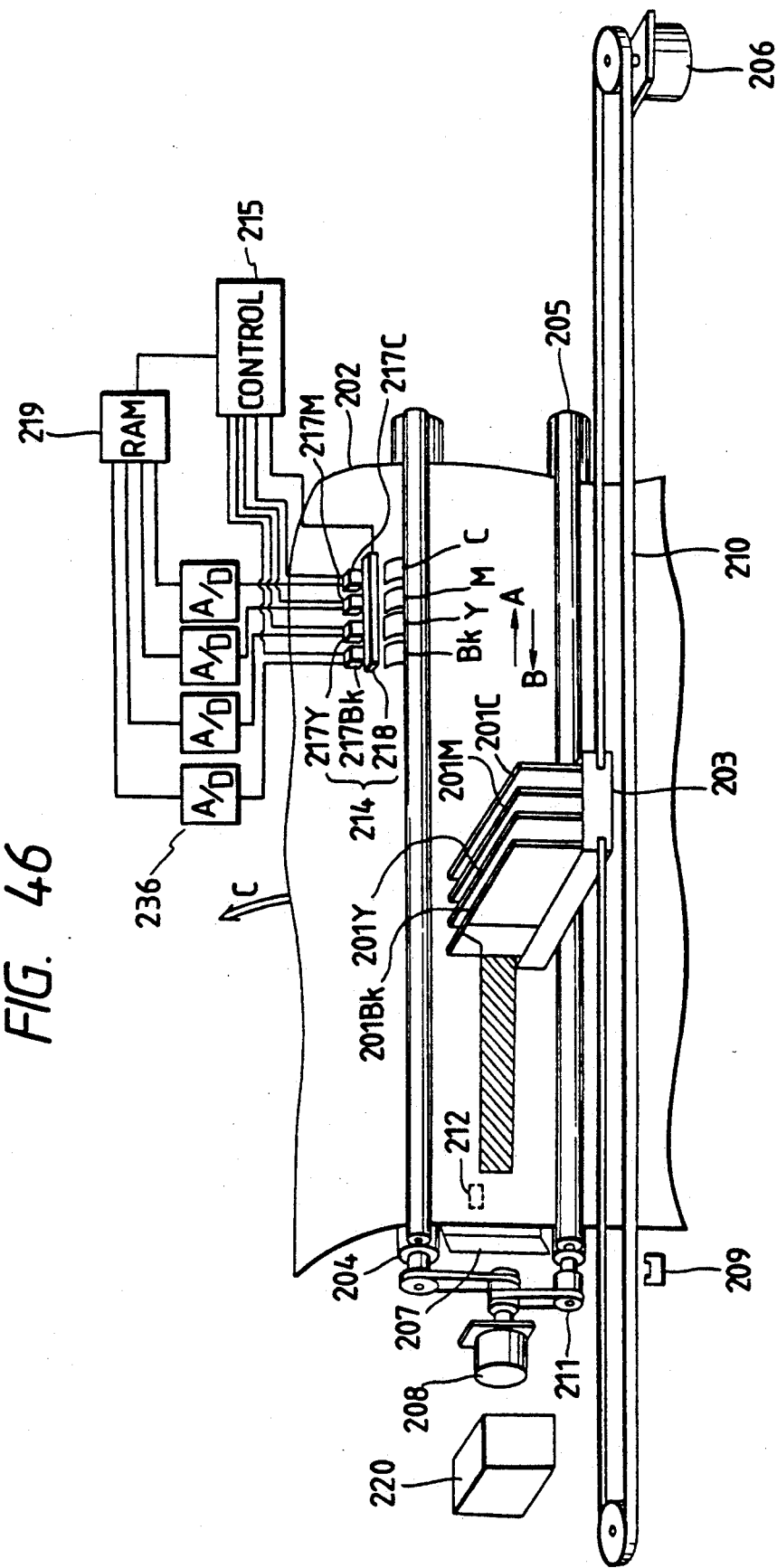
FIG. 46 is a view showing the seventh embodiment in which the present invention is applied to a serial printer type apparatus.

FIG. 46 is a schematic view showing the seventh embodiment obtained when the present invention is applied to a serial printer type ink-jet recording apparatus. Recording heads 201C, 201M, 201Y, and 201BK receive cyan, magenta, yellow, and black inks from ink tanks (not shown) through ink tubes, respectively. The inks supplied to the recording heads 201C, 201M, 201Y, and 201BK are driven in accordance with a recording signal corresponding to recording information supplied from a main control unit almost identical to that in FIG. 33. Ink droplets are injected from the respective heads to record information on a recording medium 202.

A convey motor 208 is a driving source for intermittently feeding the recording medium 202. A main scanning motor 206 for driving a feed roller 204 and a convey roller 205 serves as a driving source for driving a main scanning carriage 203 in directions of arrows A and B through a main scanning belt 210. In this embodiment, since accurate paper feed control is required, the convey or paper feed motor 208 and the main scanning motor 206 comprise pulse motors.

When the recording medium 202 reaches the paper feed roller 205, a paper feed roller clutch 211 and the convey motor 208 are rotated to convey the recording medium 202 to the convey roller 204 along a platen 207. The recording medium 202 is detected by a sensor 212 arranged on the platen 207, and a detection signal from the sensor 212 is used for position control, jamming control, and the like. When the recording medium 202 reaches the convey roller 204, the paper feed roller clutch 211 and the convey motor 208 are turned off. A suction motor (not shown) is operated to start a suction operation from the inside of the platen 207. The recording medium 202 is brought into tight contact with the platen 207 serving as an image recording area. Prior to an image recording operation on the recording medium 202, the scanning carriage 203 is moved to the position of a home position sensor 209. Forward scanning is performed in the direction of the arrow A, and cyan, magenta, yellow, and black inks are injected from predetermined positions from the recording heads 201C to 201BK to perform image recording. When image recording of a predetermined length is completed, the scanning carriage 203 is stopped. At this time, backward scanning is started in the direction of the arrow B, opposite the direction of the arrow A. The scanning carriage 203 is returned to the home position sensor 209. During backward scanning, paper feeding by a length of the sheet recorded with the recording heads 201C to 201BK is performed by causing the convey motor 208 to drive the convey roller 204 in a direction of an arrow C.

In this embodiment, each of the recording heads 201C to 201BK comprises an ink-jet recording head for forming a bubble by heat and injecting an ink droplet by a pressure of the bubble. Four ink-jet recording heads each having 256 orifices are used as the recording heads 201C to 201BK.

When the scanning carriage 203 is stopped at the home position detected by the home position sensor 209, a recovery operation of the recording heads 1 is performed once by a recovery unit 220. This operation aims at performing stable recording. In order to prevent uneven injection at the start of injection or ejection caused by a change in viscosity of an ink left in the orifices of the recording head 201, operations such as a suction operation for the recording head 201, by the recovery unit 220, and an ink preliminary injection operation are performed in accordance with programmed conditions such as stop time, temperature inside the apparatus, and injection time.

The operations described above are repeated to record an image on the entire surface of the recording medium. Under the control of a control circuit 215, an uneven image density reading unit 214 reads test patterns printed on the recording medium 202 upon application of uniform image signals to the recording heads 201C to 201BK and outputs read signals. The uneven image density reading unit 214 is arranged outside the image recording area. In this embodiment, the uneven image density reading unit 214 is arranged to face the recording surface of the recording medium on the downstream side of the recording head along the convey direction (i.e., the direction of the arrow C) of the recording medium 202. As described above, the recording medium 202 on which test patterns are recorded is illuminated with a light source 218. Recording densities of the test patterns recorded on the recording medium by the recording heads are read by reading sensors 217C, 217M, 217Y, and 217BK. Test pattern signals read by the reading sensors 217C, 217M, 217Y, and 217BK are converted into digital signals by an A/D converter 236, and the digital signals are temporarily stored in a RAM 219.

Figure 47:
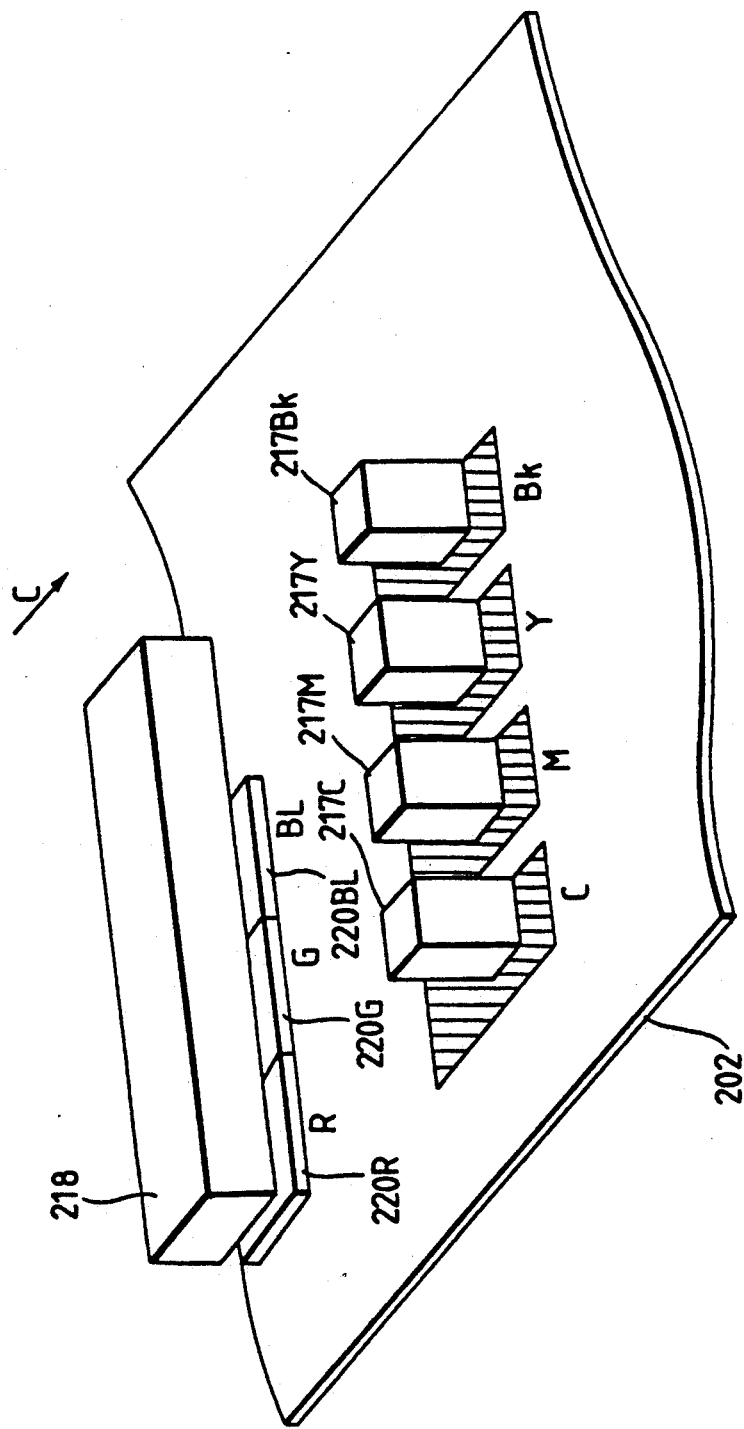
FIG. 47 is a view showing a reading system unit of the seventh embodiment.

FIG. 47 is a schematic view for explaining a reading unit of this embodiment. In order to improve reading precision of uneven image densities of the test patterns recorded on the recording medium 202 by the recording heads, color filters 220R, 220G, and 220BL are arranged on a light source 218 on the recording medium side. R, G, B, and L light components are radiated on the C, M, and Y test patterns recorded on the recording medium 202. In this manner, by emitting light components of complementary colors onto the C, M, and Y test patterns, different spectral sensitivities of the reading sensors 217C, 217M, 217Y, and 217BK need not be employed in units of test pattern colors. Uneven image densities of the respective colors can be read by using sensors having identical spectral sensitivities.

With the above arrangement, the press member described above can be used to prevent sheet floating during reading.

Figure 48:
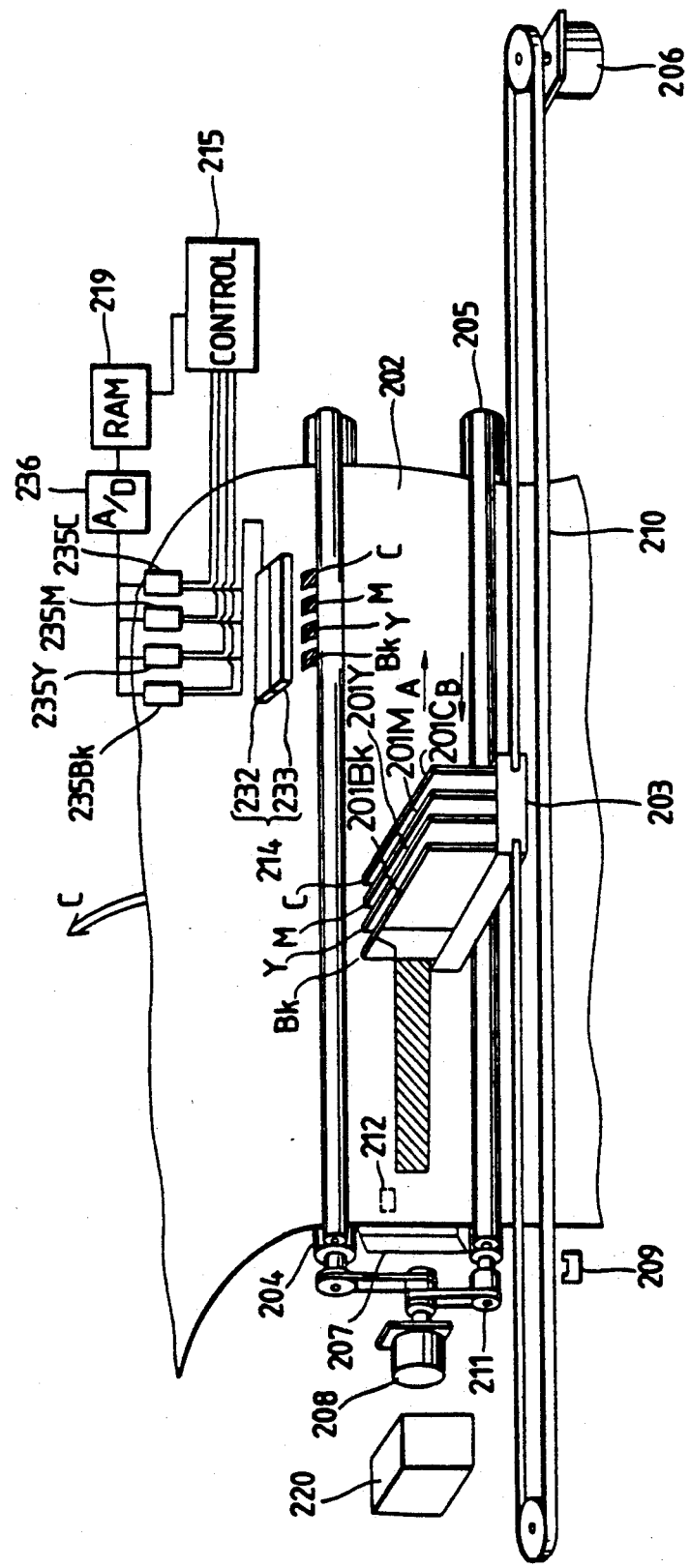
FIG. 48 is a view showing the eighth embodiment of the present invention.

FIG. 48 is a schematic view of the eighth embodiment obtained when the present invention is applied to a serial printer type apparatus. Uniform image signals are applied to the recording heads 201C, 201M, 201Y, and 201BK to read test patterns recorded on the recording medium 202, and read signals are output as in the above arrangement. In this case, the uneven image density reading unit 214 arranged outside the image recording area comprises a line reading sensor 232 and a light source 233.

In this embodiment, the uneven image density reading unit 214 is located to face the recording surface of the recording medium on the downstream side of the recording head in the convey direction (i.e., the direction indicated by the arrow C) of the recording medium 202, and a press member similar to the one described previously is arranged. When a test pattern recorded on the recording medium 202 is to be read, a distance between the recording medium 202 and the reading sensor 232 can be easily kept constant. In addition, only one reading sensor is required, thereby providing a compact apparatus.

Figure 49:
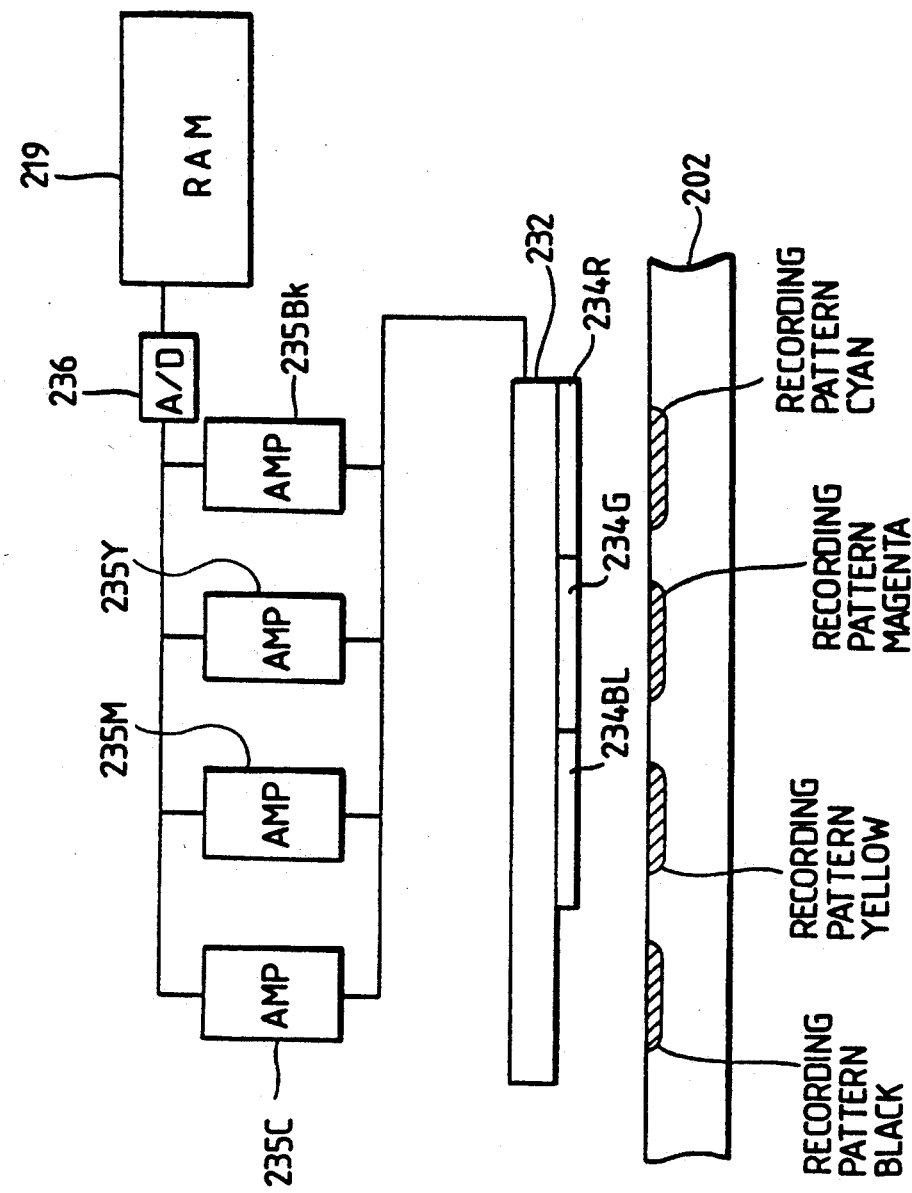
FIG. 49 is a view showing a reading unit of the eighth embodiment.

As shown in FIG. 49, R, G, and BL color filters 234R, 234G, and 234BL are arranged on the reading side of the reading line sensor 232 so as to correspond to the positions of the test patterns recorded by the respective recording heads, thereby improving reading precision of the reading sensor 232 for the print patterns of the respective colors. As described with reference to FIGS. 44, 45A, and 45B, the color read signals from the reading sensor 232 are amplified by amplifiers 235C to 235BK, respectively, to increase the resolution of the read data, thereby further improving reading precision.

Figure 50:
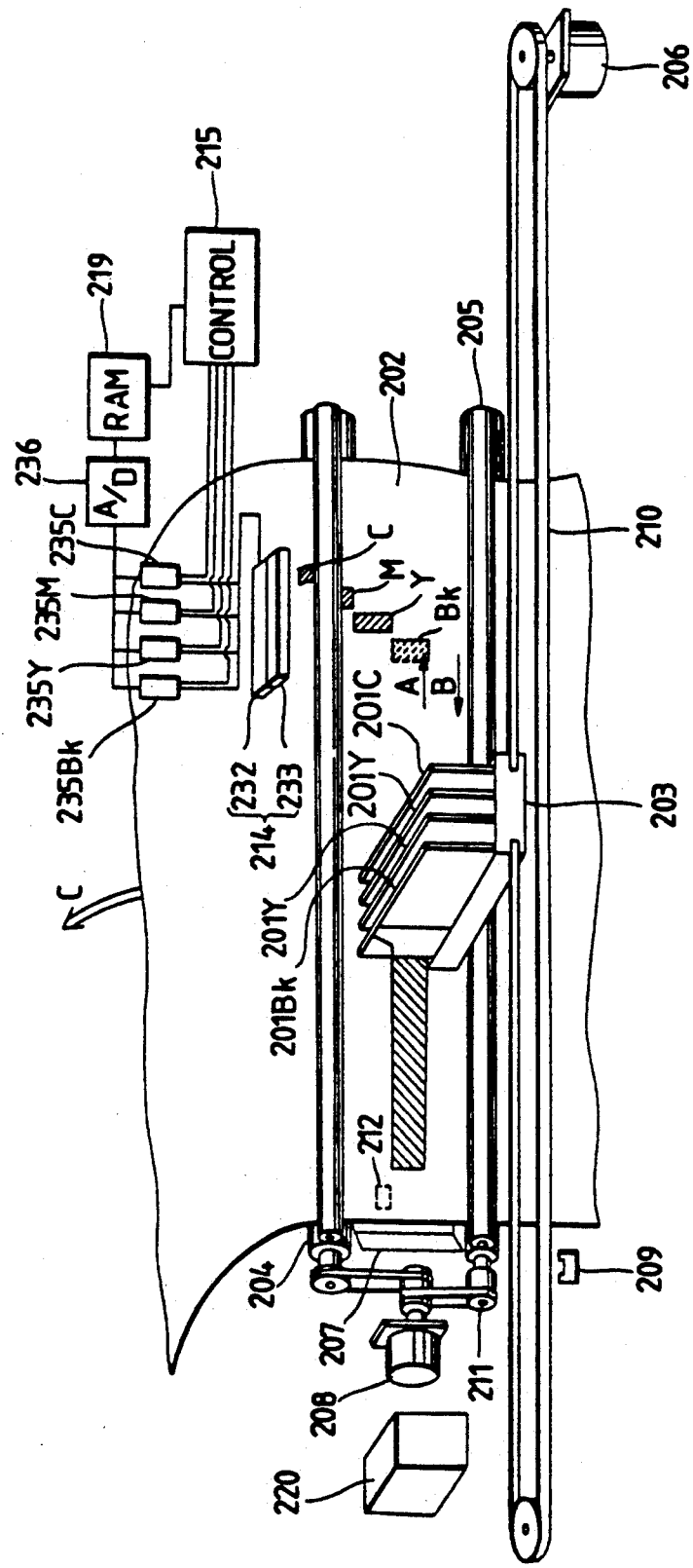
FIGS. 50 and 51 are views showing the ninth and tenth embodiments of the present invention, respectively.

FIG. 50 shows the ninth embodiment obtained by applying the present invention to a serial printer type apparatus. In this embodiment, when test patterns are to be recorded on a recording medium 20 upon selective scanning of a carriage having recording heads 201C, 201Y, 201Y, and 201BK in directions indicated by arrows A and B, a test pattern is recorded by each recording head every scanning cycle of the carriage 203. After the reading line sensor 232 reads the test pattern recorded on the recording medium 202, the carriage 203 is scanned again, and another test pattern is recorded on the recording medium 202 by the next recording head.

According to this embodiment, by reading each test pattern recorded on the recording medium by each recording head in units of colors, the capacity of the RAM 219 for storing the test pattern read data can be reduced to ¼, thereby further simplifying the structure of the apparatus.

Figure 51:
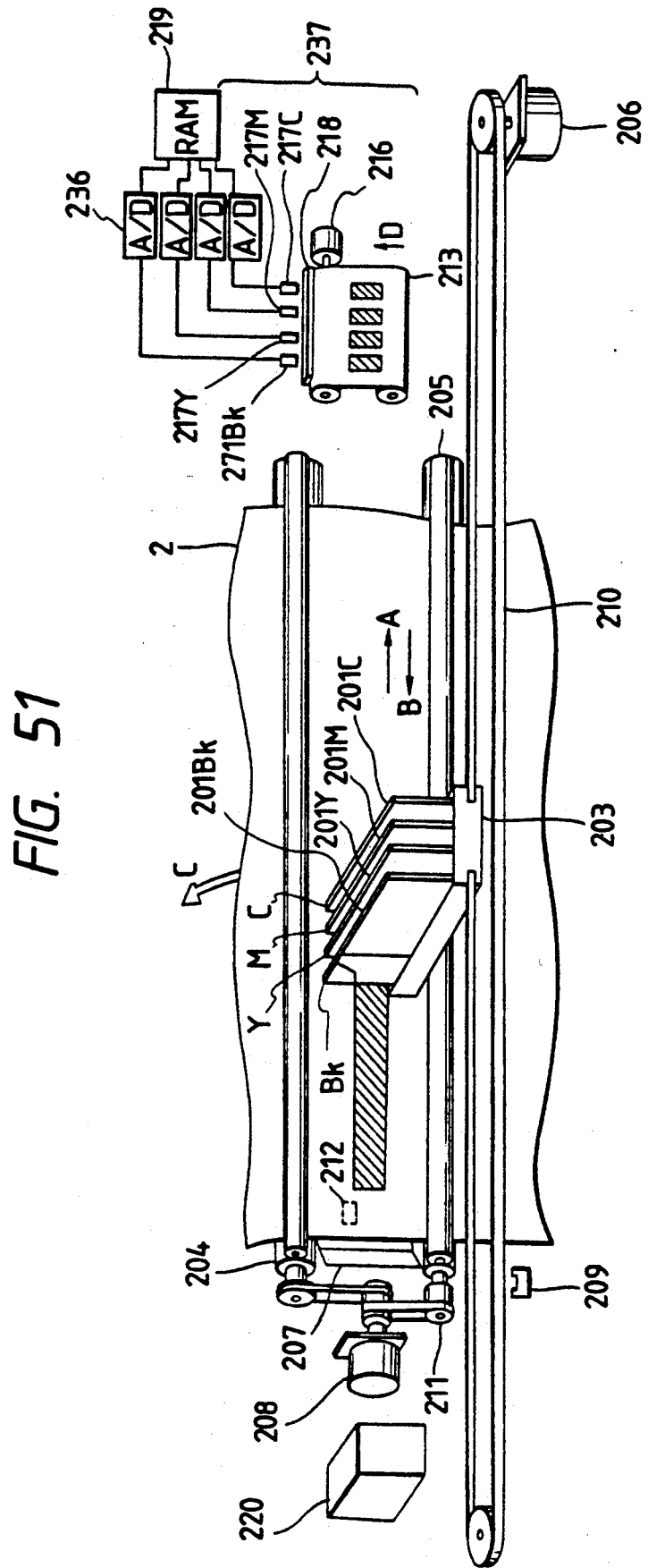

FIG. 51 schematically shows the tenth embodiment obtained by applying the present invention to a serial printer type apparatus. In this embodiment, a test pattern recording unit for causing a recording head to record a test pattern, and an uneven image density correction unit 237 comprising by a test pattern reading unit, are arranged outside an image recording area.

In this embodiment, when an uneven image density state of the test pattern is stabilized, after a test pattern is recorded on a test pattern recording sheet 231 of a test pattern recording unit by each recording head, the test pattern recording sheet 213 is conveyed to the uneven image density reading unit.

As described above, according to the present invention, final unevenness correction data is obtained from unevenness correction data of a plurality of test images having different densities, e.g., the average value of the unevenness correction data, thereby obtaining a sufficient unevenness correction effect for an image having any image density.

Figure 52A:
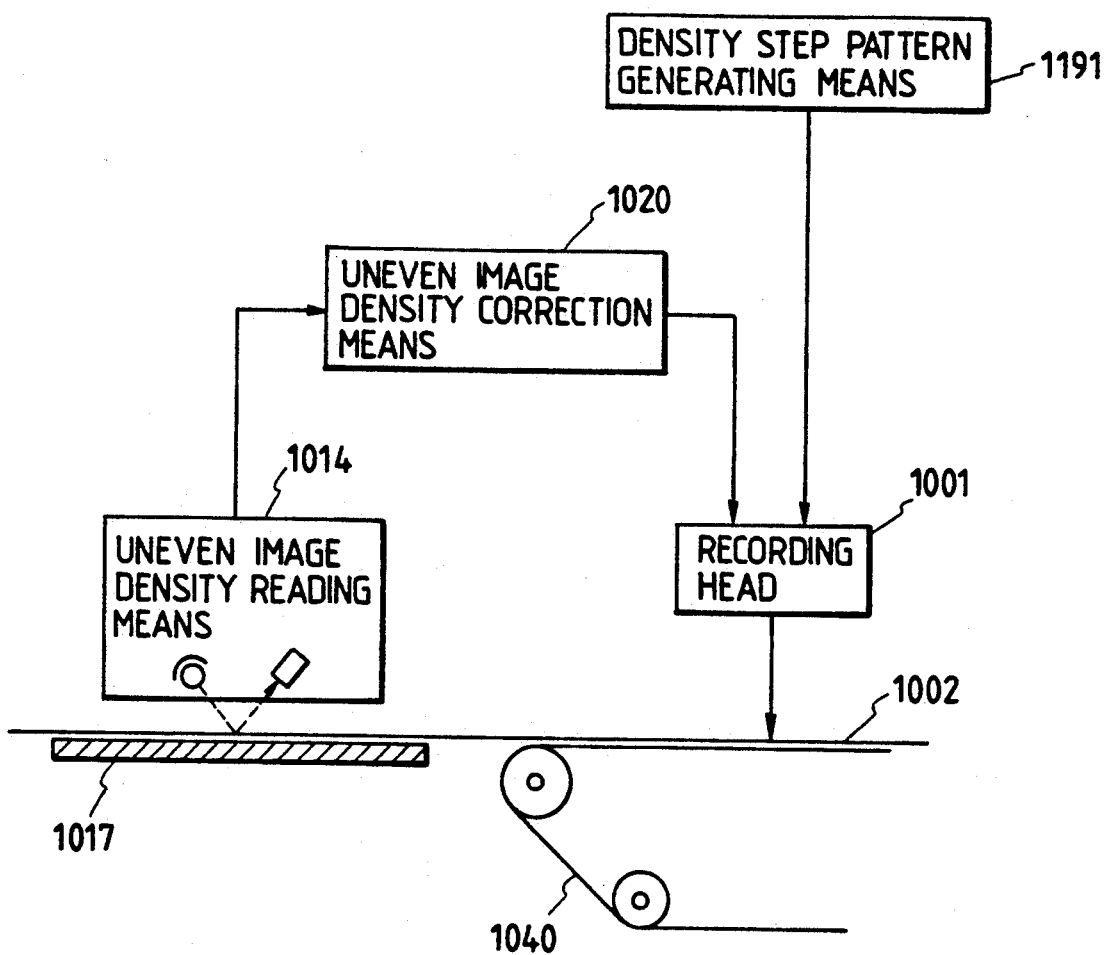
FIGS. 52A and 52B are views showing the principle of the eleventh embodiment of the present invention.

The eleventh embodiment of the present invention will be described with reference to FIGS. 52A and 52B. The same reference numerals as in FIG. 18 denote the same parts in FIGS. 52A and 52B. A density step pattern generating means 1191 changes a print ratio (to be referred to as a print duty hereinafter) prior to uneven image density correction processing, appropriately drives the recording head, and forms a test pattern whose density is changed stepwise. The print ratio (print duty) is defined as the ratio between a dot count, assignable to a pixel, and a maximum dot count when each pixel, for forming a recording image, comprises a plurality of dots recorded on the recording medium with ink injected from each orifice. Alternatively, the print duty is defined as the ratio between a print dot count and a maximum dot count representing dots which can be recorded in a unit area.

A test pattern or uneven image density read means 1014 reads a test pattern which is formed on a recording medium 1002 with a recording head 1001, the density of which is changed stepwise so as to correct the uneven image density. The read means 1014 includes a light source for emitting light onto the surface of the recording medium, a sensor for receiving light reflected by the surface of the recording medium, and an appropriate converter. An uneven image density correction means 1020 corrects drive conditions of the recording head so as to suppress the uneven image density in accordance with density data read from test patterns.

Figure 52B:
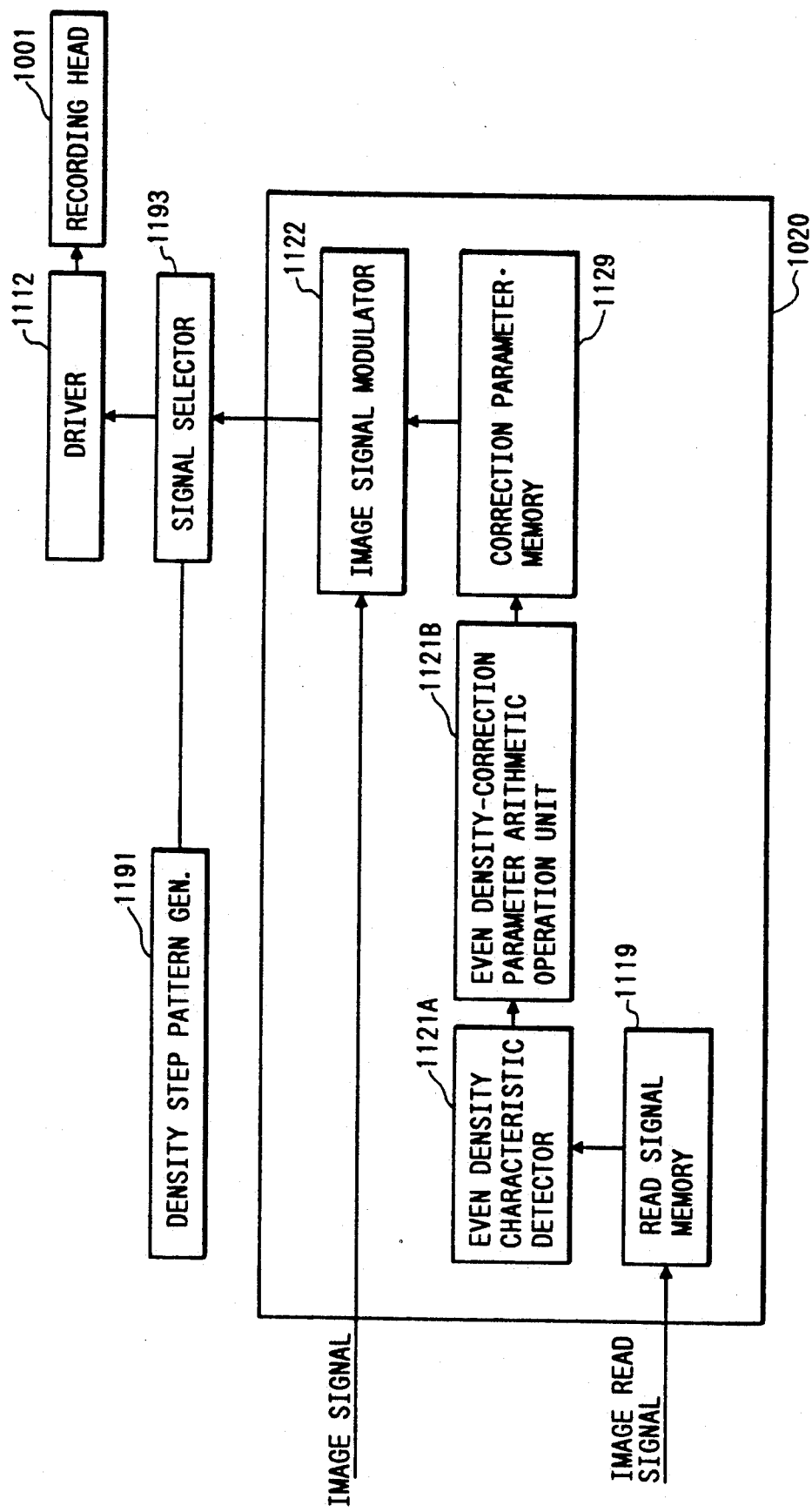

FIG. 52B is a view showing a detailed arrangement of the uneven image density correcting means 1020. A read signal memory 1119 stores read signals of test patterns read by the uneven image density read means 1014. The read signal memory 1119 stores the read signals in units of steps set by the density step pattern generating means 1191 in correspondence with the orifice positions. An even density characteristic detector 1121A detects a print duty of each orifice when a predetermined density is obtained.

When a print duty of a standard orifice is given as 50%, the corresponding density is defined as 0.55. In practice, this density is not often obtained at the above print duty, there is an orifice for obtaining this density at a print duty of 46% and an orifice for obtaining this density at a print duty of 58%. This phenomenon causes uneven image density. In this embodiment, test patterns are formed while a print duty is changed stepwise so as to change the corresponding density stepwise. A print duty corresponding to a predetermined density (e.g., 0.55) is extracted in units of orifices, and the result is defined as an even density characteristic.

An even density-correction parameter arithmetic operation unit 1121B calculates an optimal correction parameter to obtain an even density in accordance with the detected even density characteristic. A memory 1129 stores the correction parameters in units of orifices. A modulator 1122 modulates image signals in accordance with correction parameters. A signal selector 1193 selects an output from the image signal modulator 1122 and selectively supplies it to a driver 1112 for the recording head 1001.

The read signal memory 1119 having the above arrangement corresponds to the RAM 119 in FIG. 34, the correction parameter memory 1129 corresponds to the unevenness correction RAMs 129C, 129M, 129Y, and 129Bk, and the image signal modulator 1122 corresponds to the unevenness correction tables 122C, 122M, 122Y, and 122Bk (or may include the gradation correction tables 130C to 130Bk and 131C to 131Bk). The even density characteristic detector 1121A and the even density-correction parameter arithmetic operation unit 1121B can be realized as functions of the CPU 101. The signal selector 1193 can also be realized as a function of the CPU 101, i.e., selectively outputting a density step pattern generation signal and the modulated image signal to the driver.

The density step count of the test pattern can be appropriately determined. Even if the step count is considerably small, an even density characteristic can be obtained by appropriate interpolation.

Figure 53:
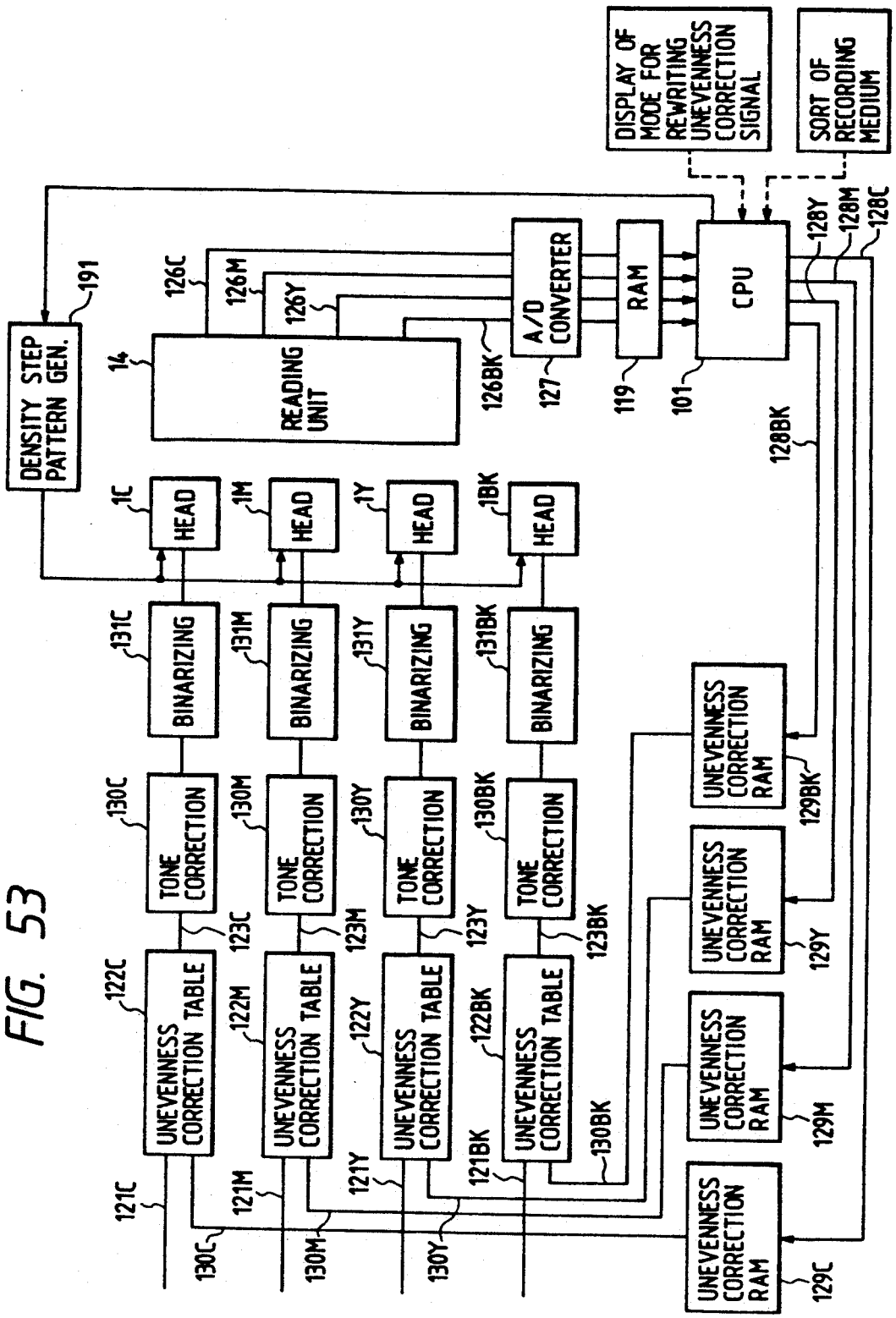
FIG. 53 is a block diagram showing a detailed arrangement showing an uneven image density correction system.

The same mechanical arrangement, the reading system, and the control system as in the sixth embodiment are used, and a detailed description thereof will be omitted. FIG. 53 shows a detailed arrangement of a system for correcting an uneven image density of the embodiment. A density step pattern generator 191 (corresponding to the density step pattern generating means 1191) is arranged in place of the coefficient indication means 180 in FIG. 34.

Figure 54:
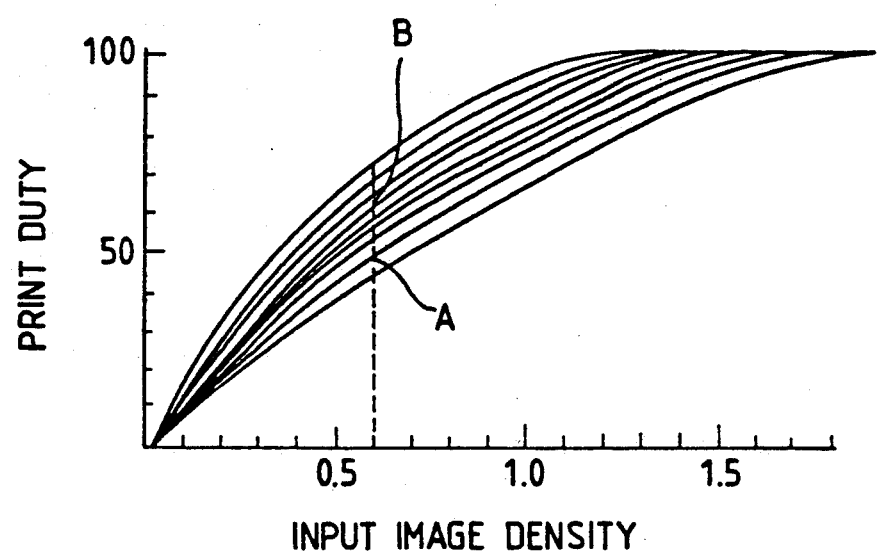
FIG. 54 is a view for explaining an unevenness correction table used in this embodiment.

FIG. 54 shows an unevenness correction graph or table. In this embodiment, the unevenness correction table has a plurality of different correction curves in a relationship between the input image density and the print duty. Correction curves are selected in accordance with unevenness correction signals 130C to 130BK. A correction curve having a print duty coinciding with the print duty obtained by an even density characteristic detection operation at a predetermined input image density is selected to correct an image signal (to be described later).

Unevenness correction RAMs 129C to 129BK store selection signals of correction curves necessary for correcting unevenness values of the heads. More specifically, the unevenness correction RAMs 129C to 129BK store correction signals respectively corresponding to the plurality of correction curves, the number of correction signals being equal to the number of orifices. Unevenness correction signals 130C to 130BK are output in synchronically with the input image signals. Signals 123C to 123BK unevenness-corrected by the correction curves selected by the unevenness correction signals are input to gradation correction tables 130C to 130BK. The gradation characteristics of the heads are corrected, and the corrected signals are output. The resultant signals are binarized by binarizing circuits 131C to 131BK. The binary signals then drive the heads 1C to 1BK through head drivers, thereby forming a color image.

Figure 55:
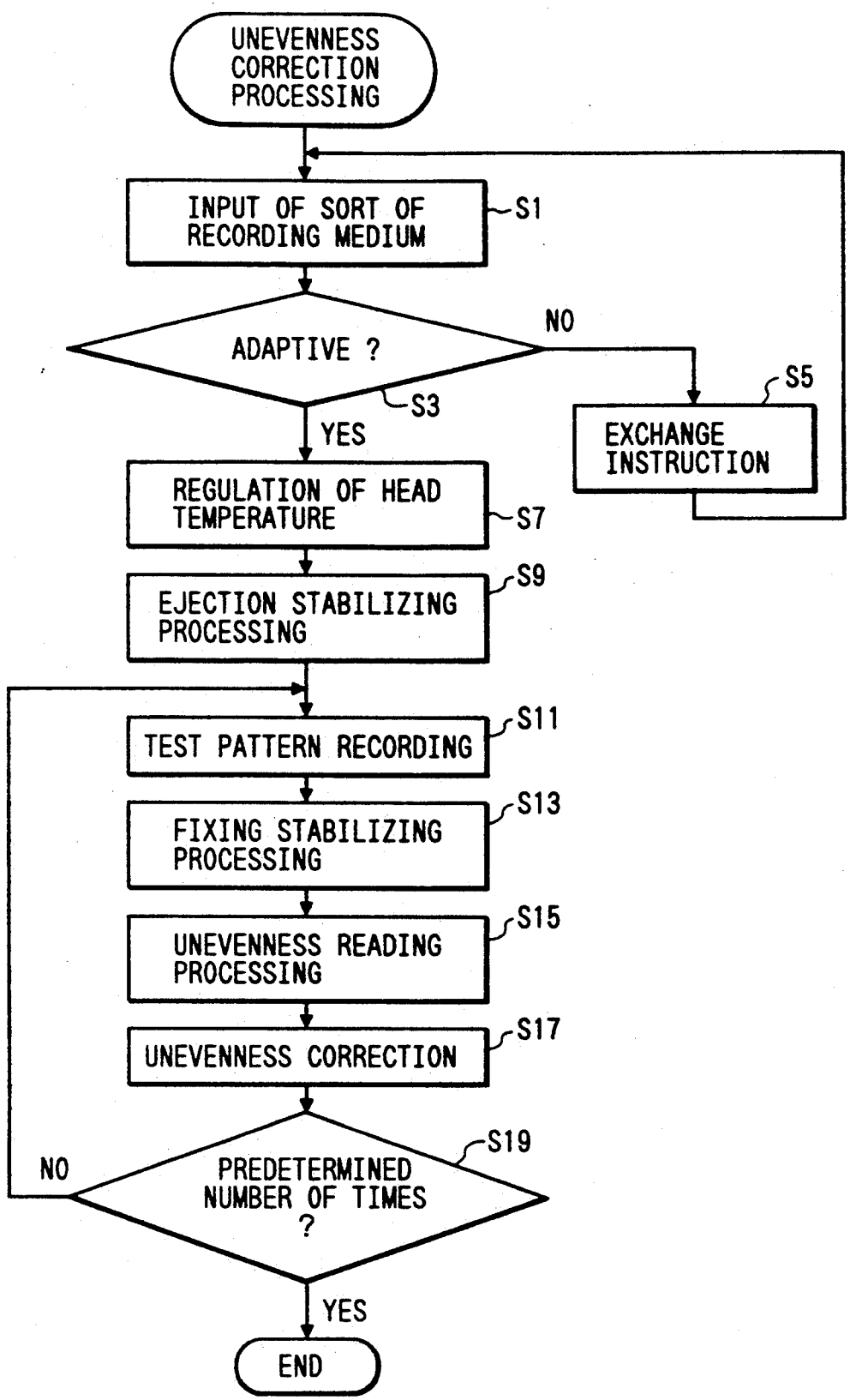
FIG. 55 is a flow chart showing an unevenness correction sequence of this embodiment.

FIG. 55 shows an unevenness correction processing sequence of this embodiment. Steps S1 to S9 in FIG. 55 are the same as steps S1 to S9 in FIG. 36, and a detailed description thereof will be omitted.

When injection or ejection stabilizing processing in step S9 is completed, predetermined patterns are recorded by the recording heads 1C to 1BK in step S11 (to be described in detail later), and uneven image densities are read from these test patterns. Test pattern recording and uneven image density reading will be described with reference to a timing chart in FIG. 42.

FIG. 42 is a timing chart showing an operation of the apparatus of this embodiment. An uneven image density correction processing sequence is started at a time a. The recording medium 2 is conveyed to the image recording area at a timing b upon completion of the above processing. The main scanning motor is driven at a timing c. The drivers for the cyan, magenta, yellow, and black recording heads 1C, 1M, 1Y, and 1BK are driven at times d, e, f, and g, and test patterns are recorded on the recording medium 2. These test patterns are used for reading uneven image densities. At this time, all the gradients of the characteristic curves of the unevenness correction tables are set to be 1.0, and no unevenness correction is performed. In this case, a uniform halftone pattern is used, and a print duty falls within the range of about 30 to 75%.

When the test patterns are recorded on the recording medium 2 by the recording heads, inks injected from the recording heads may not be immediately absorbed on recording media depending on their types, and uneven image densities of the test patterns recorded on the recording medium 2 are not immediately stabilized.

In this embodiment, until the uneven image density of the test pattern recorded by each recording head is stabilized, conveyance of the recording sheet is stopped for a predetermined period of time upon completion of recording of the test patterns by the recording heads so as to not to cause the uneven image density reading unit 14 to read the uneven image density of the test pattern (step S13 in FIG. 55). After the uneven image density of each test pattern is stabilized, the recording medium is conveyed at a time i. When the C pattern reaches the reading unit, the recording medium is stopped. The reading sensor 17 is driven at a time j, and the uneven image density of the C test pattern is read. Thereafter, uneven image densities of the M, Y, and BK color components are read at times k, l, and m, respectively.

The apparatus of this embodiment may be operated in accordance with the timing chart shown in FIG. 43.

Unevenness reading is performed in step S15 of FIG. 55 after fixing stabilization is completed. That is, unevenness values are read from the test patterns of the respective color components, and unevenness correction data for the respective heads are rewritten.

In this embodiment, the unevenness reading sensor 71 comprises a single sensor. Read outputs from a sensor vary depending on different colors.

In this embodiment, a ratio of sensor outputs of the respective colors is predetermined as in the sixth embodiment. A reciprocal value of this ratio is multiplied with a sensor output under the control of the CPU 101 at the time of unevenness reading, thereby performing unevenness correction on the basis of the resultant product.

The sensor output need not be performed by an arithmetic operation in the CPU 101 but may be performed in a circuit connected to the input of the CPU 101.

When the A/D converter 127 comprises, e.g., an 8-bit A/D converter, an output value of each color must be converted into 8-bit digital data of the dynamic range. This is very effective against a decrease in resolution of the read data of each color for to the same reason as described with reference to FIGS. 44, 45A and 45B.

Unevenness correction is performed in step S17 of FIG. 55 on the basis of the above operations. More specifically, signals are sampled from the unevenness-free signals. In this case, the number of signals corresponds to the number of orifices. The sampled data are defined as data respectively corresponding to the orifices. For example, these data are defined as $R_1, R_2, \ldots, R_N$ (N is the number of orifices) and are temporarily stored in the RAM 119. The following operation is performed by the CPU 101.

These data are processed and converted into density signals as follows:

$$C_n = -\log(R_n/R_0)$$

where $R_0$ is the constant satisfying condition $R_0 \geq R_n$; $1 \leq n \leq N$.

Figure 56A:
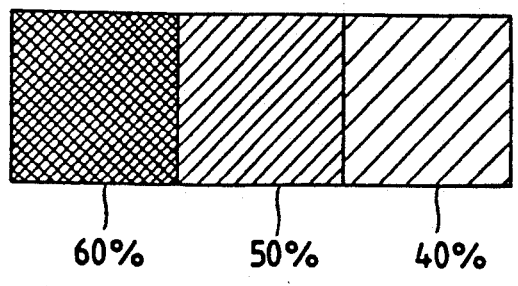
FIGS. 56A, 56B and 56C are views for explaining density correction of this embodiment.

A test pattern ⓒ for correcting an uneven image density, as shown in FIG. 40, is a density step pattern having print duties of 40%, 50%, and 60%, as shown in FIG. 56A in detail. This density step pattern is read by the reading unit 14, and is converted into the density signal, as previously described. This density signal is corrected by the arrangement in FIG. 52B in principle and by the arrangement shown in FIG. 53 in practice.

Figure 56B:
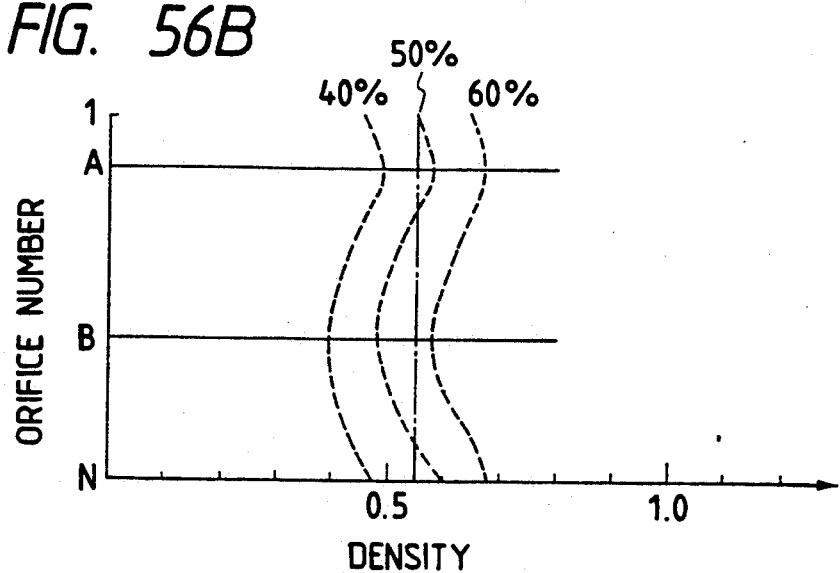

In this density step pattern, if the injection characteristics of the N orifices are uniform, a halftone pattern can be obtained as a uniform image free from unevenness. However, an uneven image density caused by variations in injection characteristics is generally obtained in accordance with an array of N orifices, as shown in FIG. 56B. In the unevenness pattern shown in FIG. 56B, a high density is obtained near an orifice A, and a minimum density is obtained near an orifice B.

Figure 56C:
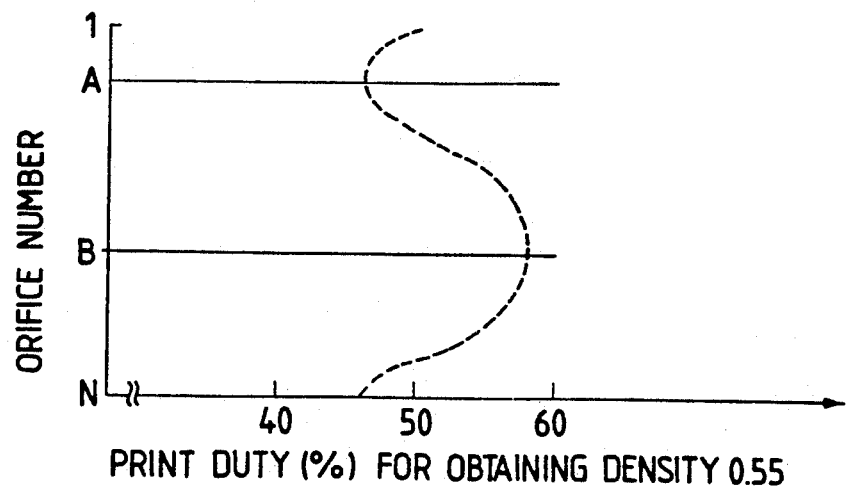

The average density of a recorded image at a print duty of 50% is generally 0.55. An even density characteristic detection operation having a density of 0.55 is performed from the read density signals. That is, a print duty corresponding to the density of 0.55 is obtained for each orifice on the basis of the density signal. The calculation result is shown in FIG. 56C.

An orifice located near the orifice A having the maximum density is found to be set at a print duty of 46%, and an orifice located near the orifice B having the minimum density is found to be set at a print duty of 58%. In this manner, for example, when an image signal designates a recording density of 0.55, print duties of the halftone patterns corresponding to the respective orifices are determined in accordance with the even density characteristic shown in FIG. 56C.

When the even density characteristic of each orifice described above, i.e., a print duty for realizing a density of 0.55 for each orifice, is obtained by an even density characteristic detection arithmetic operation, an even density correction parameter for each orifice is arithmetically calculated. In this arithmetic operation, an optimal correction curve for each orifice is selected from a correction curve shown in FIG. 54 in accordance with the following method. A correction curve, having a print duty coinciding with that corresponding to the density of 0.55 obtained in the even density characteristic detection arithmetic operation, is selected. For example, correction curves A and B in FIG. 54 are selected for the orifices A and B shown in FIGS. 56B and 56C. The resultant correction curves are set in the correction parameter memory 1129 (FIG. 52B) in units of orifice numbers. More specifically, the correction curves stored in the unevenness correction tables 122C to 122Bk are caused to correspond to the orifice numbers in the unevenness correction RAMs 129C to 129Bk shown in FIG. 53 in units of orifice numbers, thereby setting the correction curves.

The correction may be performed every predetermined number of orifices, i.e., in units of orifice groups. In this case, test pattern reading may be performed in units of groups.

After determination step S19 in FIG. 55 is completed, the test patterns are recorded again with the recording heads in accordance with correction data. The test patterns recorded by the recording heads are read by the uneven image density reading unit 14 again to calculate the uneven image density correction data. These operations are repeated to complete the uneven image density correction operation.

By single processing for each recording medium, recording of test patterns with each recording head a plurality of times, reading by means of the uneven image density reading unit 14, and uneven density correction data calculations can be automatically repeated. Uneven image density correction precision of each recording head can be improved even if this recording head cannot perform satisfactory unevenness correction in one cycle. A total correction time can be shortened.

According to the uneven image density correction operations based on test pattern printing and reading of this embodiment, since correction is performed on the basis of a plurality of density patterns, sufficiently accurate uneven image density correction can be performed by a single cycle or a few cycles each consisting of pattern reading and correction.

Figure 57:
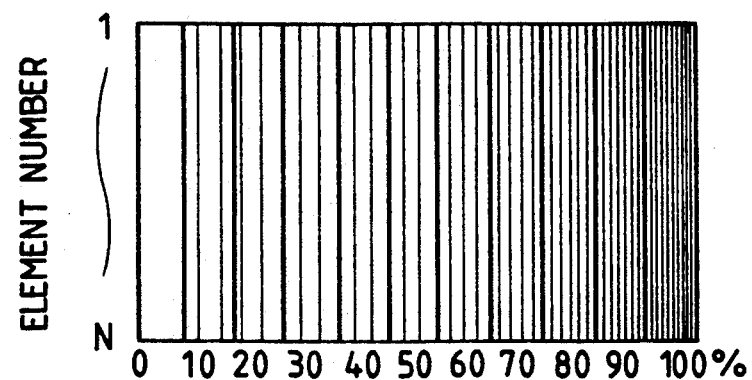
FIG. 57 is a view showing another test pattern.

FIG. 57 shows another density step pattern shown in FIGS. 56A and 56B. The value of this step pattern is increased by eleven steps every 10% from a print duty of 0% to a print duty of 100%. Correction curves of all the orifices are set to be three densities of 0.25, 0.5, and 1.0 in accordance with an even density characteristic detection arithmetic operation. According to the resultant correction parameters, accurate correction can be performed in a wide range from a low region to medium and high density regions, thereby obtaining a high-quality image.

Uneven image density correction of each embodiment described above has been described with reference to an ink-jet recording head. However, correction can be similarly performed for a thermal recording head using thermal paper. This will be described as the twelfth embodiment with reference to FIGS. 58A to 58C.

Figure 58A:
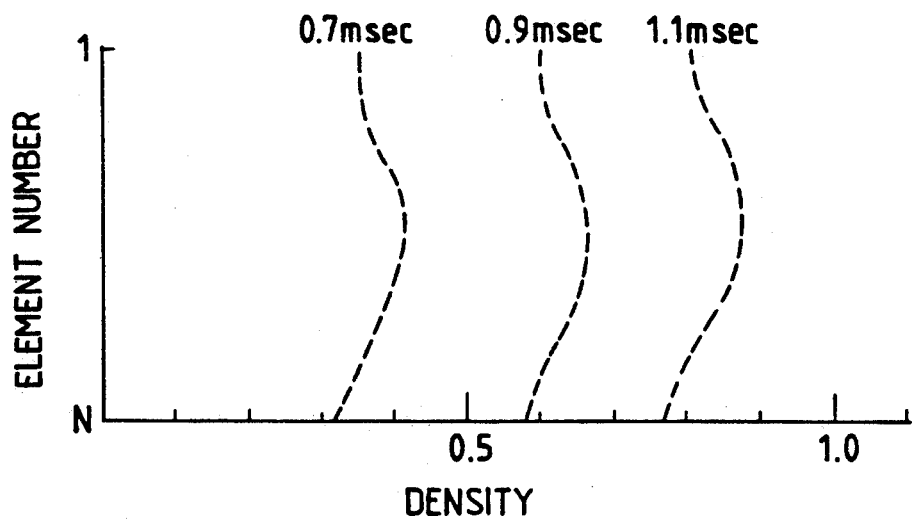
FIGS. 58A, 58B and 58C are graphs for explaining density correction according to the twelfth embodiment of the present invention.
Figure 58B:
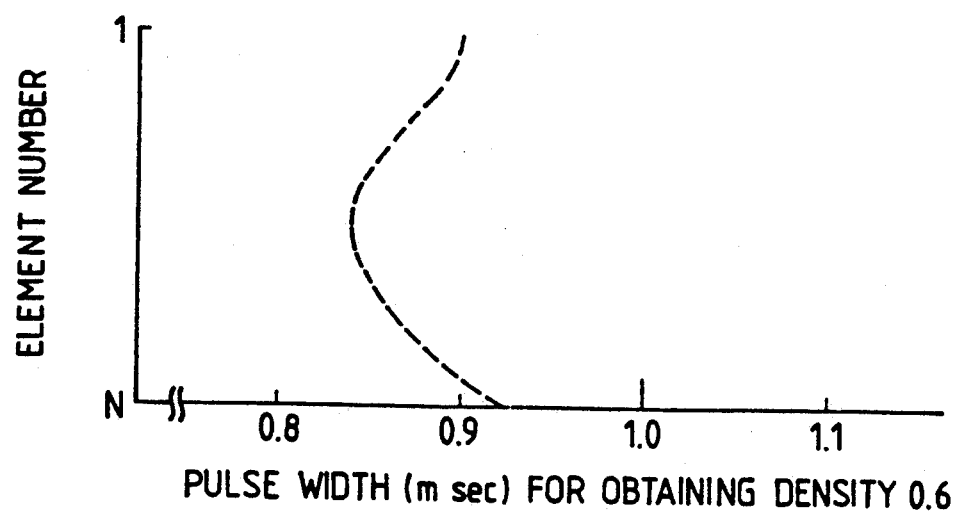
Figure 58C:
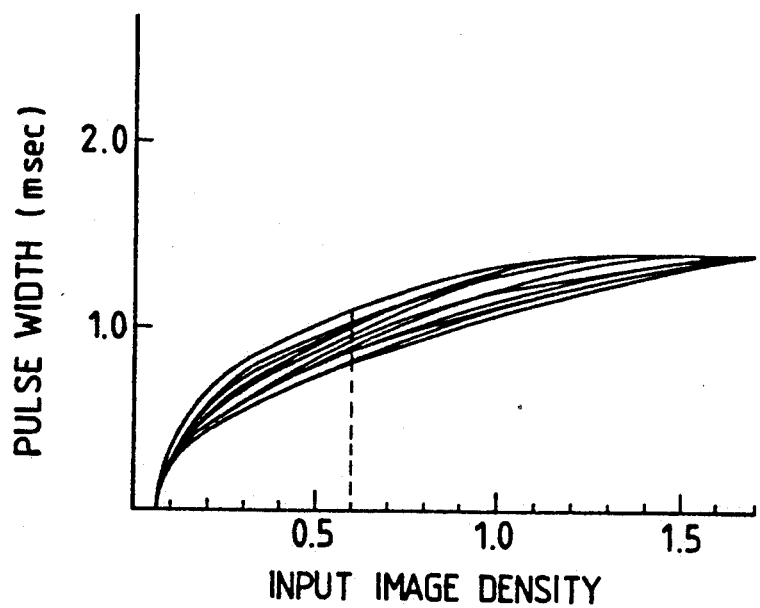

Images having a print duty of 100% are output in three density step patterns at three pulse widths of 0.7, 0.9, and 1.1 msec, and test patterns are similarly obtained as in FIG. 56A. A density distribution obtained by reading these test patterns is shown in FIG. 58A. A result obtained in an even density characteristic detection arithmetic operation for a density of 0.6 on the basis of the density distribution of FIG. 58A is shown in FIG. 58B. A correction curve graph or table representing even density correction parameters obtained on the basis of the pulse widths in units of heating elements obtained by this arithmetic operation is shown in FIG. 58C.

As described above, according to this embodiment, a test pattern having different densities changed stepwise is formed, and a drive condition given for every recording element or every predetermined number of recording elements, which corresponds to a predetermined density, can be determined by a smaller number of pattern prints and detection operations. Since the recording elements are driven at the time of image formation on the basis of the determination results, accurate uneven image density correction can be performed within a short period of time.

Figure 59:
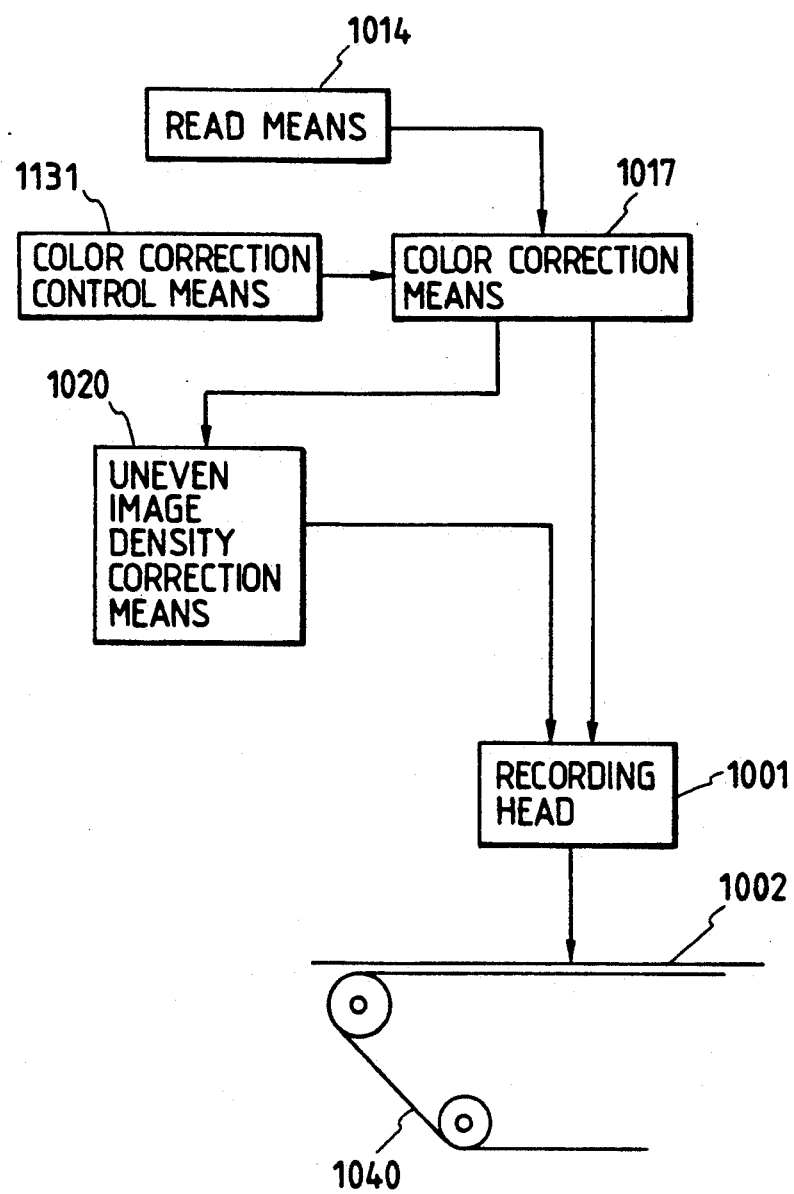
FIG. 59 is a diagram for explaining the principle of the thirteenth embodiment of the present invention.

The thirteenth embodiment of the present invention will be described with reference to FIG. 59. The same reference numerals as in FIG. 18 denote the same parts in FIG. 59, and a detailed description thereof will be omitted.

A read means 1014 reads a color original and outputs color signals for to recording. The read means 1014 includes a light source for emitting light onto a surface of a recording medium and a sensor for receiving light reflected by the surface of the recording medium. An uneven image density correction means 1020 corrects recording head drive conditions in the recording mode in accordance with uneven image densities read from test patterns.

A color correction means 1017 performs appropriate correction of the color signals output from the read means 1014. In a normal copying mode, an output from the color correction means 1017 is supplied to recording head 1001. A control means 1131 causes the color correction means 1017 to perform different correction operations in a normal original image read mode and a test pattern read mode.

In the above and following embodiments, the read means is arranged as a source for outputting image data. However, an appropriate means other than the read means may be used.

Figure 60:
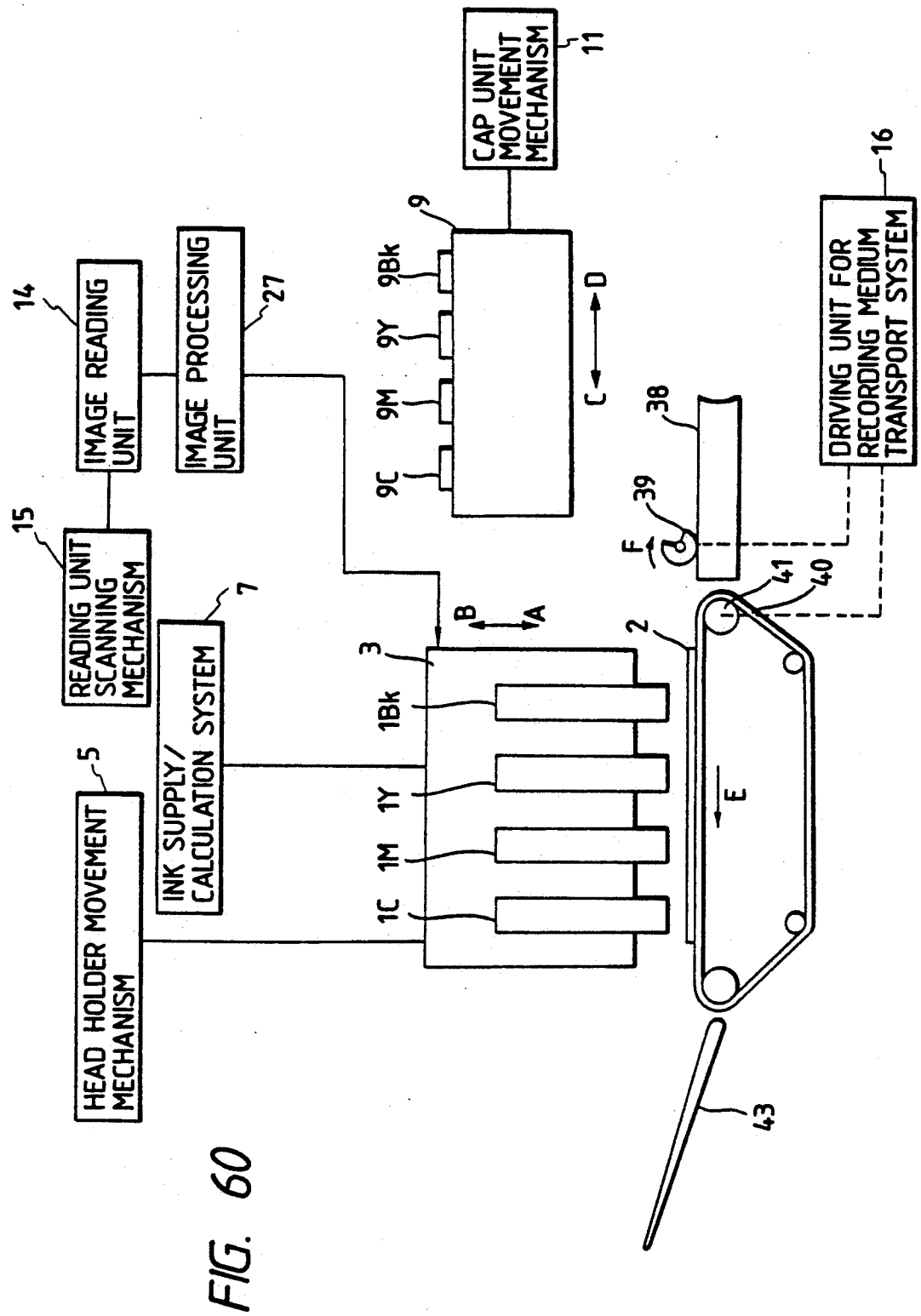
FIG. 60 is a schematic side view of a line printer type ink-jet recording apparatus according to the present invention.

FIG. 60 shows a schematic arrangement of an image forming apparatus having a recording unit comprising an ink-jet recording apparatus according to the thirteenth embodiment of the present invention. The same reference numerals as in the sixth embodiment of FIG. 19 denote the same parts in FIG. 60, and a detailed description thereof will be omitted.

An image reading unit 14 is arranged integrally with or separately from a recording apparatus. The image reading unit 14 is used to read an original image in a normal copying mode and a test pattern in an uneven image density correction mode. A reading unit scanning mechanism 15 moves the reading unit 14 for scanning. These components will be described in detail with reference to FIG. 61. An image processing unit 27 processes the read image data (t be described in detail with reference to FIG. 63).

In uneven image density correction, a separate original having test patterns may be read by the reading unit 14, or test patterns are formed on recording media stored in a cassette 38. In the latter case, a pickup roller 39 is rotated in a direction of an arrow F as in the normal recording mode to feed the recording medium 2 onto a conveyor belt 40. Upon rotation of rollers 41, the recording medium 2 is conveyed together with the conveyor belt 40 in a direction of an arrow E. At this time, each recording head is driven to record each test pattern on the recording medium 2. The recording medium on which the test patterns are recorded is discharged onto a tray 43.

Thereafter, the recording medium on which the test patterns are recorded is set in the reading unit 14, and the test patterns recorded on the recording medium are read by a reading sensor or the like.

Figure 61:
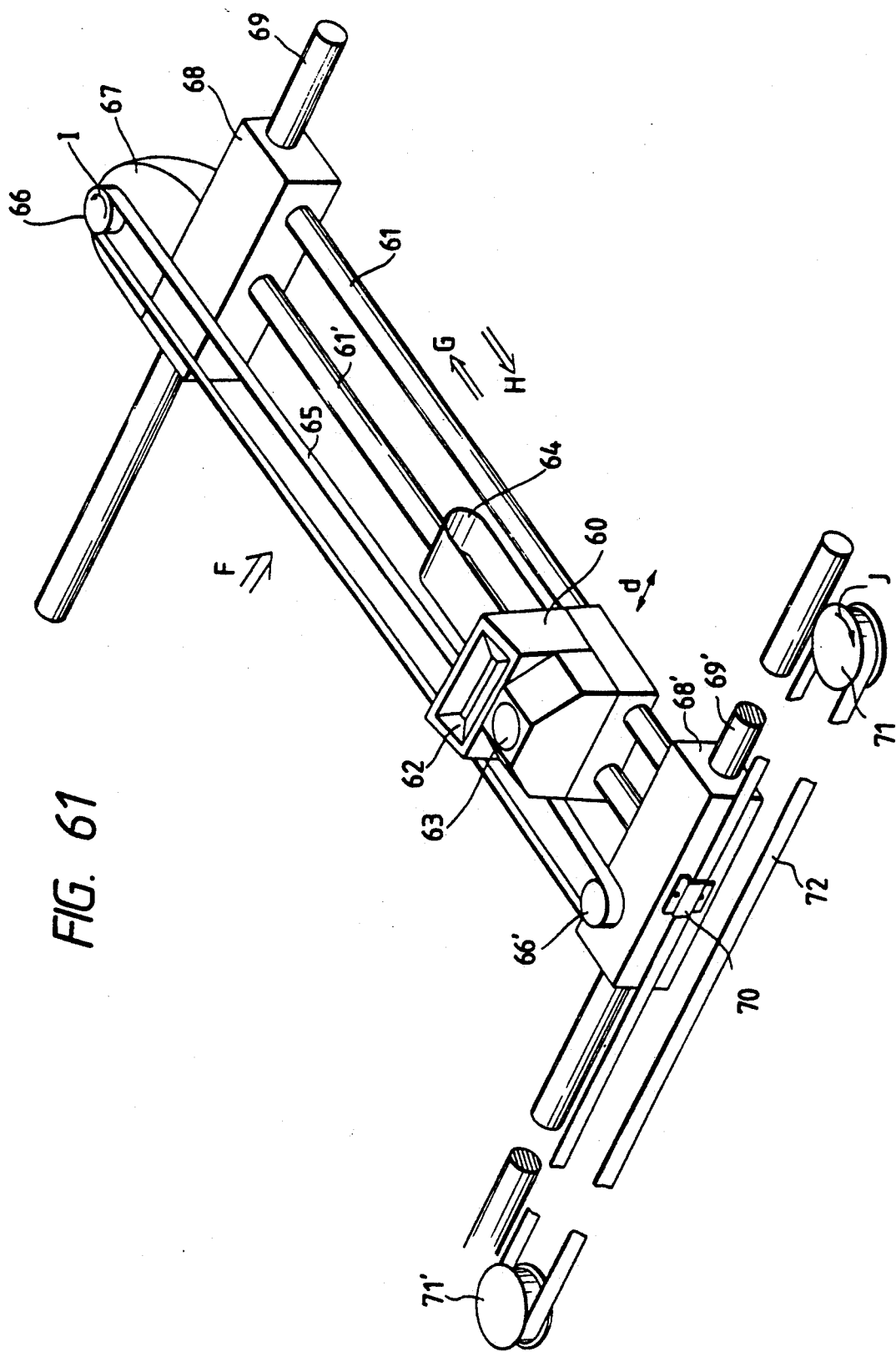
FIG. 61 is a perspective view of a reading unit and its scanning mechanism in the apparatus shown in FIG. 60.

FIG. 61 shows a structure of the reading unit and its scanning mechanism of this embodiment.

A transparent glass plate or the like is placed on a scanning portion of a reading head 60. An original faces downward and is placed on the transparent glass plate, so that an image on the original 2 can be read by the reading head 60. The illustrated position of the reading head 60 is the home position of the reading head 60 in FIG. 61.

Referring to FIG. 61, the reading head 60 is slid along a pair of guide rails 61 and 61' to read an image. The reading head 60 comprises an original illumination light source 62, a lens 63 for focusing an original image on a photoelectric conversion element group such as a CCD, or the like. A flexible cable 64 supplies power to the light source 62 and the photoelectric conversion group and transmits image signals and the like from the photoelectric conversion elements.

The reading head 60 is fixed to a driving force transmission portion 65 such as a wire of a main scanning direction (G and H directions) perpendicular to a recording medium convey direction. The driving force transmission portion 65 of the main scanning direction is looped between pulleys 66 and 66' and is moved upon rotation of a main scanning pulse motor 67. Upon rotation of a main scanning pulse motor 67 in a direction of an arrow I, the reading head 60 is moved in the direction of the arrow G and reads image line information in a direction perpendicular to the main scanning direction of the arrow G in units of bits corresponding to the photoelectric conversion element group.

When the image is read by a predetermined width, the main scanning pulse motor 67 is rotated in a direction opposite to that of the arrow I. At this time, the reading head 60 is moved in the direction of the arrow H and returns to the initial or home position.

Carriages 68 and 68' are slid along guide rails 69 and 69' in a sub-scanning (F) direction almost perpendicular to the main scanning direction of the arrow G. The carriage 68' is fixed to a driving force transmission portion 72 for the sub-scanning (F) direction such as a wire looped between pulleys 71 and 71'.

Upon completion of main scanning G, the pulley 71 is rotated by a sub-scanning driving source (not shown) such as a pulse or servo motor in the direction of the arrow J and is moved by a predetermined distance (i.e., a distance d equal to the reading image width in the main scanning G direction). The carriages 68 and 68' are sub-scanned in the direction of the arrow F and are stopped. At this position, main scanning G is started again. The original image can be entirely read by repeating main scanning in the direction of the arrow G, a return operation in the main scanning direction of the arrow H, and sub-scanning in the direction of the arrow F.

The original may be sub-scanned in place of sub-scanning the reading unit. If a sensor comprises a full-line sensor, a mechanism associated with main scanning can be omitted.

An image signal read from each test pattern is sent to an image forming unit and is subjected to recording head drive condition correction (to be described later).

Scanning of the reading head having the structure shown in FIG. 61 will be described below.

As described above, the pulse motor 67 is driven to scan the reading unit 14, i.e., the reading head 60, fixed to the wire connected to the pulse motor or the driving force transmission portion 65 such as a timing belt in the main scanning direction of the arrow G, thereby causing a reading sensor, such as shown in FIG. 24, element 73, to read the image recorded on the original 2.

Figure 32C:
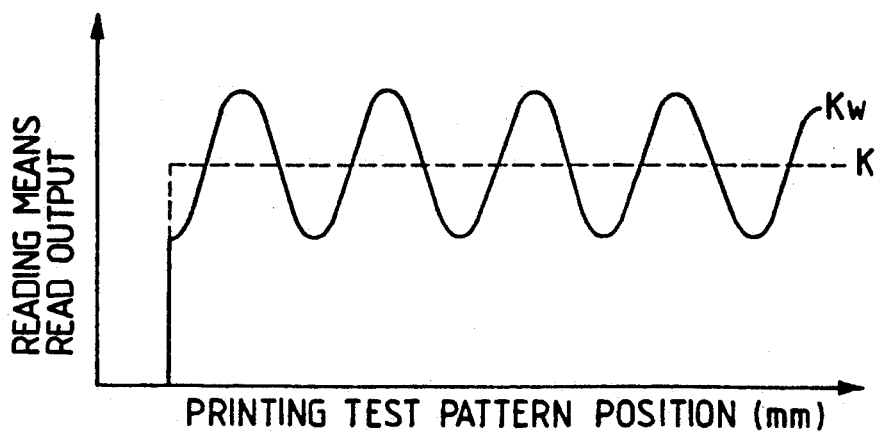

In this embodiment, when the pulse motor 67 is to be driven by a control circuit (not shown) to convey a control circuit (not shown), the pulse motor 67 drives the reading unit convey system at a frequency different from the resonance frequency of the reading unit convey system, as described with reference to FIGS. 31 to 32C.

In this embodiment, the, reading unit 14 is driven at a frequency $f_1$ other than the resonance frequency of the reading unit convey system to read the image at a constant read speed v, thereby accurately reading the image without receiving influences of vibrations of the convey system.

The control system of the apparatus having the above arrangement by coupling the above components will be described below.

Figure 62:
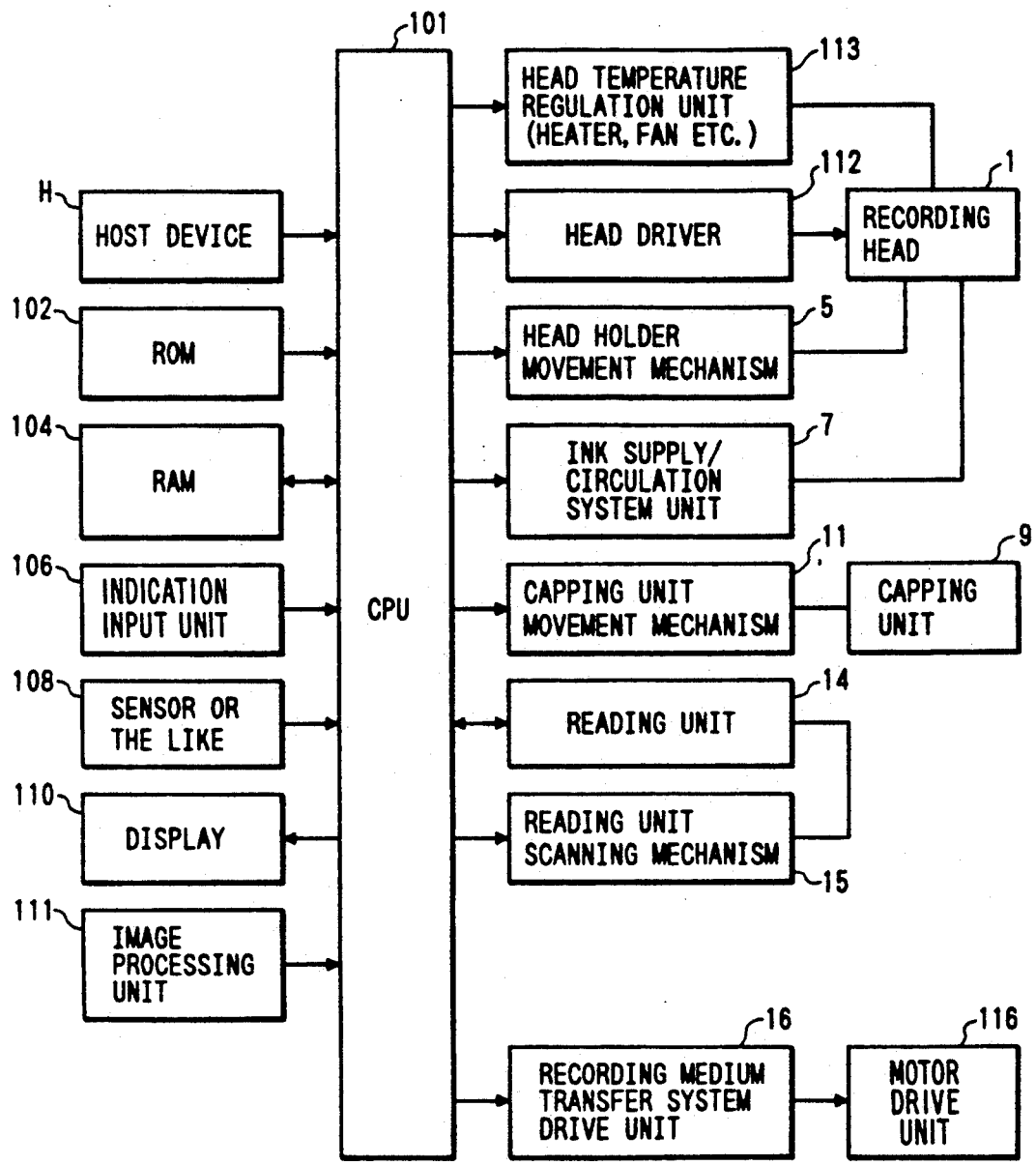
FIG. 62 is a block diagram showing an arrangement of a control system of the ink-jet recording apparatus shown in FIG. 60.

FIG. 62 shows an arrangement of the circuit system. This arrangement is the same as that of FIG. 33 except that the driving unit 114 for the filter switching unit is omitted, and a detailed description of the respective components will be omitted.

The image processing unit and the uneven image density correction unit as preprocessing units of this embodiment will be described below.

Figure 63:
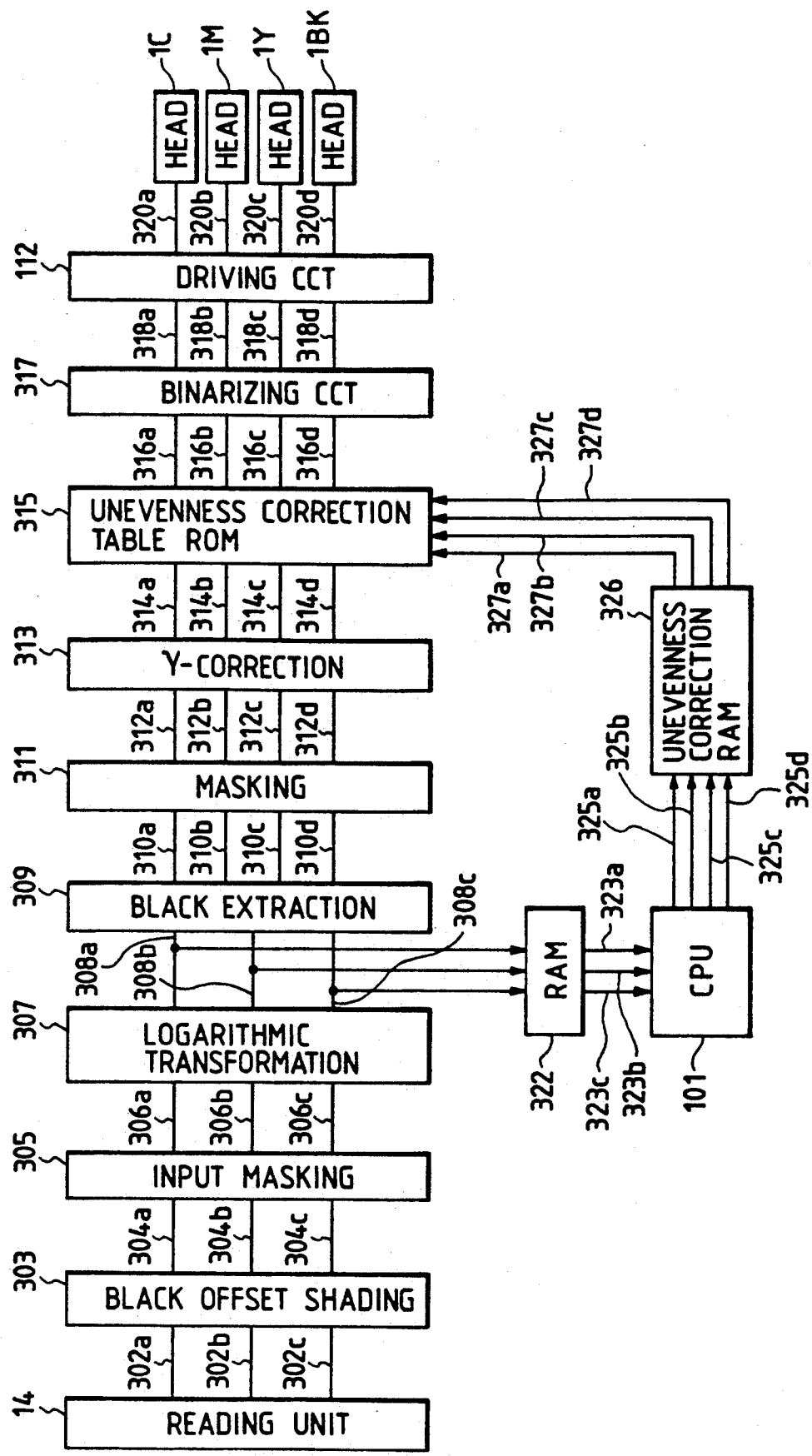
FIG. 63 is a block diagram showing a detailed arrangement of a system for performing image processing and uneven image density correction.

FIG. 63 shows an arrangement of the image processing unit and the uneven image density correction unit. The reading unit outputs R, G, and B read signals 302a, 302b, and 302c. These signals are input to a black offset-shading correction circuit 303. The black offset.shading correction circuit 303 outputs signals 304a, 304b, and 304c. These signals are input to an input masking circuit 305. The input masking circuit 305 outputs signals 306a, 306b, and 306c. These signals are input to a logarithmic transformation circuit 307. The logarithmic transformation circuit 307 outputs signals 308a, 308b, and 308c. These signals are input to a black extraction circuit 309. The black extraction circuit 309 outputs black-extracted C, M, Y, and Bk signals 310a, 310b, 310c, and 310d. These signals are input to a masking circuit 311. The masking circuit 311 outputs masked signals 312a, 312b, 312c, and 312d. These signals are input to a γ correction circuit. The γ correction circuit 313 outputs γ-corrected signals 314a, 314b, 314c, and 314d. These signals are input to an unevenness correction table ROM 315 which is located in an area of the ROM 102.

The unevenness correction table ROM 315 outputs corrected signals 316a, 316b, 316c, and 316d. These signals are input to a binarizing circuit 317. The binary circuit 317 outputs binary signals 318a, 318b, 318c, and 318d. These signals are supplied to cyan, magenta, yellow, and black recording heads 1C, 1M, 1Y, and 1Bk through a driving circuit (driver) 112 as drive signals 320a, 320b, 320c, and 320d. A RAM 322 stores data read from test patterns. The RAM 322 and an unevenness correction RAM 326 are allocated in an area of the RAM 104.

Signal processing in a normal image formation mode will be described below.

An image of an original read by the reading unit 14 having R, G, and B sensors is converted into R, G, and B components. These color components are converted into the digital R, G, and B signals 302a, 302b, and 302c by A/D converters (not shown). These signals are subjected to black offset processing and shading processing by the black offset.shading correction circuit 303.

If a standard black plate and a standard white plate are arranged in an original reading unit including the reading unit 14, the above processing operations can be performed using these plates. The standard black plate is a black plate having an optical density of 2.0, and a value A obtained by reading the standard black plate is stored in units of pixels. The standard white plate is a white plate having an optical density of 0.07. A value B obtained by reading the standard white plate is stored in units of pixels. When a value obtained by reading an original image is given as X, the input signals are converted by the black offset.shading correction circuit as follows:

$$X = \frac{255}{B-A}(X-A)$$

In this case, each output signal from the black offset.-shading circuit 303 is an 8-bit signal and has a maximum value of 255. This processing can correct sensitivity unevenness of the reading sensor and light quantity unevenness in original illumination.

The R, G, and B signals processed as described above are subjected to masking processing in the input masking unit 305. If input signals to the input masking unit 305 are given as R, G, and B, and signals output therefrom are given as R', G', and B', the following relations are obtained:

$$R' = a_{11}R + a_{12}G + a_{13}B$$

$$G' = a_{21}R + a_{22}G + a_{23}B$$

$$B' = a_{31}R + a_{32}G + a_{33}B$$

This processing is performed to compensate for an insufficient spectral sensitivity of the reading sensor and to obtain ideal R, G, and B outputs. By this processing, small arithmetic operation coefficients can be used in the masking unit 311 (to be described below). It is, however, difficult to obtain satisfactory color reproducibility by only input masking. In this sense, input masking is an auxiliary operation.

The R, G, and B signals processed as described above are logarithmically transformed by the logarithmic transformation circuit 307 in accordance with a known method, so that the C, M and Y density signals 308a, 308b, and 308c are output.

These signals are subjected to black extraction by the black extraction circuit 309 as follows:

$$Bk = \min(C, M, Y)$$

The three density signals are converted into four signals, and these four signals are subjected to masking processing in the masking circuit 311. If signals input to the masking circuit 311 are given as C, M, Y, and Bk, and signals output therefrom are given as C', M', Y', and Bk', the following relations are obtained:

$$C' = a'_{11}C + a'_{12}M + a'_{13}Y + a'_{14}Bk$$

$$M' = a'_{21}C + a'_{22}M + a'_{23}Y + a'_{24}Bk$$

$$Y' = a'_{31}C + a'_{32}M + a'_{33}Y + a'_{34}Bk$$

$$BK' = a'_{41}C + a'_{42}M + a'_{43}Y + a'_{44}Bk$$

The above processing is color correction processing. Thereafter, the signals are subjected to γ correction. The γ-corrected signals are subjected to uneven image density correction of the recording heads in the unevenness correction table ROM 315 using the unevenness correction table shown in FIG. 35.

The unevenness correction RAM 326 stores correction straight line selection signals required to correct unevenness of the respective heads. More specifically, the unevenness correction RAM 326 stores unevenness correction signals, the number of which corresponds to the number of orifices and each of which has 61 values from a value of "0" to a value of "60". The unevenness correction RAM 326 outputs correction signals 327a to 327d in synchronically with an input image signal. The signals 316a to 316d whose unevenness states are corrected by the straight line selected by the unevenness correction signals are binarized by the binarizing circuit 317 using a dither method or an error diffusion method. The binary signals are supplied to the heads 1C to 1BK through the head driver to form a color image.

When the unevenness correction processing described above is performed to decrease a driving energy (e.g., a driving duty) of an injection energy generation element corresponding to an orifice of a high density in the head and to increase a driving energy of an injection energy generation element corresponding to an orifice of a low density, the uneven image density of each recording head is corrected to obtain a uniform image. However, when the uneven image density patterns of the heads are changed during use, the currently used unevenness correction signals become improper to cause unevenness on the image. In this case, the unevenness correction data is rewritten.

The following problems are posed by the above arrangement.

The uneven image densities of the C, M, Y, and Bk heads must be read and corrected in the image forming apparatus of this embodiment. It is possible for the reading unit 14 to read patterns of any colors so as to output the R, G, and B signals. Since the image density unevenness is a delicate phenomenon, and reading of the uneven image densities must be performed with high precision, the C, M, Y, and Bk patterns are preferably read at maximum S/N ratios.

The input signals to the RAM 322 in FIG. 63 are obtained such that the spectral sensitivity of the reading sensor is auxiliarily corrected by the input masking unit 305. Since average color separation characteristics of all the colors are improved in the input masking unit 305, it is not necessary to maximize S/N ratios for the C, M, Y, and Bk components printed by the recording heads. For this reason, unevenness may not be read with sufficiently high precision depending on different color components. This can apply to a case wherein signals input to the RAM 322 serve as outputs 312a to 312d from the masking unit 311.

To the contrary, when input masking coefficients are set to improve unevenness reading precision, color reproducibility in the normal copying mode may be sacrificed.

To solve this problem, the following arrangement is employed in the image processing unit and the unevenness correction unit.

Figure 64:
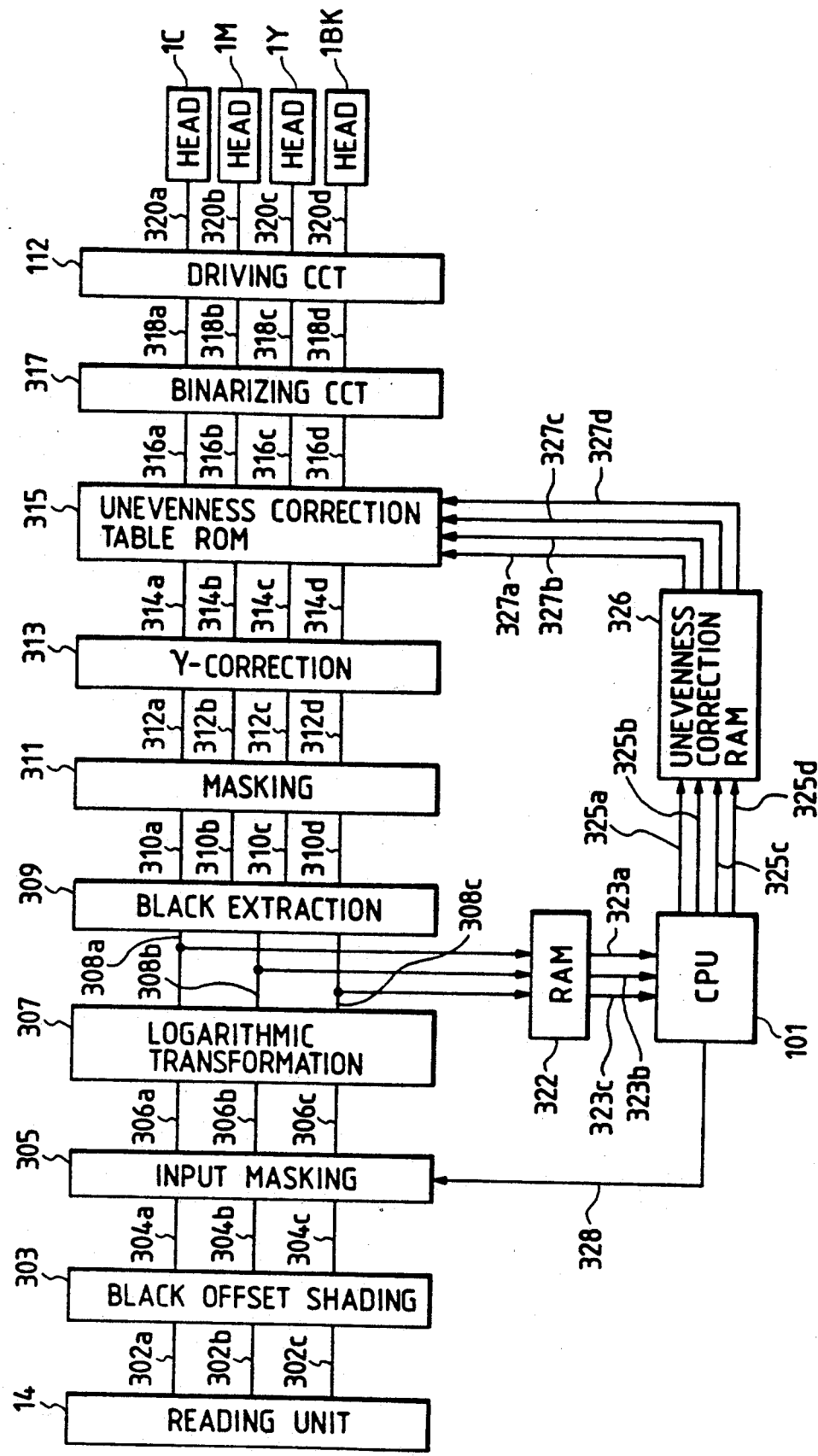
FIG. 64 is a block diagram showing a system for performing image processing and unevenness correction according to this embodiment.
Figure 65:
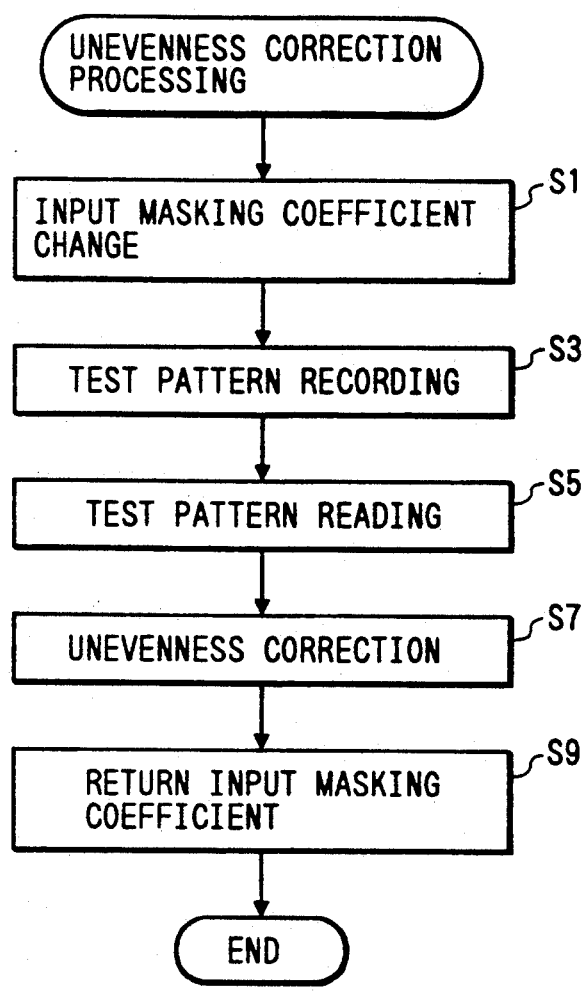
FIG. 65 is a flow chart showing an unevenness correction sequence of this embodiment.

FIG. 64 shows this arrangement. The same reference numerals as in FIG. 63 denote the same parts in FIG. 64. In this case, however, the input masking circuit 305 can set coefficients $a_{11}$ to $a_{33}$. A sequence shown in FIG. 65 is employed for unevenness correction. The operations in the normal copying mode are substantially the same as described above, and a detailed description thereof will be omitted.

In an unevenness correction data rewriting mode, a masking coefficient change signal 328 is supplied from the CPU 101 to the input masking unit 305 to change the input masking coefficient (step S1 in FIG. 65). In this case, the input masking coefficients prior to the change are selected to improve average color separation performance. However, after the change, the coefficients are selected to mostly increase the S/N ratios for the C, M, and Y components printed by the recording heads.

The coefficients $a_{11}$ to $a_{13}$ are set to maximize the S/N ratio for reading a cyan pattern. The coefficients $a_{21}$ to $a_{23}$ are set to maximize the S/N ratio for reading a magenta pattern. The coefficients $a_{31}$ to $a_{33}$ are set to maximize the S/N ratio for reading a yellow pattern.

Figure 66:
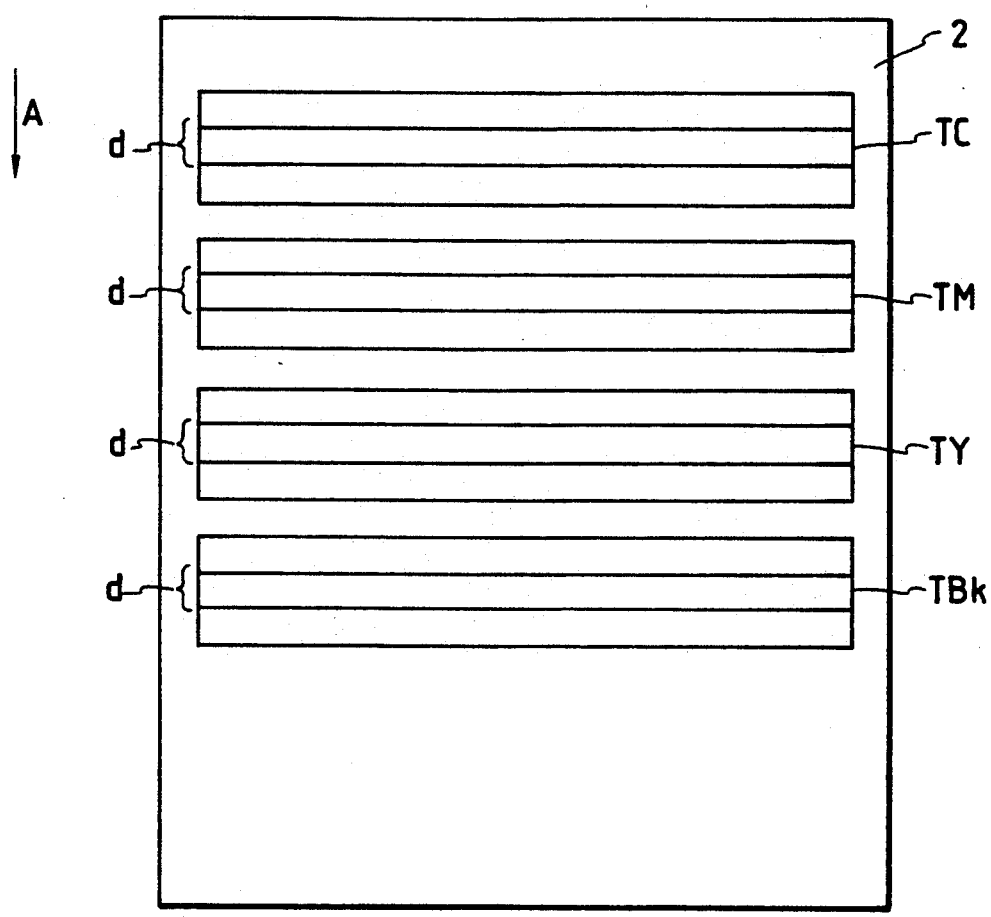
FIG. 66 is a view showing test patterns formed on a recording medium.

In this state, uniform halftone images having a duty of 50% are printed with the corresponding heads, as shown in FIG. 66, (step S3 in FIG. 65).

Referring to FIG. 66, a recording medium 2 has C, M, Y, and Bk test patterns TC, TM, TY, and TBk. Patterns are printed on both sides outside a reading width d of each test pattern. These side patterns are formed to eliminate influences of reflection on the background of the recording medium 2.

The recording medium having these test patterns is placed on the reading unit to read unevenness (step S5 in FIG. 65). These test patterns are read while the reading head 60 in FIG. 61 is moved in a direction of an arrow A in FIG. 66.

The read signals are subjected to input masking processing in accordance with the changed masking coefficients. The masked signals are then logarithmically transformed, and the resultant signals are temporarily stored in the RAM 322. Of all the color test pattern data, data of central portions are extracted and serve as uneven image density data of the respective heads.

The cyan data 308a obtained upon reading of the pattern TC is used as cyan head unevenness data, the magenta data 308b obtained upon reading of the pattern TM is used as the magenta head unevenness data, and the yellow data 308c obtained upon reading of the pattern TY is used as yellow head unevenness data. Since a sufficient S/N ratio can be obtained for all color signals with the black head, no arithmetic operation is performed to form a black signal in this embodiment. The magenta data 308b obtained upon reading of the pattern TBk is used as black head unevenness data.

Unevenness correction is performed in step S7 of FIG. 65. Signals having the number corresponding to the number (N) of orifices are sampled from the logarithmically transformed signals upon reading of uneven image densities, and the sampled signals serve as density data corresponding to orifices and are subjected to unevenness correction on the basis of the data stored in the RAM 322.

If N data of the read cyan heads are represented by Cn ($1 \leq n \leq N$), an average density is calculated as follows:

$$\bar{C} = \sum_{n=1}^{N} Cn/N$$

Subsequently, an aberration of a density corresponding to each orifice from the average density is calculated as follows:

$$\Delta Cn = \overline{C}/Cn$$

A signal correction quantity $(\Delta S)n$ corresponding to $(\Delta C)n$ is calculated as follows:

$$\Delta Sn = A \times \Delta Cn$$

where A is the coefficient determined by head gradation characteristics.

A selection signal for a correction straight line to be selected in accordance with $\Delta Sn$ is obtained to store unevenness correction signals having the number equal to the number of orifices and each having values of "0" to "60" in the unevenness correction RAM 326. The $\gamma$ straight lines having different values in units of orifices are selected in accordance with the generated unevenness correction data 327a to 327d, thereby correcting the uneven image densities and rewriting the unevenness correction data.

The same processing as described above is similarly performed for magenta, yellow, and black components. In step S9 of FIG. 65, the input masking coefficients are returned to those in the normal copying mode, and this sequence is ended.

In this embodiment, since the input masking coefficients at the time of unevenness reading are rewritten to maximize the S/N ratios obtained upon reading of the cyan, magenta, yellow, and black components printed with the corresponding recording heads, highly efficient unevenness reading and correction can be performed.

In the above description, injection stabilization of the recording heads prior to recording of test patterns, appropriate head temperature adjustment by, e.g., the temperature adjustment unit 113, printing of appropriate patterns, and injection recovery processing using an ink supply/circulating system unit 7 are preferable because test patterns are recorded with the optimal characteristics of the heads of the normal recording modes. Therefore, accurate unevenness correction can be realized.

Use of a recording medium suitable for forming and reading test patterns, the change in print duty in accordance with types of recording media, and the change in reading range are preferable to accurately perform unevenness correction.

In addition, an operation for recording test patterns at two or more print duties and averaging the correction data to obtain final correction data, and selection for printing test patterns in an emphasized density region to be corrected are also preferable. Furthermore, color correction processing conditions of all three primary colors need not be changed. Conditions of one or two specific or selected colors may be changed.

In addition, two or more conditions described above may be combined.

As described above, temperature adjustment may be controlled in the same manner as described with reference to FIGS. 38 to 39C.

An injection stabilization operation by recovery processing is performed in the same manner as described above due to the following reason. When the recording head is set in a state wherein the recording head does not have normal injection characteristics due to mixing of dust and bubbles, and when uneven image density correction is performed, faithful head characteristics (uneven image densities) may not be recognized.

The fourteenth embodiment of the present invention will be described below.

Figure 67:
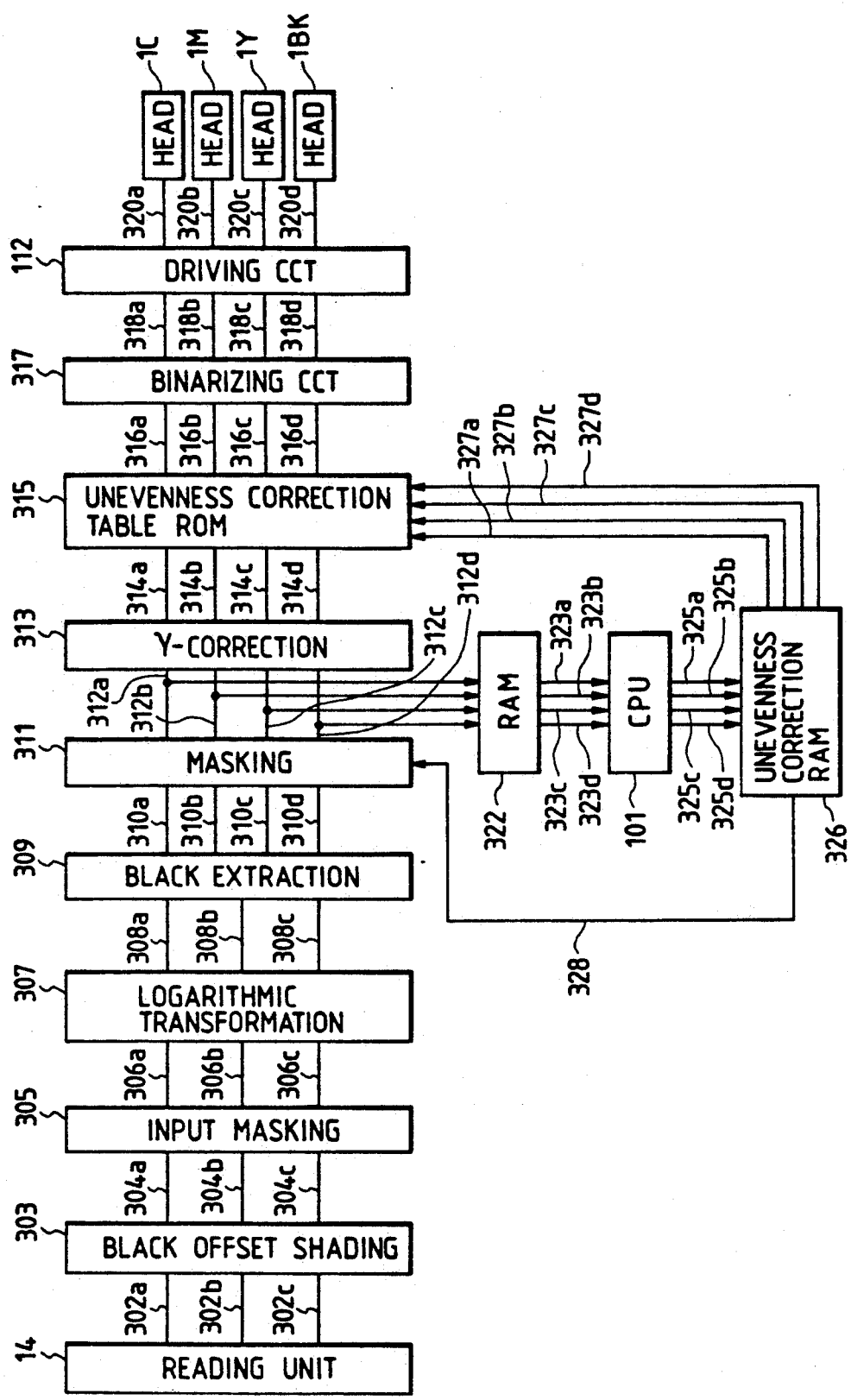
FIGS. 67 and 68 are block diagrams showing the fourteenth and fifteenth embodiments of the present invention, respectively.

FIG. 67 is a block diagram showing the fourteenth embodiment. The same reference numerals as in FIG. 64 denote the same parts in FIG. 67.

In this embodiment, unevenness signals of the respective heads input to a RAM 322 are output signals 312a, 312b, 312c, and 312d from a masking circuit 311. In the normal recording mode, coefficients of the masking circuit 311 are set to obtain average color reproducibility for all color components. However, in the unevenness correction data rewriting mode, the coefficients are set to maximize the S/N ratios for the cyan, magenta, yellow, and black components recorded with the corresponding recording heads. That is, of all the masking coefficients described above, the coefficients $a'_{11}$ to $a'_{14}$ are set to maximize an S/N ratio upon reading of the cyan pattern. The coefficients $a'_{21}$ to $a'_{24}$ are set to maximize an S/N ratio upon reading of the magenta pattern. The coefficients $a'_{31}$ to $a'_{34}$ are set to maximize an S/N ratio upon reading of the yellow pattern. The coefficients $a'_{41}$ to $a'_{44}$ are set to maximize an S/N ratio upon reading of the black pattern.

The same effect as in the thirteenth embodiment can be obtained by the above setup.

Figure 68:
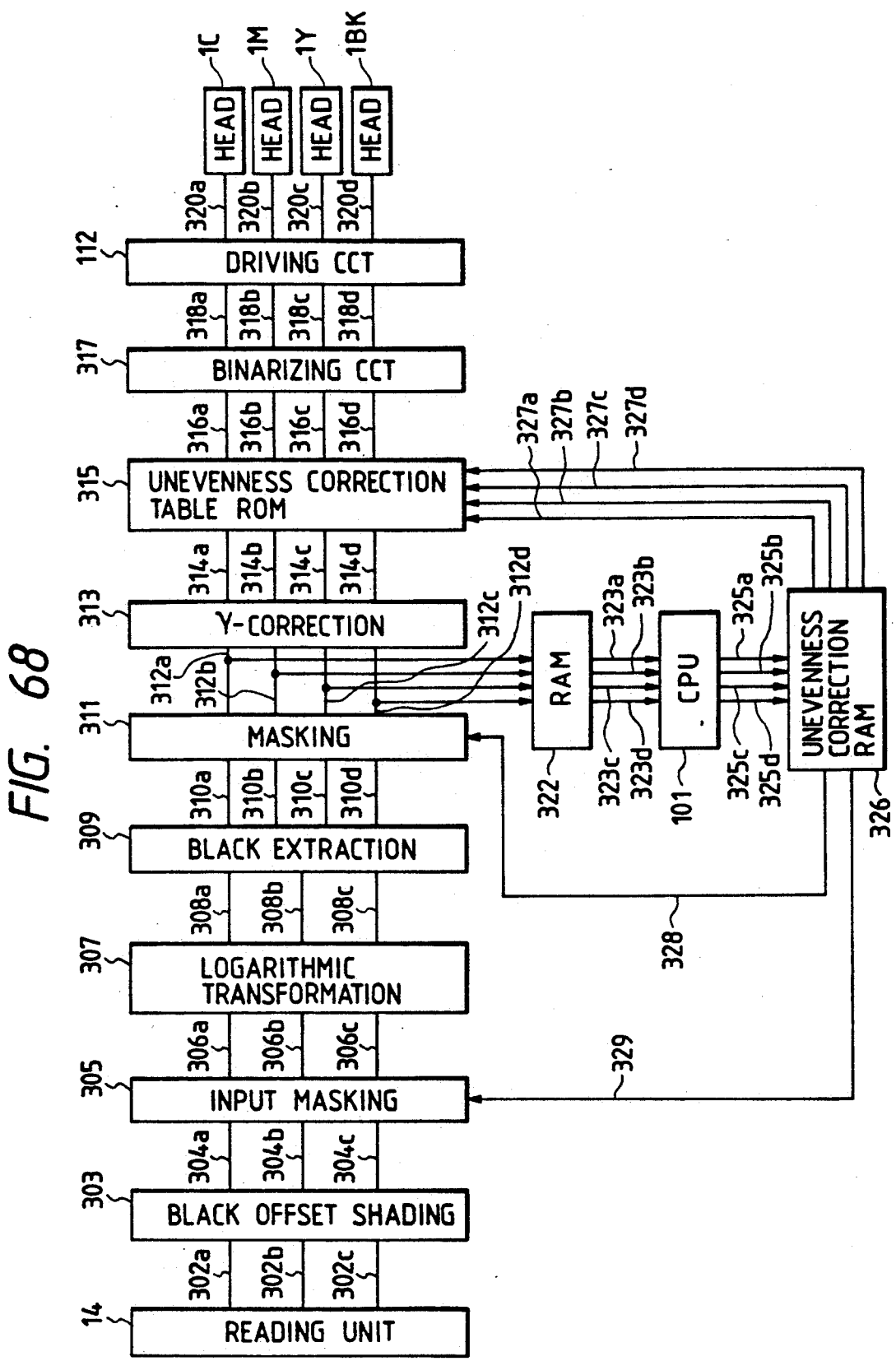

FIG. 68 is a block diagram showing the fifteenth embodiment of the present invention. The same reference numerals as in FIG. 64 denote the same parts in FIG. 68.

In the fifteenth embodiment, at the time of head unevenness data reading in the unevenness correction data rewriting mode, masked signals 312a to 312d are fetched as in the fourteenth embodiment. At this time, the input masking coefficients $a_{11}$ to $a_{33}$ and the masking coefficients $a'_{11}$ to $a'_{44}$ are changed in accordance with signals 329 and 328.

With the above operation, unevenness reading S/N ratios can be further increased as compared with a case wherein either the masking coefficients $a_{11}$ to $a_{33}$ or the masking coefficients $a'_{11}$ to $a'_{44}$ are changed.

The following processing can be performed using an arrangement identical to that of FIG. 68.

In the fifteenth embodiment, the masking coefficients which influence the S/N ratios of the cyan head are 13 masking coefficients, i.e., $a_{11}$ to $a_{33}$, and $a'_{11}$, $a'_{12}$, $a'_{13}$, and $a'_{14}$. Of these coefficients, the nine coefficients $a_{11}$ to $a_{33}$ influence not only reading of the cyan component but also reading of other three color components. Therefore, these coefficients must be determined to average reading S/N ratios of the four color components, i.e., not to maximize a reading S/N ratio of the cyan component.

In the sixteenth embodiment, the coefficients $a_{11}$ to $a_{33}$ are also set to maximize the S/N ratio of one color to obtain a higher S/N ratio. In the sixteenth embodiment, when patterns shown in FIG. 66 are to be read, the masking coefficients $a'_{11}$ to $a'_{44}$ are always fixed. However, these coefficients are changed in units of colors while the input masking coefficients $a_{11}$ to $a_{33}$ are used. More specifically, referring to FIG. 68, the coefficient change signal 329 for the input masking coefficients is changed in units of colors, and different coefficients are set. For example, even if the thirteenth coefficients are set to maximize the S/N ratio for the cyan color during reading of the cyan component, this setup operation does not influence reading of other color components, thereby further increasing the S/N ratio.

The present invention is not limited to the embodiment described above. Various changes and modifications may be made without departing from the spirit and scope of the invention. For example, the present invention is applicable to a serial printer. In this case, the same control system and processing sequence as described above can be employed, as a matter of course.

As described above, according to the present invention, different color correction processing operations are preformed in the normal original reading mode and the test image reading mode. Optimal unevenness reading can be performed for test images of any colors with high precision without sacrificing color reproducibility in the normal copying mode.

The seventeenth embodiment according to the present invention will be described in detail with reference to FIGS. 69 to 74.

Figure 69:
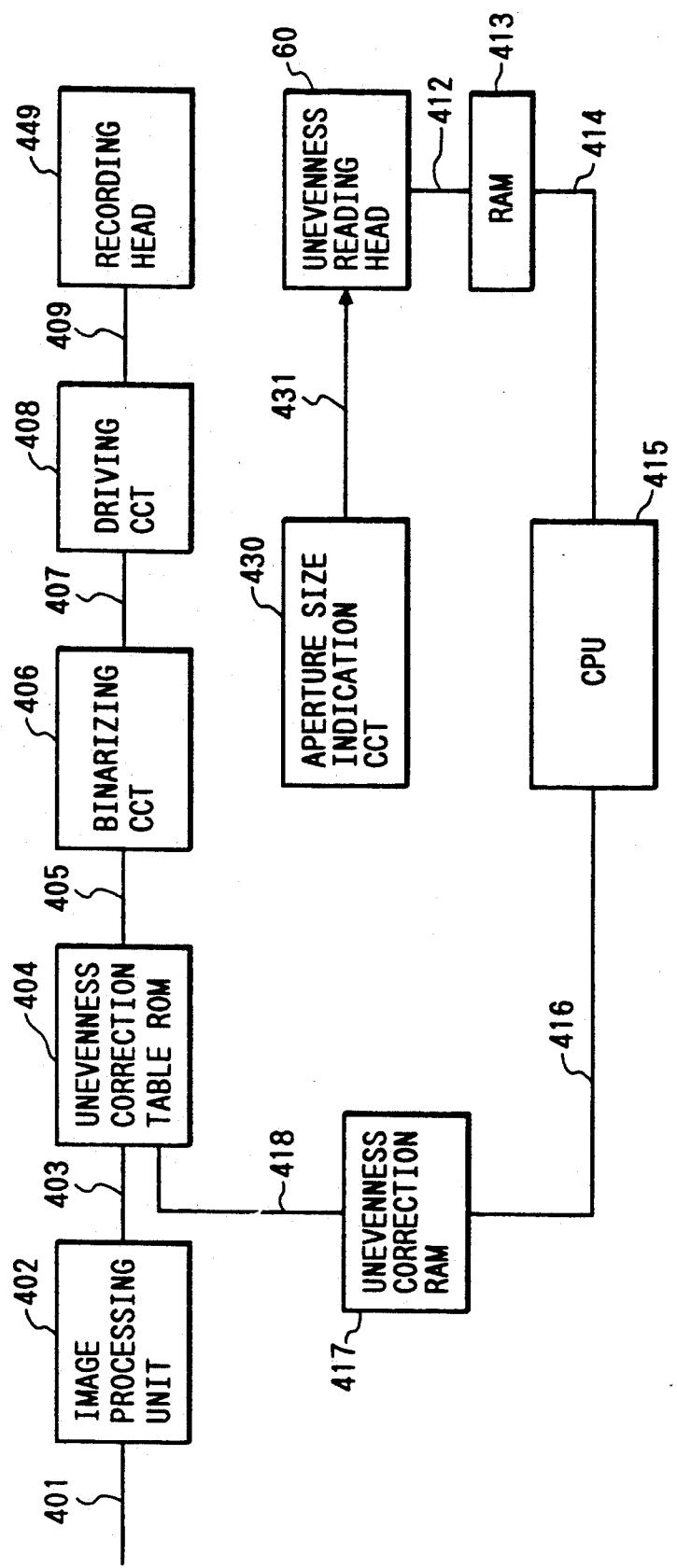
FIG. 69 is a block diagram showing the seventeenth embodiment of the present invention.

FIG. 69 is a block diagram of the seventeenth embodiment. An image reading unit in this embodiment is the same as that described with reference to FIG. 61 of the thirteenth embodiment, and a detailed description thereof will be omitted.

An image signal read by the above image reading unit is subjected to color correction processing such as logarithmic transformation, UCR, masking, and color balance adjustment, the color-corrected image signal is supplied to an image forming unit.

Figure 70:
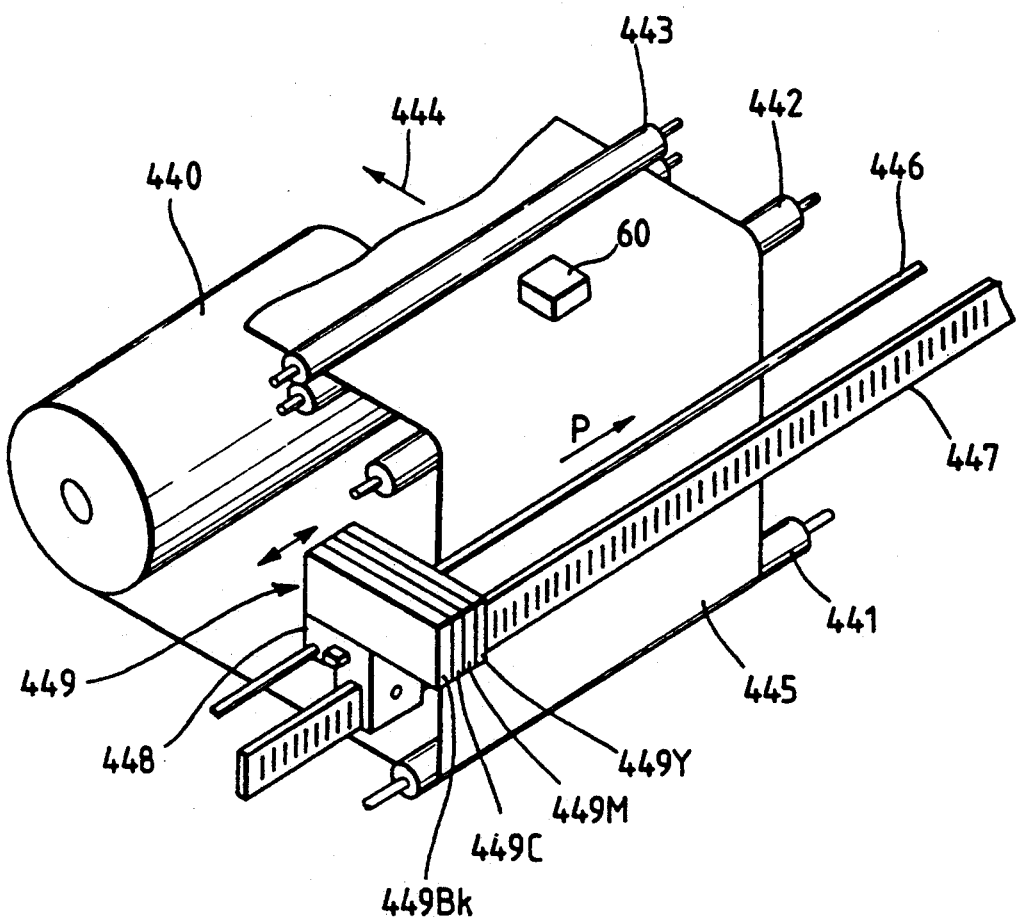
FIG. 70 is a perspective view showing a structure of an image forming unit of this embodiment.

FIG. 70 shows an image forming unit having drop-on-demand type ink-jet recording heads 449.

Referring to FIG. 70, a roll-like recording material 440 is gripped with a feed roller 443 through convey rollers 441 and 442 and is rotated and fed in a direction 444. Guide rails 446 and 447 are placed cross the recording material 445, and a recording head unit 449 mounted on a carriage 448 is scanned in the horizontal direction.

The carriage 448 has heads 449Y, 449M, 449C, and 449BK of four colors, i.e., yellow, magenta, cyan, and black. Four color ink tanks are connected to the head 449Y, 449M, 449C, and 449BK, respectively. Each head has a multi-nozzle head having 256 nozzles. The recording material 445 is intermittently fed every print width of the recording heads 449. The recording heads 449 are fed in a direction of an arrow P while the recording material 445 is kept stopped, thereby injecting ink droplets corresponding to an image signal.

After the original is read and color correction processing is completed, ink injection corresponding to the image signal is performed to form a color image.

Uneven image densities of the respective recording heads are corrected by a circuit shown in FIG. 69. For the sake of descriptive simplicity, processing of only one head will be described. In order to obtain a full-color image, the same processing can be performed for four color heads.

Referring to FIG. 69, image data 401 is read by an image reading unit. An image processing unit 402 performs processing such as logarithmic transformation, masking, UCR, and color balance adjustment. The image processing unit 402 outputs an image signal 403. A ROM 404 stores an unevenness correction table. The ROM 404 outputs an unevenness-corrected image signal. This signal is input to a binarizing circuit 406. The binarizing circuit 406 outputs a binary image signal 407. This binary signal 407 is input to a head driving circuit 408. The head driving circuit 408 outputs a head drive signal 409. The head drive signal 409 is supplied to a multi-head 449. The uneven image density reading head 60 is connected to an unevenness correction RAM 413 and receives an unevenness read signal 412 from the RAM 413.

The processed image signal 403 is converted to correct unevenness of the recording heads by the unevenness correction table ROM 404.

The unevenness correction table or graph has 61 correction lines having different gradients in units of 0.01 from Y=0.70X to Y=1.30X. The correction straight lines are switched in accordance with an unevenness correction signal 418.

An unevenness correction RAM 417 stores selection signals of correction straight lines for correcting unevenness values of the heads. More specifically, the unevenness correction RAM 417 stores unevenness correction signals having the number equal to the number of nozzles, 256, and having 61 values of "0" to "60". The unevenness correction signal 418 is output in synchronism with the input image signal. After an image signal 405 corrected by the selected straight line is binarized by the binarizing circuit 406 in accordance with a dither method or an error diffusion method. The binary signal is input to the head driving circuit 408. The head driving circuit 408 outputs a driving pulse suitable for the head in accordance with the binary signal, and image recording is performed with the recording heads 449.

By performing the above processing, a print duty for a dot formed by a nozzle of a high density in the head is decreased, but a print duty for a dot formed by a nozzle of a low density is increased. As a result, the uneven image densities of the recording heads are corrected, and a uniform image can be formed.

When the uneven image density patterns are changed during use, and when the unevenness correction signals become improper, unevenness appears on the image. In this case, unevenness correction data are rewritten in the unevenness correction signal rewriting mode. More specifically, in response to a control signal (not shown), all the straight lines in the unevenness correction table are set to be a gradient of 1.0, and a state in which no unevenness correction is performed is set. Unevenness correction patterns are output from signal lines (not shown) and are printed with the heads 449. In this case, uniform halftone images having a duty of 50% are used as unevenness correction patterns.

The uneven image density reading heads are located at a position denoted by reference numeral 60 of FIG. 70 in the image forming unit.

Figure 71:
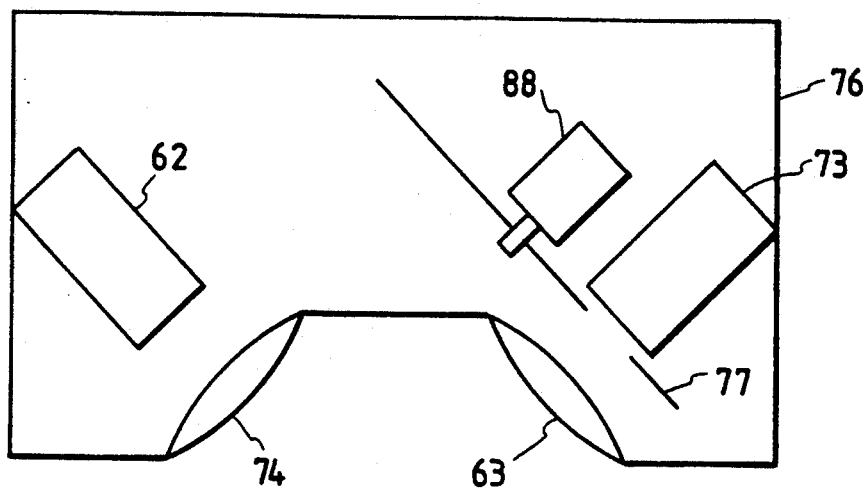
FIG. 71 is a view showing an arrangement of an unevenness reading head according to this embodiment.
Figure 72:
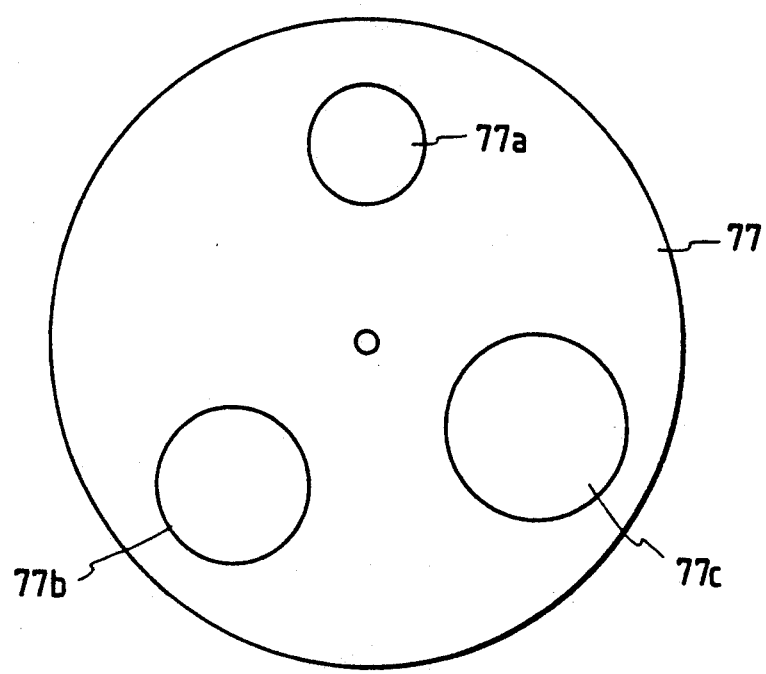
FIG. 72 is a view showing apertures of this embodiment.

FIG. 71 shows a schematic arrangement of the uneven image density reading head 60 shown in FIG. 69.

The same reference numerals as in FIG. 24 denote the same parts in FIG. 71. An aperture 77 having a plurality of openings 77a, 77b, and 77c having different sizes at predetermined positions of a disc shown in FIG. 72. The center of the disc is connected to a shaft of a pulse motor 88.

Figure 73:
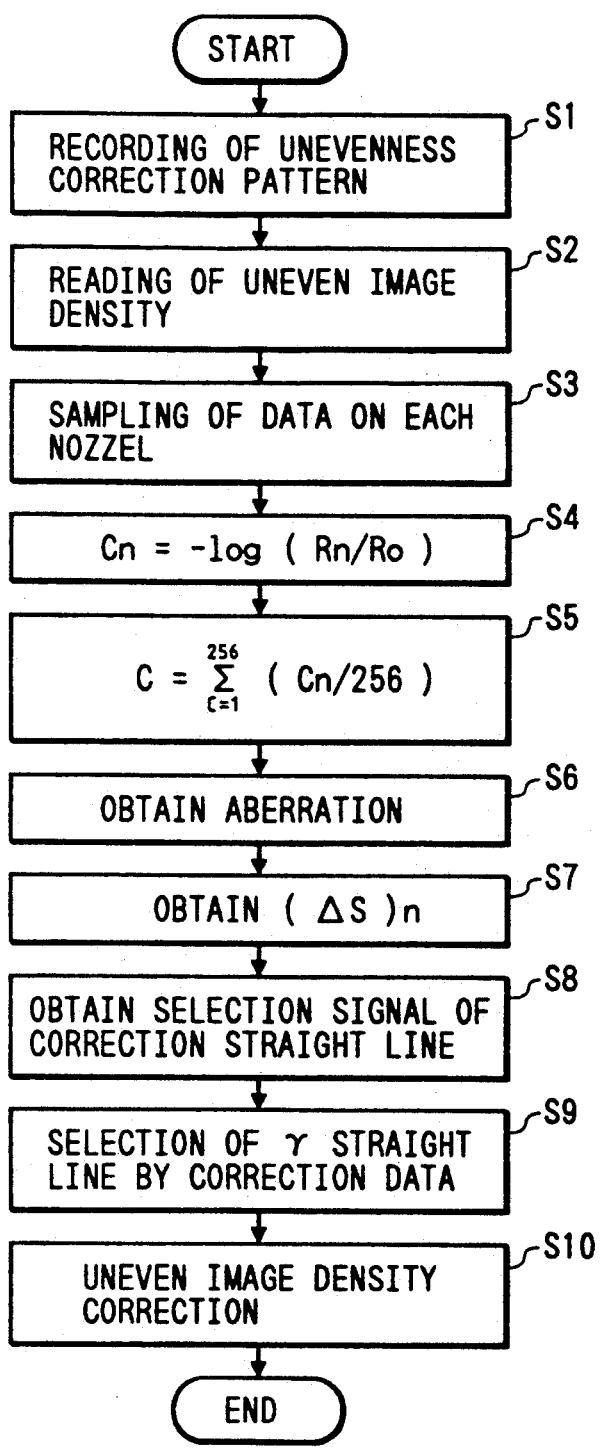
FIG. 73 is a flow chart showing a control sequence of this embodiment.

FIG. 73 is a flow chart showing a control sequence of the CPU 415 in FIG. 69.

Before the unevenness correction data rewriting mode is set, an aperture size indication signal 431 is input from an aperture size indication circuit 430 in FIG. 69 to the uneven image density reading head 60. This indication is performed such that a user or serviceman judges an optimal value at that moment. The pulse motor 88 in FIG. 71 is rotated in response to this signal, and an aperture having an optimal size corresponding to a print image and the number of heads is set in front of a photo-diode 73.

In step S1, after unevenness correction patterns are recorded by the recording heads, the recording material 445 is fed in the direction 444 upon rotation of the feed roller 443, and unevenness correction patterns pass under the unevenness reading head. In step S2, at this time, the unevenness reading head 60 reads uneven image densities. In step S3, 256 signals are sampled from the uneven image density signals. These sampled signals serve as 256 data corresponding to the nozzles, respectively. If these data are given as $R_1, R_3, \ldots, R_{256}$, they are temporarily stored in the RAM 413, and the CPU 415 performs the following arithmetic operation.

These data are arithmetically operated and converted into density signals in step S4 as follows:

$$C_n = -\log \frac{R_n}{R_0}$$

where $R_0$ is the constant satisfying condition $R_0 \geq R_n$.
In step S5, an average density is calculated as follows:

$$C = \sum_{n=1}^{256} C_n/256$$

Subsequently in step S6 aberration values of the densities corresponding to the nozzles from the average density are calculated as follows:

$$\Delta C_n = C/C_n$$

In step S7, a signal correction quantity $(\Delta S)n$ corresponding to $(\Delta C)n$ is obtained as follows:

$$\Delta S_n = K \times \Delta C_n \quad (1)$$

where K is the coefficient determined by the head gradation characteristics.

In step S8, a selection signal for a correction straight line selected in accordance with $\Delta S_n$ is obtained. Unevenness correction signals having the number equal to the number of 256 nozzles and each having 61 values of "0" to "60" are stored in the unevenness correction RAM 417.

In step S9, $\gamma$ straight lines having different values in units of nozzles are selected in accordance with the prepared unevenness correction data. In step S10, the uneven image densities are corrected. In this manner, the unevenness correction data are rewritten to always obtain a uniform image.

In this embodiment, after the size of the aperture is set to be an optimal value during unevenness reading, and unevenness reading is performed. In this manner, the unevenness correction data are formed, and therefore optimal unevenness correction can always be performed.

Figure 74:
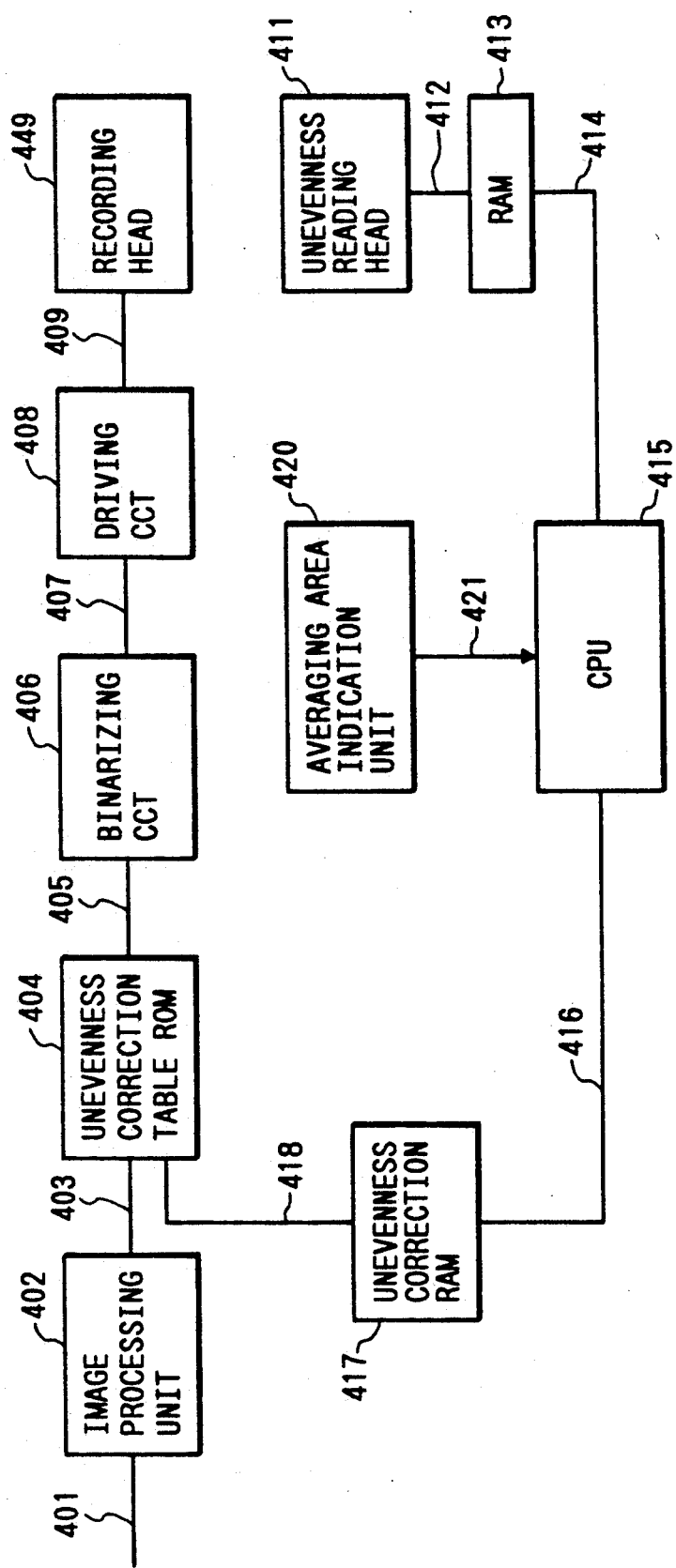
FIG. 74 is a block diagram showing the eighteenth embodiment of the present invention.

FIG. 74 shows the eighteenth embodiment of the present invention.

Figure 75:
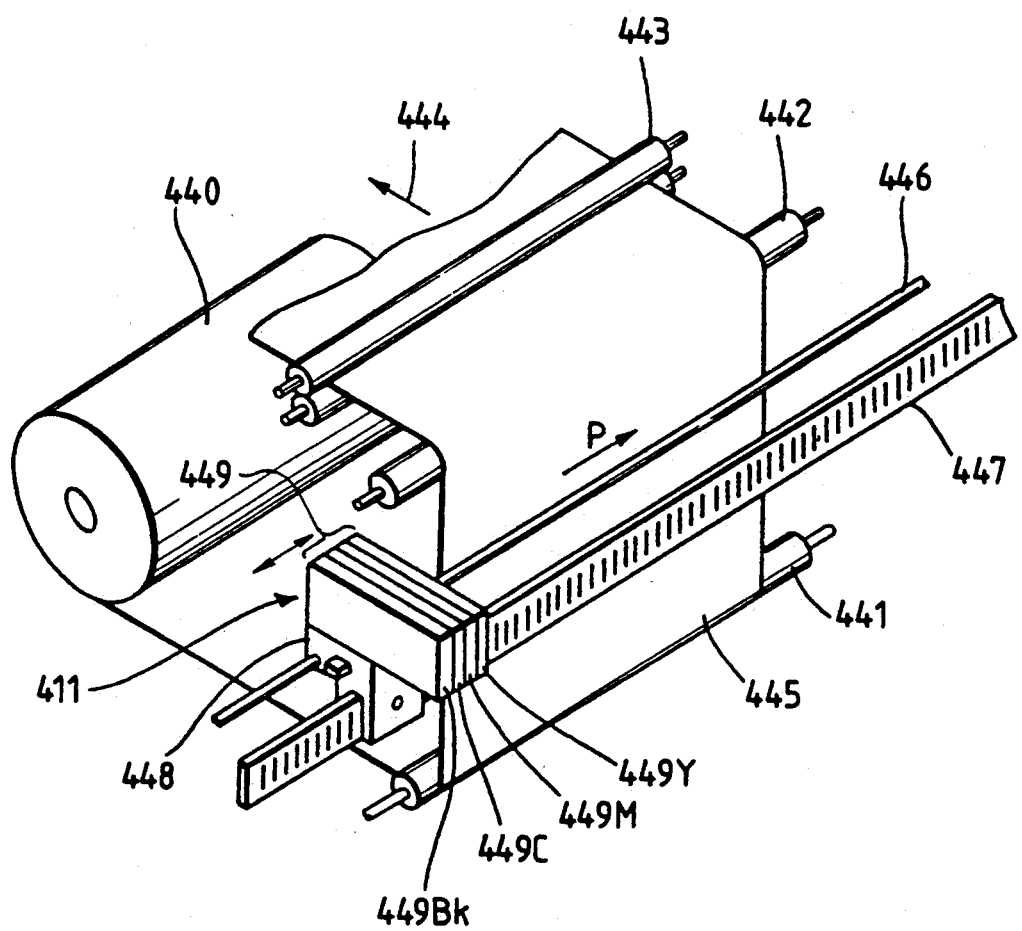
FIG. 75 is a perspective view showing a structure of an image forming apparatus of this embodiment.
Figure 76:
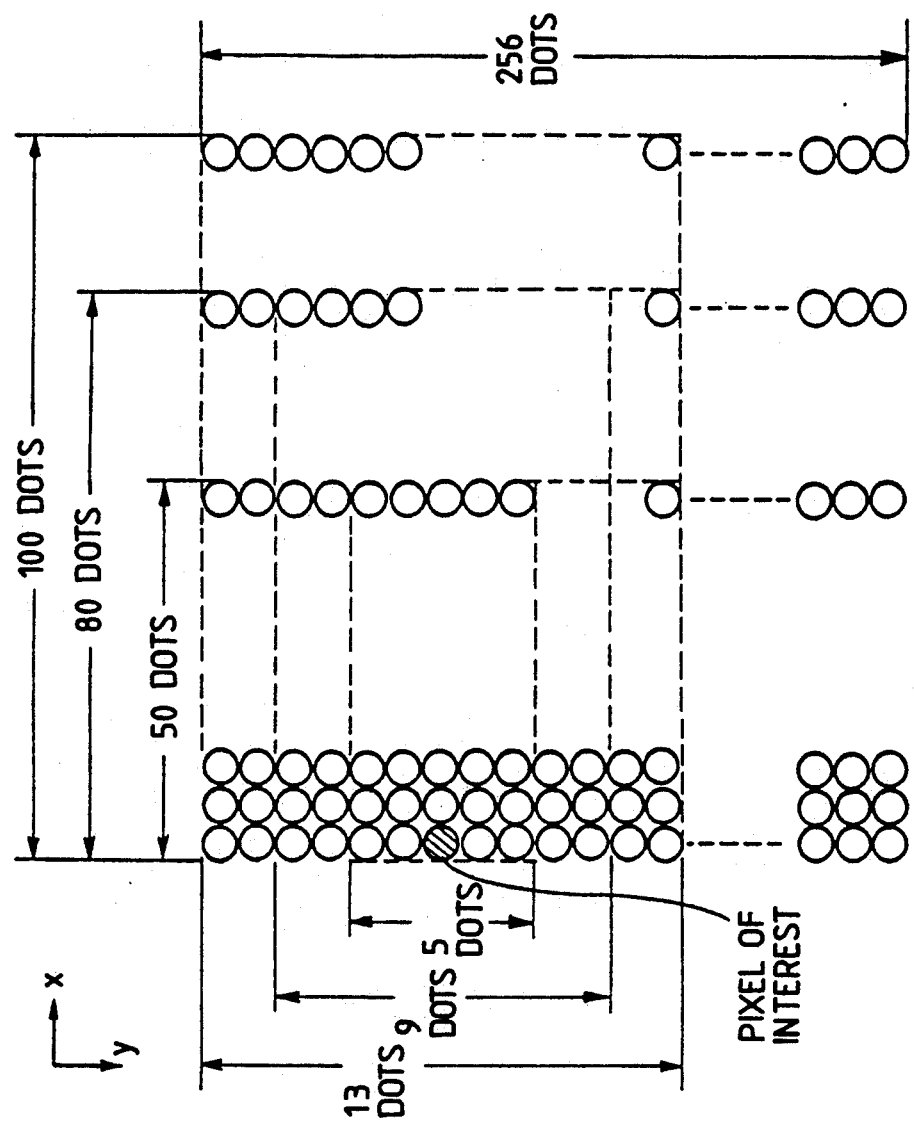
FIG. 76 is a view showing a data averaging area of this embodiment.

The same reference numerals as in FIG. 70 denote the same parts in FIG. 74. An uneven image density reading head 411 is arranged sideways the four heads, as shown in FIG. 75. This uneven image density reading head 411 comprises a CCD having the same read density as that of the head. An uneven image density of a printed pattern is read in accordance with a method described with reference to FIG. 8.

In this embodiment, before the unevenness correction data rewriting mode is set, a signal 421 indicating a size of an averaging area is supplied from an averaging area indication unit 420 to a CPU 415, and data 412 read with the uneven image density reading head 411 are temporarily stored in a RAM 413. At this time, the number of data to be stored is a total of 25,600 ($=100 \times 256$), i.e., 100 data in the x direction and 256 data in the y direction. Of these data, an average value of the data in the averaging area corresponding to a recording paper signal serves as data of the central recording element in the averaging area. The size of the area is selectively given as 250 ($=5 \times 50$) dots, 720 ($=9 \times 80$) dots, or 1,300 ($=13 \times 100$) dots. An area size is selected in accordance with the indication signal 421.

The CPU 415 performs the same arithmetic operation as in the seventeenth embodiment on the basis of the 256 data upon averaging, thereby rewriting the unevenness correction data.

In order to set the size of the averaging area to an optimal value and form unevenness correction data upon unevenness reading, optimal unevenness correction can always be performed.

Figure 77:
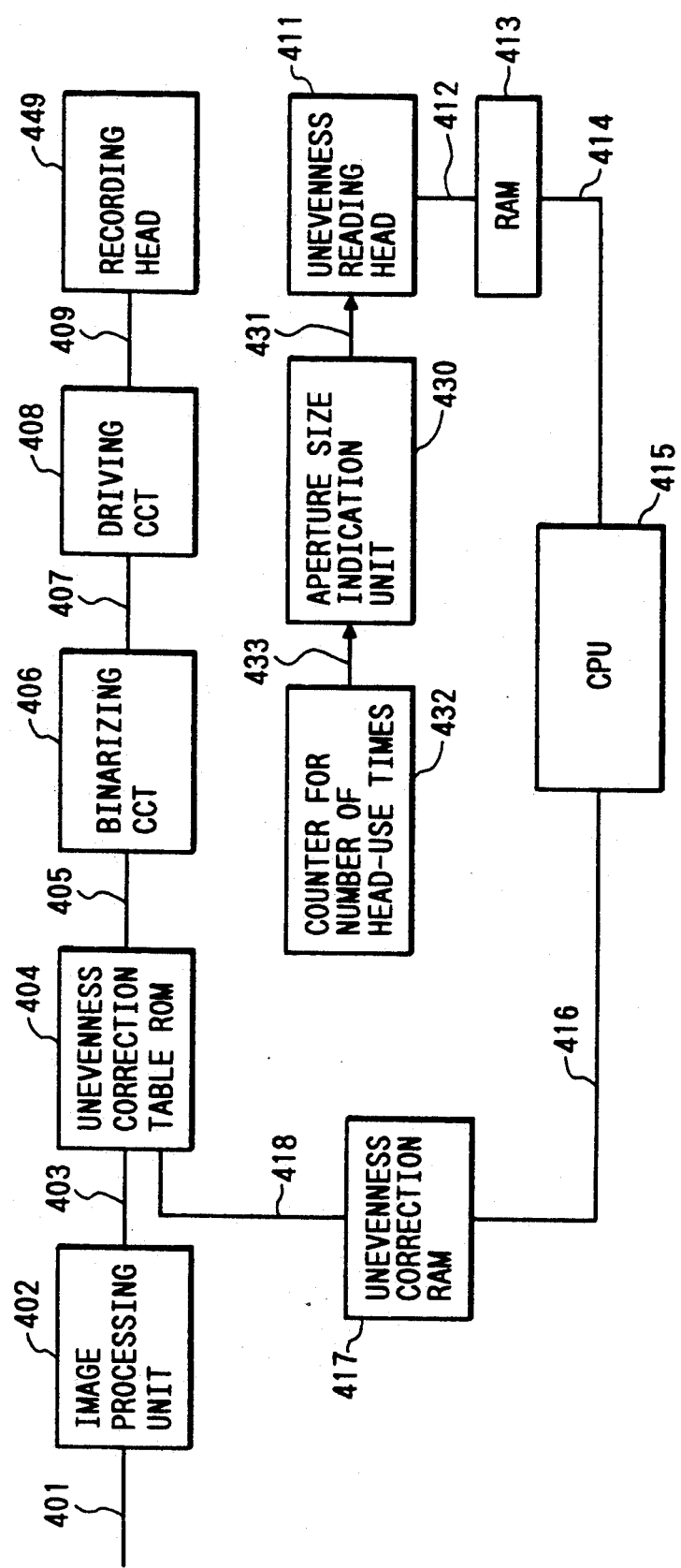
FIGS. 77, 78, 79 and 80 are block diagrams showing the nineteenth to twenty-second embodiments of the present invention, respectively.

FIG. 77 shows the nineteenth embodiment of the present invention.

This embodiment uses an unevenness reading head shown in FIG. 71 and changes an aperture size in accordance with the number of head-use times.

Referring to FIG. 77, this embodiment uses a counter 432 for the number of head-use times. The counter 432 outputs a signal 433 representing the number of head-use times. The counter 432 is cleared when a new head is mounted and is counted up every time each page is printed. The signal 433 is a signal corresponding to the count of the counter 432. Upon reception of the signal 433, an aperture size indication unit 430 sends an aperture size indication signal corresponding to the number of pages to an unevenness image density reading head 411. The unevenness image density reading head 411 rotates a pulse motor in accordance with an input signal and sets an aperture having an optimal size.

A relationship between the number of head-use times and the aperture size is given as follows. When the number of head-use times is zero, i.e., when a new head is mounted, a small aperture is set to correct fine unevenness for a long period of time. Thereafter, the aperture size is gradually increased, and coarse unevenness correction can be performed within a short period of time. With this technique, fine unevenness correction is performed by the serviceman for a long period of time. However, when the user performs coarse unevenness correction, within a short period of time, a condition which causes mixing of small noise components is set.

Figure 78:
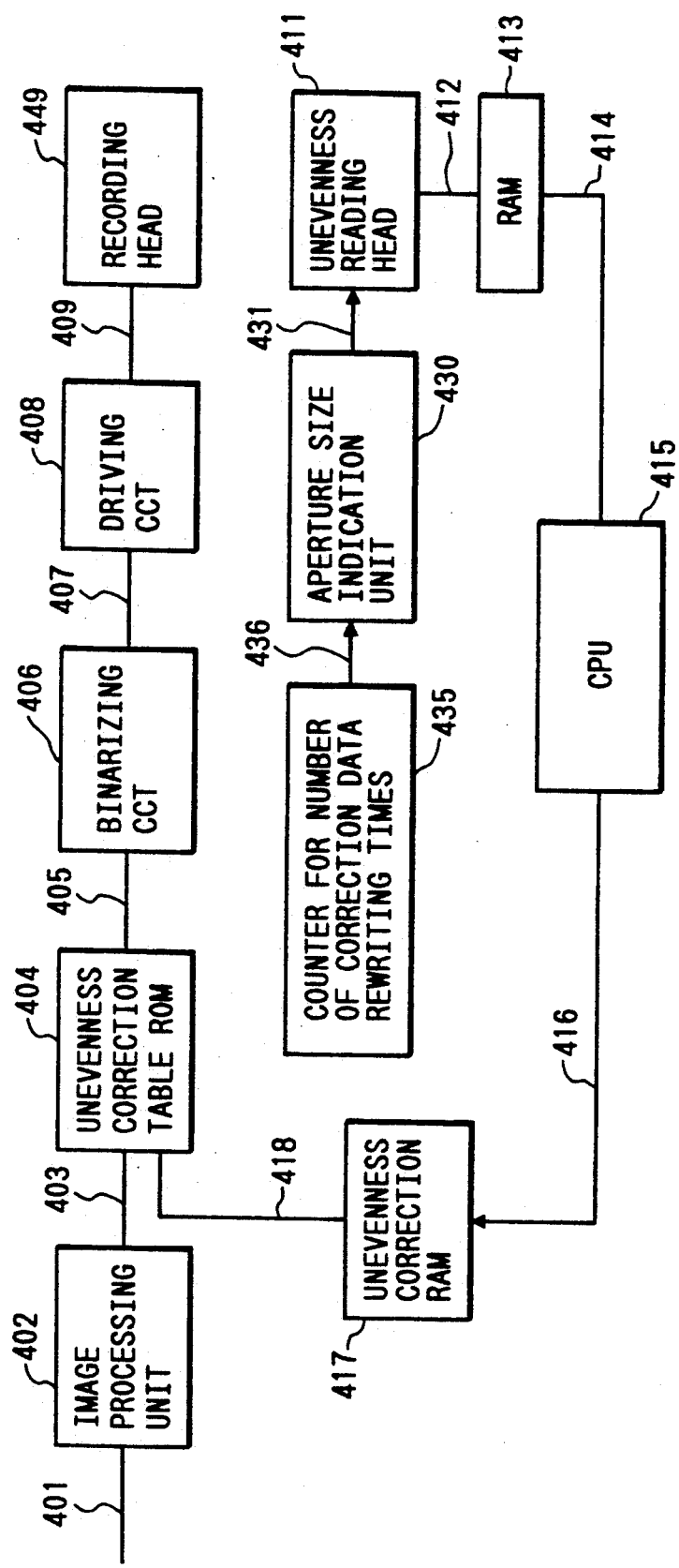

FIG. 78 shows the twentieth embodiment of the present invention.

In this embodiment, the number of head-use times is not used, but the number of correction data rewriting times upon mounting of a new head is counted to change an aperture size.

Referring to FIG. 78, this embodiment includes a counter 435 for the number of correction data rewriting times. The counter 436 outputs a signal 436 representing the number of correction data rewriting times. When a new head is mounted, the counter 435 is reset. Every time the unevenness correction data rewriting mode is set, the counter 435 performs a count-up operation. A count is input to an aperture size indication unit 430, and an optimal aperture size corresponding to the count is set. In this embodiment, when the count is set to "1", a small aperture is selected. When the count is 2 or less, a large aperture is selected. The aperture sizes selected when the count is "2" or less may be identical. However, in this case, the aperture size may be gradually increased in accordance with magnitude of the count.

With the above arrangement, this embodiment has the same effect as in the nineteenth embodiment.

Figure 79:
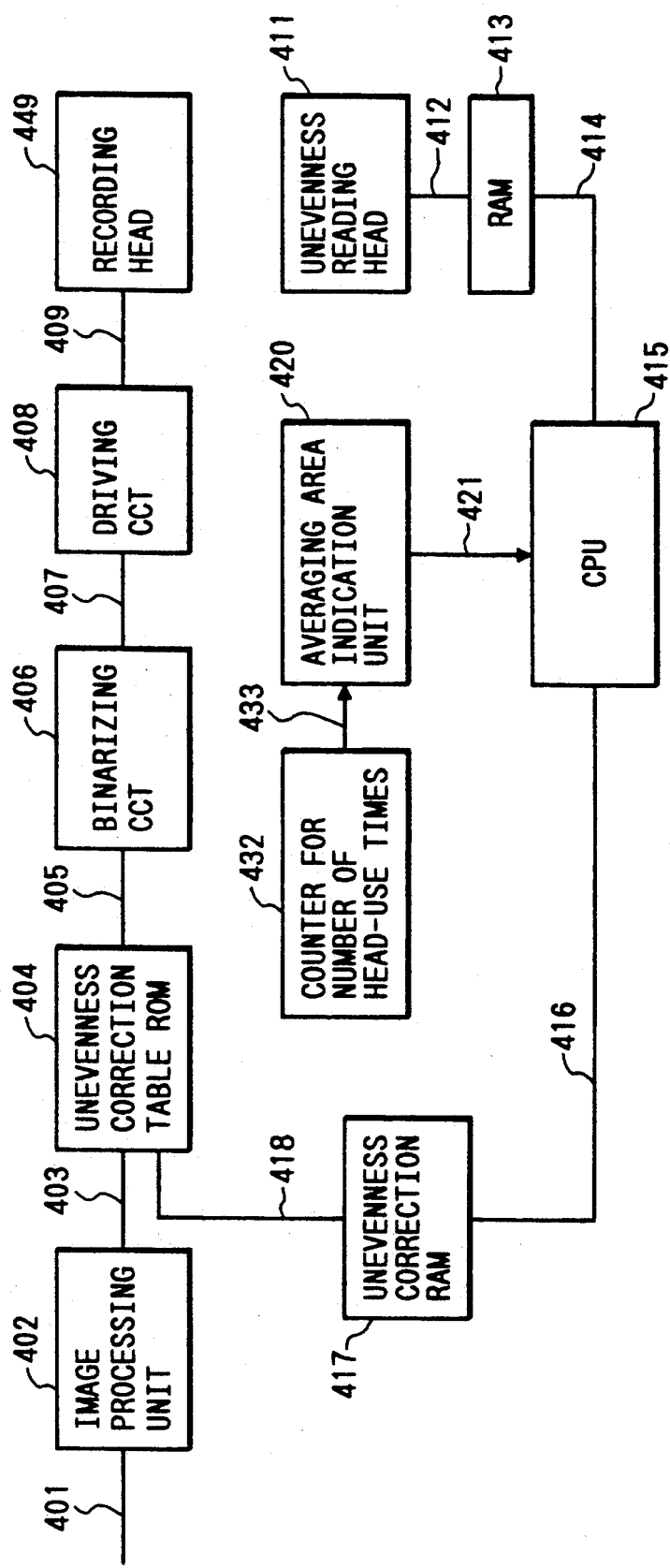

FIG. 79 shows the twenty-first embodiment of the present invention.

Figure 8:
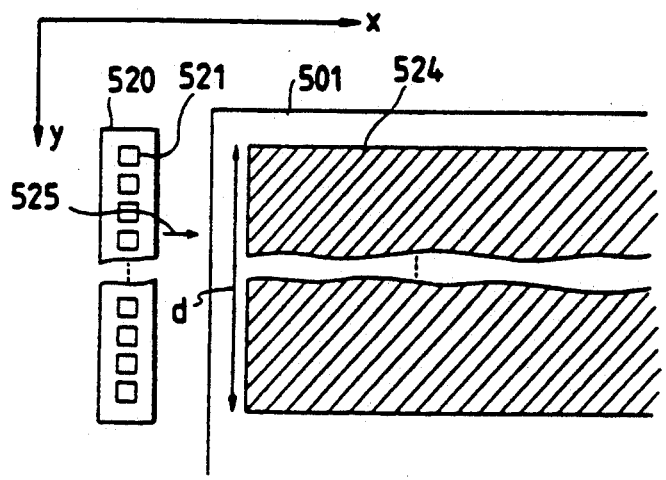
Figure 9:
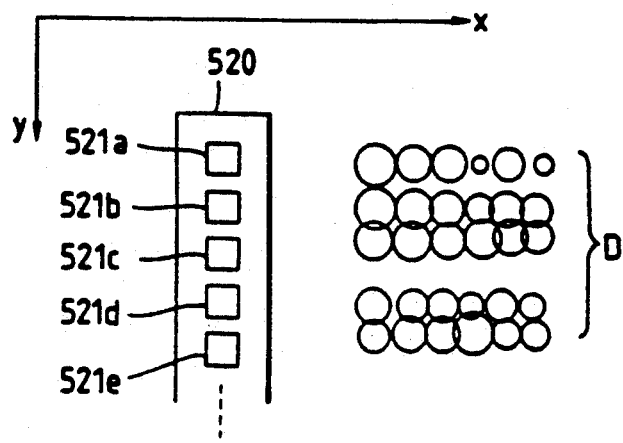

This embodiment demonstrates that the same effect as in the nineteenth embodiment can be obtained even if the unevenness reading head shown in FIG. 8 is not used.

Referring to FIG. 79, a counter 432 is cleared every time a new head is mounted and is counted up every time the head is used. An averaging area indication unit sets an optimal averaging area in accordance with a count, and unevenness correction data is formed on the basis of data averaged with this area size, thereby obtaining the same effect as in the nineteenth embodiment.

Figure 80:
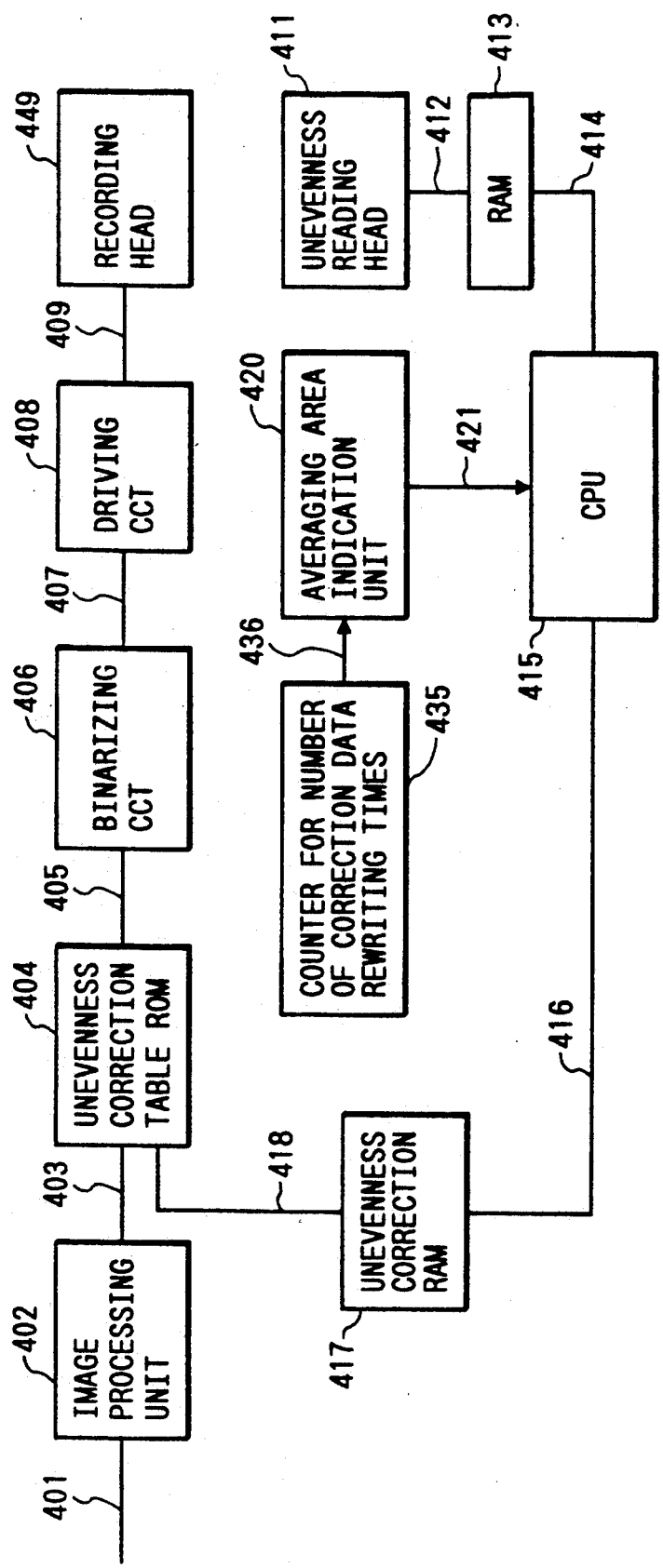

FIG. 80 shows the twenty-second embodiment of the present invention.

In place of the counter of the twenty-first embodiment, this embodiment includes a counter for the number of correction data rewriting times to rewrite the number of correction data rewriting times after a new head is mounted. With this arrangement, the same effect as in the twenty-first embodiment can be obtained.

The twenty-third embodiment shows a case wherein a relative speed between the unevenness reading head and the read pattern is set variable in place of setting the aperture and averaging area to be variable. That is, a scanning speed of the unevenness reading head or a scanning speed of the recording paper on which patterns are printed is changed in accordance with user selection, the counter for the number of head-use times, or the counter for the number of correction data rewriting times. When coarse reading within a short period of time is to be performed, the scanning speed is increased. However, when fine reading with high precision is to be performed, the scanning speed is decreased.

The same effect as in the above embodiments can be obtained by this technique.

The twenty-fourth embodiment exemplifies variable focus control of an unevenness reading head. That is, the lens position, the reading sensor position, and the position of a sheet on which patterns to be read are printed is moved in accordance with user selection, the counter for the number of head-use times, or the counter for the number of correction data rewriting times. A relative position between the lens, the reading sensor, and the recording sheet is changed to adjust focusing. When coarse reading is to be performed within a short period of time, a defocus state is obtained. However, when fine reading is to be performed with high precision, an in-focus state is obtained. The same effect as in the above embodiment can be obtained.

In the seventeenth to twenty-fourth embodiments, reading conditions of a single reading head are variably set. However, in the twenty-fifth embodiment, a plurality of unevenness reading heads having different reading conditions are arranged, and any one of these heads is selected.

This embodiment has the same arrangement as that of the seventeenth embodiment. An image reading CCD has a high density of 400 dpi, which is equal to that of a multi-head recording density. When fine reading with high precision is to be performed, the user or serviceman causes the image reading CCD of the image reading unit (FIG. 61) to read unevenness from test patterns, and unevenness correction data is formed.

When coarse reading within a short period of time is to be performed, unevenness is read with the unevenness reading head 60 shown in FIG. 70, and unevenness correction data is formed. This unevenness reading head has an aperture having a diameter of 2 mm, as shown in FIG. 8 and performs coarse reading as compared with the image reading CCD.

In this manner, by selecting reading heads having different reading conditions, the same effects as in the seventeenth to twenty-fourth embodiments can be obtained.

Figure 81:
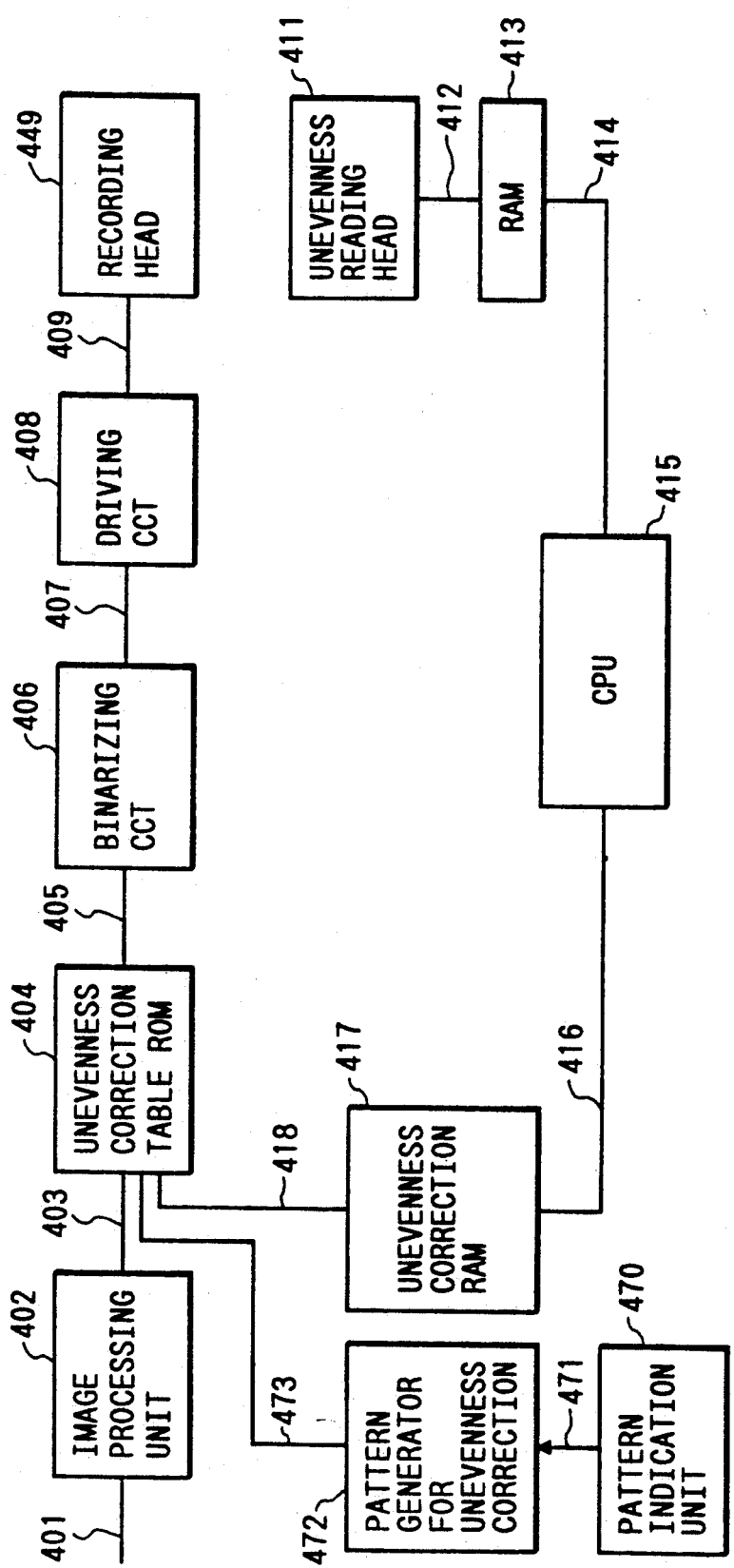
FIGS. 81, 82 and 83 are block diagrams showing twenty-sixth to twenty-eighth embodiments of the present invention, respectively.

FIG. 81 shows the twenty-sixth embodiment of the present invention.

The reading conditions are changed in the above embodiment. However, in this embodiment, an unevenness correction pattern is changed.

Referring to FIG. 81, a pattern indication unit 470 outputs a pattern indication signal 471. The pattern indication signal 471 is input to an unevenness correction pattern generator 472. The unevenness correction pattern generator 472 outputs an unevenness correction pattern signal 473.

In a normal operation, a halftone density having a duty of 50% is indicated by the pattern indication unit 470, and an image signal 473 having a duty of 50% is output from the unevenness correction pattern generator 472. Patterns printed with a head 449 are read to form unevenness correction data on the basis of this image signal.

Even if correction with the halftone having a duty of 50% is performed, unevenness is left for a halftone density having a duty of 30%. In this case, if an original is a halftone image having a duty of about 30%, unevenness occurs in an output image. A pattern having a duty of 30% is selected by the pattern indication unit 470, and is a halftone image having a duty of 30% is printed to perform unevenness correction. With this technique, optimal unevenness correction suitable for an original used can be performed, and a uniform image can always be obtained.

The twenty-seventh embodiment of the present invention will be described with reference to FIG. 82.

This embodiment exemplifies a method for calculating correction data utilizing the coefficient K from equation (1) used in the seventeenth embodiment.

Figure 82:
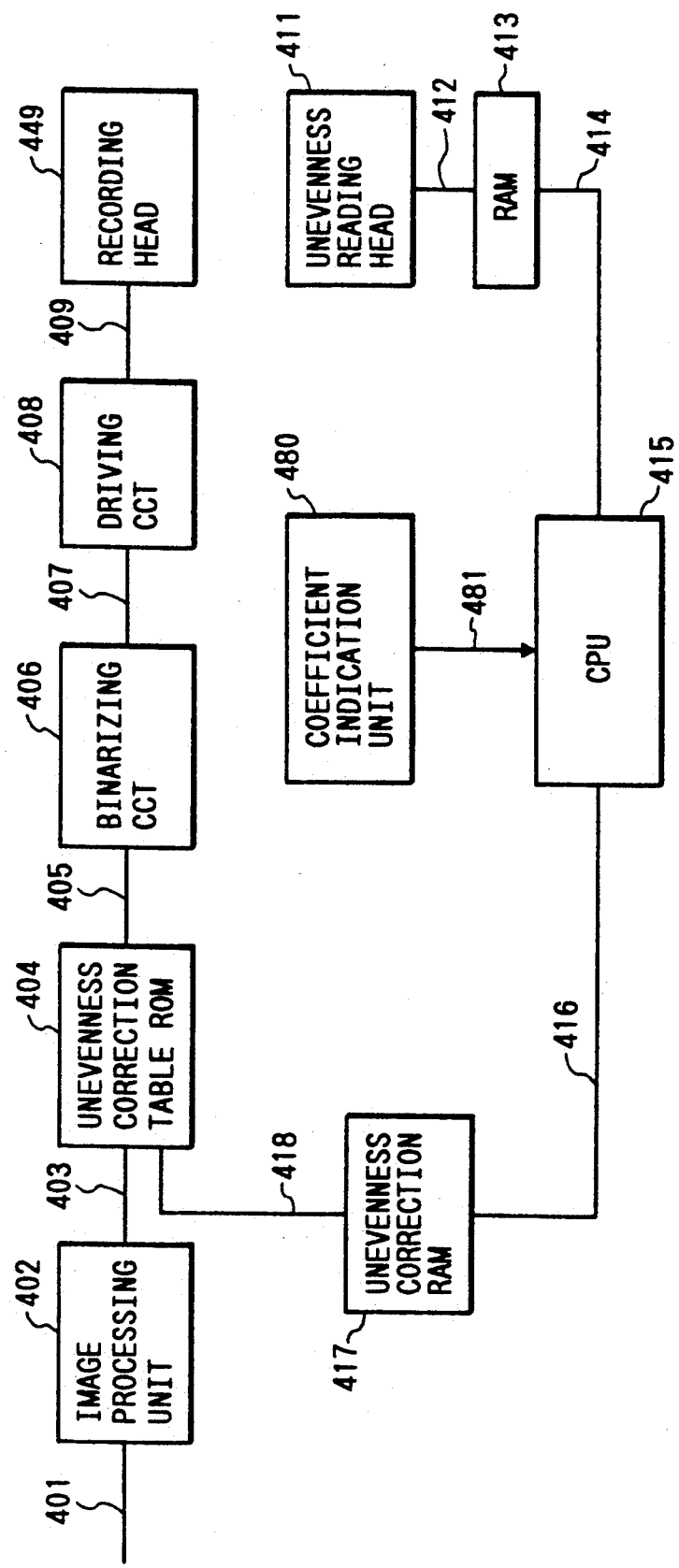

Referring to FIG. 82, a coefficient indication unit 480 outputs a coefficient indication signal 481. In general, the coefficient K is determined by gradation characteristics of the recording heads and linearity of the uneven image density reading head. When the head is used for a long period of time, these characteristics are often changed. In this case, when a K value is subjected to aberration from the optimal value, a uniform image cannot often be easily obtained by single rewriting of correction data. In this case, the coefficient K is reset by the coefficient indication unit 480 to form optimal unevenness correction data.

Figure 83:
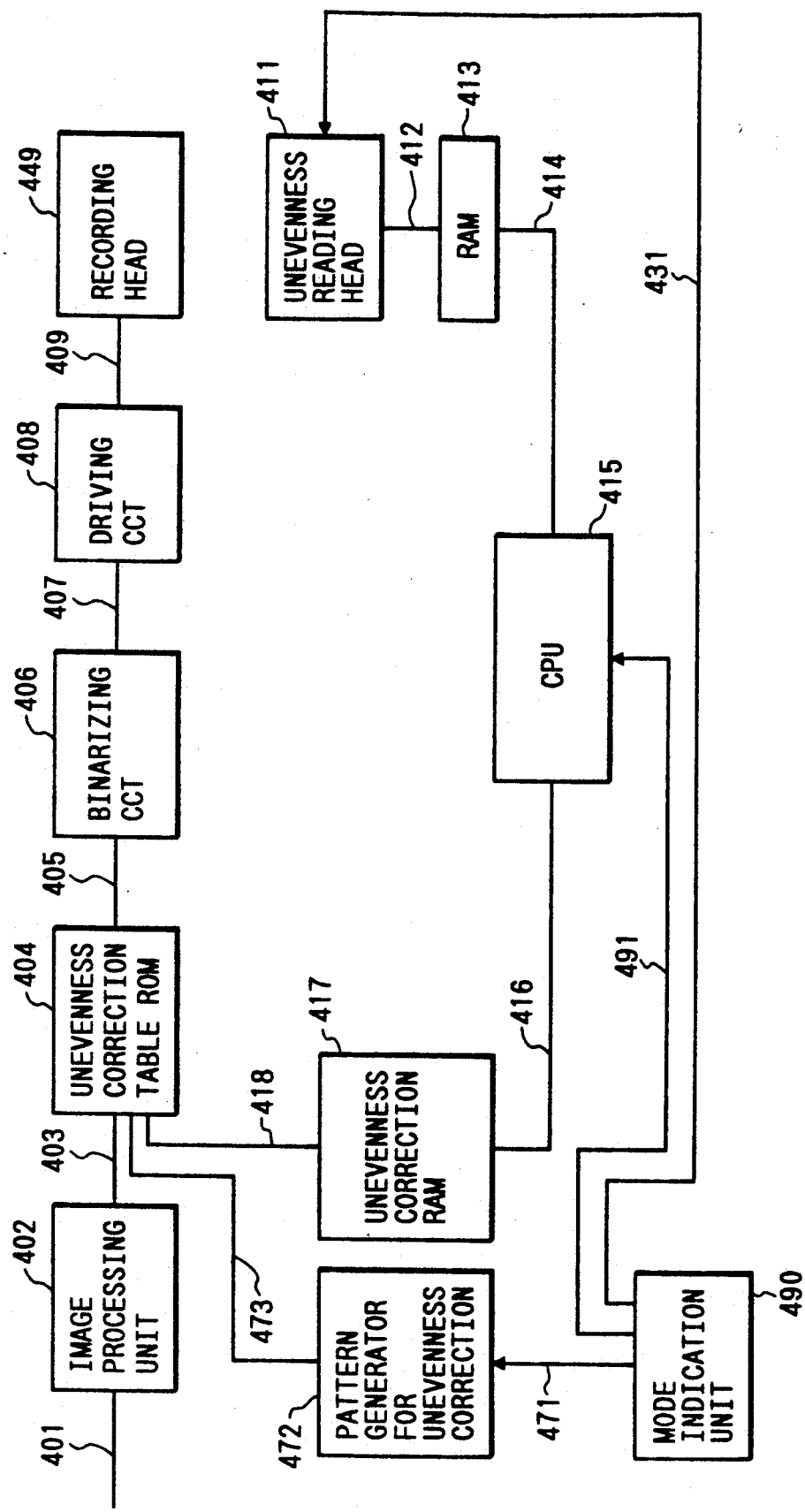

FIG. 83 shows the twenty-eighth embodiment of the present invention.

This embodiment demonstrates a case wherein unevenness correction patterns, a correction data calculating method, and an aperture size are changed.

Referring to FIG. 83, a mode indication unit 490 selects a fine mode and a rough or coarse mode. In the fine mode, an unevenness correction pattern generator outputs three halftone densities having duties of 30%, 50%, and 75%. These halftone patterns are read, and the corresponding correction data are calculated. A reading aperture is set to be minimum, and fine reading can be performed. In order to calculate the correction data, signal correction quantities $\Delta Sn$ are obtained by equation (1) using the patterns having the duties of 30%, 50%, and 75%. When the resultant signal correction quantities are defined as $\Delta Sn_{30}$, $\Delta Sn_{50}$, and $\Delta Sn_{75}$, an average value is obtained as follows:

$$\Delta Sn' = (\Delta Sn_{30} + \Delta Sn_{50} + \Delta Sn_{75})/3$$

and correction data corresponding to the average value of $\Delta Sn$ are obtained. As a result, unevenness correction data having a sufficient unevenness correction effect can be obtained for the halftone images having all duties.

When the rough mode is selected, the unevenness correction patterns comprise by only halftone patterns having a duty of 50%, and a large reading aperture is set. In addition, the calculation of the correction data can be performed in the same manner as in the seventeenth embodiment. As a result, the unevenness correction data can be formed within a short period of time.

The unevenness correction patterns, the reading aperture size, and the calculation method are changed to form unevenness correction data with high precision depending on given conditions. Therefore, rough unevenness correction data can be formed within a short period of time.

The twenty-ninth embodiment is arranged, as shown in FIG. 83. In this embodiment, unevenness correction patterns, a read aperture size, and a calculation method are changed.

In the fine mode of this embodiment, unevenness correction patterns comprise halftone patterns having a duty of 50%. In this case, the unevenness correction tables have straight lines having a gradient of 1.0 as in each embodiment described above. A reading aperture is set small, and a calculation method is the same as that in the seventeenth embodiment.

On the other hand, in the rough mode, although halftone patterns having a duty of 50% as in the fine mode are output from the unevenness correction pattern generator 472, an unevenness correction table has straight lines selected by the unevenness correction data formed in the previous unevenness correction data rewriting operation. The unevenness correction pattern in the rough mode is an unevenness-corrected halftone pattern having a duty of 50%, which is different from that in the fine mode. A reading aperture is set large. In a calculation method, the average value $\Delta Sn'$ obtained as in the seventeenth embodiment is multiplied with the previous value $\Delta Sn$ as follows:

$$\Delta Sn'' = \Delta Sn \times \Delta Sn'$$

Correction data are formed in accordance with this value $\Delta Sn''$. In the rough mode, since only a portion subjected to a change in unevenness is to be corrected after the previous unevenness correction data rewriting operation is performed, correction data can be formed within a short period of time.

With the above arrangement, when new correction data must be formed at the time of mounting of a new head, and when data can be formed for a relatively long period of time, a fine mode is selected. When correction data rewriting is required during use, the rough mode is selected, thereby forming optimal unevenness correction data depending on different conditions.

Figure 84:
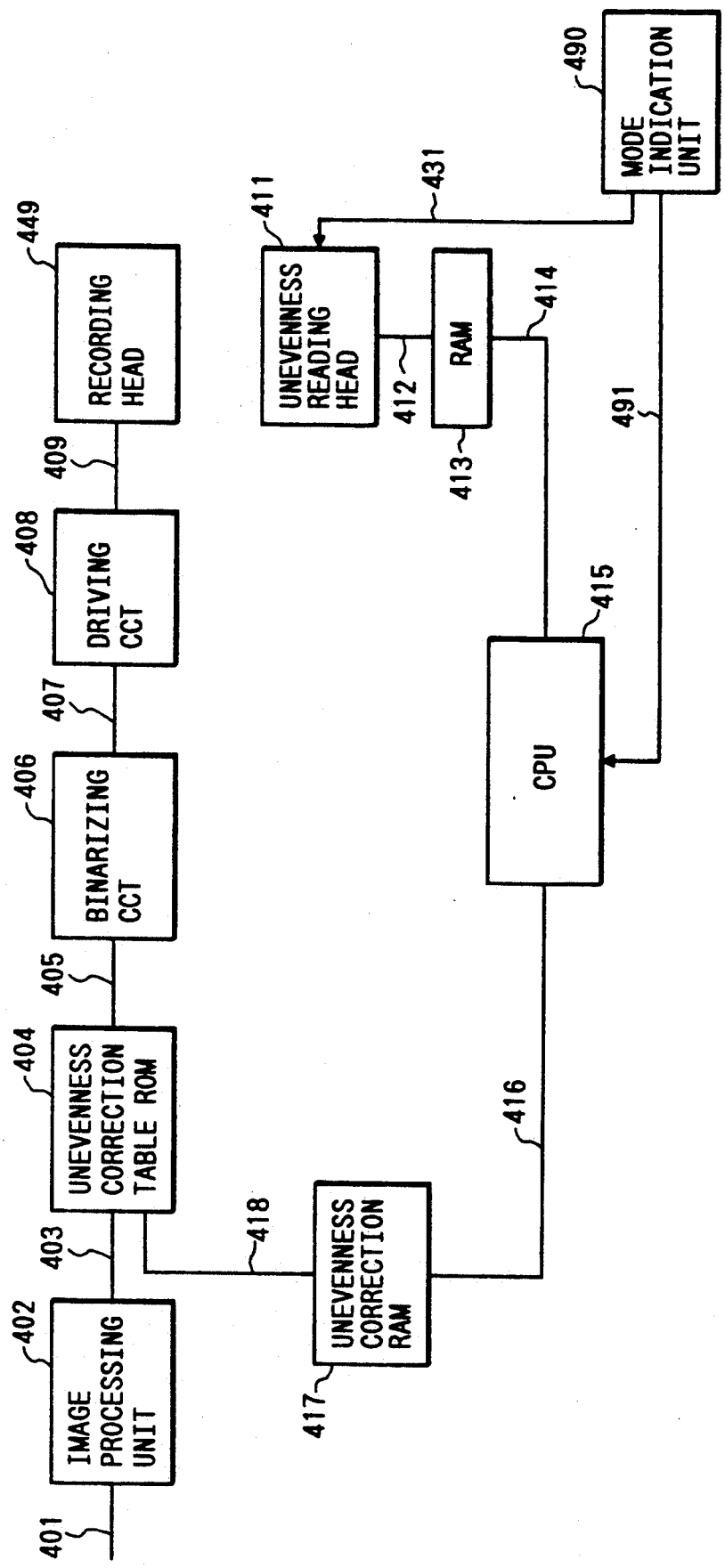
FIG. 84 is a block diagram showing the thirtieth embodiment of the present invention.

FIG. 84 shows the thirtieth embodiment of the present invention.

In this embodiment, a reading aperture size and a calculation method are changed. In the fine mode, the aperture size is set small. Correction data are formed in the same calculation method as in the seventeenth embodiment. In the rough mode, a large aperture size is set, and the following operation is performed.

Until an average density $C = \Sigma Cn/256$ is obtained, the same operations as in the seventeenth embodiment are performed. In this embodiment, however, an average value $C'k$ every eight nozzles is obtained as follows:

$$C'k = \sum_{l=1}^{8} C_{8(k-1)+l}/8$$

for $k = 1, 2, \ldots, 32$

The above value corresponds to an average density of each block when 256 nozzles are divided into 32 blocks each consisting of eight nozzles.

An aberration of the average value of each block from a total average density is calculated as follows:

$$\Delta Ck = C/C'k$$

A signal correction quantity $\Delta Sk$ corresponding to $\Delta Ck$ is obtained from the relation:

$$\Delta Sk = K \cdot \Delta Ck$$

A selection signal of a correction straight line to be selected in accordance with this $\Delta Ck$ is obtained, and is defined as unevenness correction data. With this technique, in the rough mode, correction data are formed every block consisting of eight nozzles. In this case, although fine unevenness cannot be corrected, unevenness correction can be performed within a short period of time because the operation is rarely influenced by the reading nozzle.

In the above embodiments, the pattern indication unit, the coefficient indication unit, and the mode indication unit can be arbitrarily set by the serviceman or user. These units designate the corresponding contents in accordance with counts of the counter for the number of head-use times and the counter for the number of unevenness correction data rewriting times.

In the above embodiments, the counter for the number of head-use times and the counter for the number of unevenness correction data rewriting times are not limited to the arrangements described above. For example, a count representing a counter history such as a timer for measuring a time upon mounting of a new head, or a counter for counting the number of print dots may be used.

The above embodiment exemplifies a case wherein a semi-multi-head is used as a recording head, and image recording is performed by serially scanning this head. However, a full multi-head may be used.

Furthermore, the recording head is not limited to an ink-jet recording head. A multi-head such as a thermal head may be used. The recording head used in this embodiment may be a multi-head having a plurality of recording elements.

As has been described above, according to the present invention, one of the conditions, i.e., test images, reading conditions, and a correction data calculating method, is set variable to form unevenness correction data upon reading of uneven image densities of the multi-heads. Optimal reading and optimal formation of unevenness correction data can always be performed.

In each embodiment described above, when at least density test printing of test patterns or the like is to be performed and each pixel comprises a plurality of dots, a print duty, i.e., a print density can be set by changing the number of recording dots constituting each pixel. In this case, a print duty is not 100% but is preferably 75% or less and 25% or more. Each test pattern is optimally formed at a print duty of 50%. This is suitable for a scheme for obtaining an optical reflection density because a small change in density is obtained as a change suitable for print characteristics of a recording head.

However, the print ratio can be changed by changing a drive voltage and/or driving pulse width, or by changing the number of ink injection times per dot. This can cope with a dot structure in which each dot is constituted by one pixel. The present invention is also applicable to any scheme for changing a print ratio.

The above embodiment is an optimal embodiment for performing correction processing in units of injection energy generation elements. In practice, when a convergent state of uneven density processing and processing time are taken into consideration, common correction may be performed for a plurality of predetermined adjacent injection energy generation elements. Judging from these viewpoints, an optimal arrangement can be obtained such that common correction is preferably performed in units of blocks each consisting of a plurality of injection energy generation elements among a large number of injection energy generation elements of the recording head. A known block driving scheme may be used, or a specific block driving scheme may be used instead. However, it must provide a drive condition for uniforming a density to be corrected upon judgment of an uneven image density.

Data associated with test patterns may be supplied from a host unit having an arrangement shown in FIG. 33. Alternatively, these data may be supplied from a test pattern data generating means integrally combined with the recording head 1 shown in FIG. 33.

The present invention brings about excellent effects particularly in a recording head or recording device of ink-jet recording system using heat energy among the ink-jet recording systems.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one drive signal which gives rapid temperature elevation exceeding nucleus boiling corresponding to the recording information on an electricity-heat converters arranged corresponding to the sheets or liquid channels holding liquid (ink), heat energy is generated at the electricity-heat converters to effect film boiling at the heat acting surface of the recording head, and consequently the bubbles within the liquid (ink) can be formed corresponding one by one to the drive signals. By discharging the liquid (ink) through an opening for discharging by growth and shrinkage of the bubble, at least one droplet is formed. By making the drive signals into pulse shapes, growth and shrinkage of the bubble can be effected instantly and adequately to accomplish more preferably discharging of the liquid (ink) particularly excellent in response characteristic. As the drive signals of such pulse shape, those as disclosed in U.S. Pat. Nos. 4,463,359 and 4,345,262 are suitable. Furthermore, excellent recording can be performed by employment of the conditions as described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-head converter (linear liquid channel or right angle liquid channel) as disclosed in the above-mentioned respective specifications, the constitution by use of U.S. Pat. Nos. 4,558,333, 4,459,600 disclosing an arrangement wherein the heat acting portion is arranged in the flexed region is also included in the present invention. In addition, the present invention can also be effectively made the constitution as disclosed in Japanese Patent Laid-Open Application No. 59-123670 which discloses the constitution using a slit common to a plurality of electricity-heat converters as the discharging portion of the electricity-heat converter or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary means, etc. provided as part of the recording device of the present invention is preferable, because the effect of the present invention can thereby be further stabilized. Specific examples of these may include, for the recording head, capping means, cleaning means, pressurization or aspiration means, electricity-heat converters or another heating element or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, and whether the recording head may be either integrally constituted or combined in plural number.

What is claimed is:

1. An image recording apparatus for performing image recording on a recording medium in accordance with image signals by using plural different types of recording head, each head having a plurality of recording elements comprising an array, said plural different types of recording heads respectively corresponding to different image characteristics, comprising:

test pattern forming means for forming a plurality of test patterns on a recording medium by using plural different types of recording heads;

reading means for reading the plurality of test patterns recorded by said test pattern recording means; and correcting means for correcting image signals corresponding to a plurality of recording elements on the basis of the plurality of test patterns read by said reading means, said correcting means changing correction conditions in accordance with types of said different recording head.

2. An apparatus according to claim 1, wherein said correcting means comprises converting means for converting light quantity test patterns of the read data into density data on the basis of conversion parameters corresponding to said plural types of recording heads, and correction value calculating means for calculating correction values on the basis of the density data output from said converting means.

3. An apparatus according to claim 2, wherein said reading means comprises A/D-converting means for converting analog read data into digital light quantity data, and reference level converting means for converting a reference level of said A/D-converting means in correspondence with said plural types of recording heads.

4. An apparatus according to claim 1, wherein said plural types of recording heads perform recording in different colors, respectively.

5. An apparatus according to claim 1, wherein said plural types of recording heads perform recording at different densities, respectively.

6. An apparatus according to claim 1, wherein each of said recording elements has orifices for injecting inks.

7. An apparatus according to claim 1, wherein each of said recording elements comprises heat energy generating means for causing a change in state of an ink by heat, and ejecting the ink from said orifice on the basis of the change in state.

8. An apparatus according to claim 1, wherein said test pattern forming means records the test pattern by using one of said plural types of recording heads for each of the recording media.

9. An apparatus according to claim 1, wherein said test pattern forming means sequentially records the test patterns with said plural types of recording heads on each of the recording media.

10. An apparatus according to claim 1, wherein said reading means comprises a CCD.

11. An image forming apparatus comprising:
a recording head having a plurality of recording elements for forming an image on a recording medium in accordance with image signals, said plurality of recording elements comprising an array;
test pattern forming control means for causing said recording head to form plural types of test patterns having different densities;
density reading means for reading the densities of said plural types of test patterns; and
data forming means for forming correction data on the basis of the plural types of test patterns read by said density reading means, said correction data being for making image formation densities uniform regarding a respective different density; and
image density correction means for correcting image signal corresponding to said plurality of recording elements on the basis of the correction data.

12. An apparatus according to claim 11, wherein said uneven image density correcting means corrects the image signal on the basis of data obtained by averaging the correction data.

13. An apparatus according to claim 11, wherein said uneven image density correcting means corrects the image signal on the basis of data obtained by weighting and averaging the correction data.

14. An apparatus according to claim 13, wherein coefficients for weighting and averaging the correction data are variably set.

15. An apparatus according to claim 11, wherein said recording head comprises a plurality of heads arranged in units of recording agents, said units having different colors for performing multi-color recording.

16. An apparatus according to claim 11, wherein said recording head is an ink-jet recording head.

17. An apparatus according to claim 11, wherein each of said recording elements comprises heat energy generating means for causing a change in state of an ink by heat, and ejecting the ink from said orifice on the basis of the change in state.

18. An image recording apparatus for performing image formation on a recording medium in accordance with image signals by using a plurality of recording heads of different colors, each head having a plurality of recording elements comprising an array, said image forming apparatus comprising:

test pattern formation control means for forming plural types of test patterns, having different densities, by using a plurality of recording heads;
density reading means for reading densities of the plural types of test patterns formed by said plurality of recording heads under the control of said test pattern formation control means; and
generating means for generating correction data for making uniform image formation densities regarding a respective different density on the basis of densities of the plural types of test patterns formed by said plurality of recording heads, said generating means changing correction data generating conditions in accordance with colors associated with said recording heads; and
correcting means for correcting image signals corresponding to a plurality of recording elements of said plurality of recording heads on the basis of the correction data.

19. An apparatus according to claim 18, wherein said uneven image density correcting means corrects the image signal on the basis of data obtained by averaging the correction data.

20. An apparatus according to claim 18, wherein said uneven image density correcting means corrects the image signal on the basis of data obtained by weighting and averaging the correction data.

21. An apparatus according to claim 20, wherein coefficients for weighting and averaging the correction data are variably set.

22. An apparatus according to claim 18, wherein said recording head is an ink-jet recording head.

23. An apparatus according to claim 18, wherein each of said recording elements comprises heat energy generating means for causing a change in state of an ink by heat, and ejecting the ink from said orifice on the basis of the change in state.

24. An apparatus according to claim 18, wherein said density reading means reads densities of the test patterns in accordance with conditions corresponding to recording colors of said plurality of recording heads.

25. An apparatus according to claim 24, wherein said density reading means comprises color filters corresponding to the colors of said plurality of recording heads.

26. An image forming apparatus comprising:
a recording head having a plurality of recording elements for forming an image on a recording medium, said plurality of recording elements comprising an array;
means for causing relative movement between said recording head and the recording medium, for giving different image signals to said plurality of recording elements upon relative movement between said recording head and the recording medium, and for forming test patterns having areas of different densities in a direction of the relative movement;
reading means for reading densities of the test patterns in different density areas; and
uneven image density correcting means for correcting image signals corresponding to said plurality of recording elements at the time of image formation so as to make image formation densities uniform regarding a respective different density on the basis of densities read by said reading means.

27. An apparatus according to claim 26, wherein said test pattern forming means performs test pattern formation processing once, and said reading means performs test pattern reading processing once.

28. An apparatus according to claim 26, wherein the different densities are two different densities consisting of densities higher and lower than a correction reference density obtained by said uneven image density correcting means.

29. An apparatus according to claim 26, wherein the different densities are three different densities consisting of densities higher and lower than a reference density formed by said uneven image density correcting means and the reference density.

30. An apparatus according to claim 26, wherein said recording head comprises a plurality of recording heads arranged in units of recording agents, said units having different colors for performing multi-color recording.

31. An apparatus according to claim 26, wherein said recording head is an ink-jet recording head.

32. An apparatus according to claim 18, wherein each of said recording elements comprises heat energy generating means for causing a change in state of an ink by heat, and ejecting the ink from said orifice on the basis of the change in state.

33. An image recording apparatus for performing image formation on a recording medium by using a plurality of recording heads of different colors each having a plurality of recording elements comprising an array, said image forming apparatus comprising:
test pattern forming means for causing relative movement between a plurality of recording heads and a recording medium, for giving different image signals to a plurality of recording elements upon relative movement between said plurality of recording heads and the recording medium, and for forming test patterns having areas of different densities in a direction of the relative movement by use of said plurality of recording heads;
reading means for reading densities of the test patterns in different density areas corresponding to said plurality of recording heads; and
uneven image density correcting means for correcting image signals corresponding to said plurality of recording elements of said plurality of recording heads so as to make image formation densities uniform regarding a respective different density on the basis of densities read by said reading means, said correcting means changing correction conditions in accordance with colors associated with said recording heads.

34. An apparatus according to claim 33, wherein the different densities are two different densities consisting of densities higher and lower than a correction reference density obtained by said uneven image density correcting means.

35. An apparatus according to claim 33, wherein the different densities are three different densities consisting of densities higher and lower than a reference density formed by said uneven image density correcting means and the reference density.

36. An apparatus according to claim 33, wherein said recording head is an ink-jet recording head.

37. An apparatus according to claim 33, wherein each of said recording elements comprises heat energy generating means for causing a change in state of an ink by heat, and ejecting the ink from said orifice on the basis of the change in state.

38. An image recording apparatus for performing recording on a recording medium by using a recording head having a plurality of recording elements comprising an array, said image forming apparatus comprising:
reading means for reading an image and outputting color signals corresponding to the image;
color correction processing means for performing color correction processing of the color signals output from said reading means;
test pattern forming means for forming predetermined test patterns by using a recording head;
correcting means for causing said reading means to read the predetermined test patterns formed by said test pattern forming means, for obtaining correction data from the color signals color-corrected by said color correction processing means, and for correcting image signals corresponding to a plurality of recording elements on the basis of the correction data; and
color correction control means for causing said color correction processing means to perform different color correction processing operations when in a test pattern reading mode as compared to a normal original image reading mode.

39. An apparatus according to claim 38, wherein said plurality of recording elements are arranged in correspondence with recording agents having different colors so as to perform multi-color recording.

40. An apparatus according to claim 38, wherein said color correction processing in accordance with means comprises an input masking processing unit for performing processing characteristics of said reading means, and said color correction control means controls input masking processing performed by said input masking processing unit.

41. An apparatus according to claim 40, wherein said color correction control means changes operation coefficients of said input masking processing unit.

42. An apparatus according to claim 38, wherein said color correction processing means comprises a masking processing in accordance with unit for performing processing characteristics of said recording head, and said color correction control means controls masking processing of said masking processing unit.

43. An apparatus according to claim 42, wherein said color correction control means changes operation coefficients of said masking processing unit.

44. An apparatus according to claim 38, wherein said recording head is an ink-jet recording head.

45. An apparatus according to claim 38, wherein each of said recording elements comprises heat energy generating means for causing a change in state of an ink by heat, and ejecting the ink from said orifice on the basis of the change in state.

46. An image forming apparatus for forming an image on a recording medium in accordance with image signals on the basis of color signals corresponding to an original image obtained by reading an original image, by using a recording head having a plurality of recording elements comprising an array, said image forming apparatus comprising:
color correction processing means for performing color correction processing of color signals;
correcting means for obtaining correction data from the color-corrected color signals upon reading of predetermined test patterns, and for correcting image signals corresponding to a plurality of recording elements at the time of image formation on the basis of the correction data; and color correction control means for causing said color correction processing means to perform different color correction processing operations for color signals corresponding to the test patterns and color signals supplied for normal image formation.

47. An apparatus according to claim 46, wherein said color correction processing means comprises a masking processing in accordance with unit for performing processing characteristics of said recording head, and said color correction control means controls masking processing performed by said masking processing unit.

48. An apparatus according to claim 47, wherein said color correction control means changes operation coefficients of said masking processing unit.

49. An apparatus according to claim 46, wherein said recording head is an ink-jet recording head.

50. An apparatus according to claim 46, wherein each of said recording elements comprises heat energy generating means for causing a change in state of an ink by heat, and ejecting the ink from said orifice on the basis of the change in state.

51. An image reading apparatus having reading means for reading an original image and outputting color signals corresponding to the original image, comprising:
    color correction processing means for performing color correction processing of color signals; and
    color correction control means for causing said color correction processing means to perform different color correction processing operations for color signals corresponding to test patterns supplied to correct image signals corresponding to a recording means at the time of image formation, and color signals supplied for normal image formation.

52. An apparatus according to claim 51, wherein said color correction processing means comprises an input masking processing in accordance with unit for performing processing characteristics of said reading means, and said color correction control means controls input masking processing performed by said input masking processing unit.

53. An apparatus according to claim 52, wherein said color correction control means changes operation coefficients of said input masking processing unit.

54. An image forming apparatus for performing image recording, in accordance with image signals, using a plurality of recording elements comprising an array, said image forming apparatus comprising:
    test pattern forming means for forming a plurality of test patterns on a recording medium by using a recording head;
    reading means for optically reading densities of the plurality of test patterns recording on the recording medium by said test pattern forming means in accordance with predetermined reading conditions;
    means for calculating correction data on the basis of the densities read by said reading means;
    image signal correcting means for correcting image signals corresponding to recording elements on the basis of the correction data calculated by said calculating means; and
    control means for variably setting a formation condition of said test pattern forming means, a reading condition of said reading means, or a method of calculating the correction data by said calculating means.

55. An apparatus according to claim 54, wherein the reading condition of said reading means is an aperture size of an aperture means disposed in front of said reading means.

56. An apparatus according to claim 54, wherein the reading condition of said reading means is a reading area size.

57. An apparatus according to claim 54, wherein the reading condition of said reading means is a reading speed.

58. An apparatus according to claim 54, wherein the reading condition of said reading means is a focus adjusting quantity.

59. An apparatus according to claim 54, further comprising a reading head comprising a plurality of heads having different reading conditions corresponding to the reading condition of said reading means.

60. An apparatus according to claim 54, wherein at least one of a recording condition of the test pattern, the reading conditions, and a method of calculating the correction data is arbitrarily set.

61. An apparatus according to claim 54, wherein at least one of a recording condition of the test pattern, the reading conditions, and a method of calculating the correction data is arbitrarily set in accordance with a history of said recording head.

62. An apparatus according to claim 54, wherein said color correction processing means comprises an input masking processing in accordance with unit for performing processing characteristics of said reading means, and said color correction control means controls input masking processing performed by said input masking processing unit.

63. An apparatus according to claim 62, wherein said color correction control means changes operation coefficients of said input masking processing unit.

64. An apparatus according to claim 54, wherein said recording head is an ink-jet recording head.

65. An apparatus according to claim 54, wherein each of said recording elements comprises heat energy generating means for causing a change in state of an ink by heat, and ejecting the ink from said orifice on the basis of the change in state.

* * * * *

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.    Page 1 of 9

It is certified that error appears in the above-identified patent and that said Letters Patent is hereby corrected as shown below:

ON THE TITLE PAGE:
AT [54] TITLE

"RECORDINGS HEADS" should read --RECORDING HEADS--.

AT [57] ABSTRACT

"to" should read --to an--.

IN THE DRAWINGS:
SHEET 18 OF 73

FIG. 27A, "OPTICAY" should read --OPTICAL--.

SHEET 19 OF 73

FIG. 27C, "OPTICAY" should read --OPTICAL--.

SHEET 39 OF 73

FIG. 50, "201Y  201Y" should read --201Y  201M--.

COLUMN 1

Line 4, "RECORDINGS" should read --RECORDING--.
Line 37, "generated" should read --generally--.

COLUMN 4

Line 23, "drive" should read --drive or--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.

It is certified that error appears in the above-identified patent and that said Letters Patent is hereby corrected as shown below:

COLUMN 5

Line 8, "$\Delta ABC\alpha\Delta ADE$" should read --$\Delta ABC\infty\Delta ADE$--.

COLUMN 6

Line 19, "halftone image 50% duty" should read --50% duty halftone image--.

COLUMN 8

Line 1, "to the" should read --to take the--.
Line 40, "depending" should read --depending on--.
Line 60, "input" should read --input signals--.

COLUMN 14

Line 49, "with" should read --in--.
Line 50, "in" should read --with--.
Line 53, "since" should be deleted.

COLUMN 15

Line 23, "difference" should read --differences--.

COLUMN 16

Line 7, "is" should read --are--.
Line 32, "set variably" should read --variably set--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.     Page 3 of 9

It is certified that error appears in the above-identified patent and that said Letters Patent is hereby corrected as shown below:

COLUMN 17

Line 49, "1BK" should read --1BK, and--.
    Line 53, "recovery" should read --recovery,--.

COLUMN 18

Line 6, "unit, 7" should read --unit 7--.

COLUMN 20

Line 38, "and" should be deleted.
    Line 39, "operation," should read --operation, and--.
    Line 50, "indicates" should be deleted.

COLUMN 21

Line 66, "is" should read --may be--.

COLUMN 22

Line 31, "FIG. 23," should read --FIG. 20,--.
    Line 52, "performed," should read --performed.--.
    Line 53, "when" should read --When-- and "performed" should read --performed,--.

COLUMN 23

Line 52, "BL filter 77BK," should read --BL filter 77 BL,--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.    Page 4 of 9

It is certified that error appears in the above-identified patent and that said Letters Patent is hereby corrected as shown below:

COLUMN 25

Line 18, "or" should read --of--.
Line 25, "operates" should be deleted, and
"system by" should read --system operates by--.
Line 29, " host unit 33H" should read --host unit H--.
Line 53, "(Under Color Removal) and," should read
--(Under Color Removal), and--.

COLUMN 27

Line 63, "prior to" (2nd occurrence) should be deleted.

COLUMN 29

Line 30, close up right margin.
Line 31, close up left margin.
Line 41, "C.∹40°C.)" should read --C.→40°C.)--.
Line 51, "to" should be deleted.

COLUMN 30

Line 24, "a" should be deleted.
Line 64, "times" should read --time--.
Line 67, "times" should read --time--.
Line 68, "times" should read --time--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.

It is certified that error appears in the above-identified patent and that said Letters Patent is hereby corrected as shown below:

COLUMN 31

Line 26, "times" should read --time--.
Line 29, "times" should read --time--.

COLUMN 33

Line 43, "A=1, otherwise.  Generally" should read
--A=1.  Generally,--,
Line 51, "lines selected" should read --line selection--.
Line 57, "density," should read --density--.

COLUMN 34

Line 27, "$0.25<(a_1/a_2)<1.$" should read --$0.25<(a_3/a_2)<1.$--.

COLUMN 35

Line 64, "ejection" should read --ejection,--.

COLUMN 36

Line 33, "B, and L" should read --and BL--.

COLUMN 37

Line 15, "201Y, 201Y," should read --201Y, 201M,--.
Line 33, "by" should be deleted.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.   Page 6 of 9

It is certified that error appears in the above-identified patent and that said Letters Patent is hereby corrected as shown below:

COLUMN 38

Line 10, "correcting" should read --correction--.

COLUMN 39

Line 20, "in" should be deleted.
Line 45, "timing" should read --time--.
Line 47, "timing" should read --time--.

COLUMN 40

Line 34, "to" should be deleted.

COLUMN 42

Line 49, "to" should be deleted.

COLUMN 43

Line 16, "(t be" should read --(to be--.

COLUMN 45

Line 11, "Y-cor-" should read --γ-cor- --.

COLUMN 46

Line 48, "in" should be deleted.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.

It is certified that error appears in the above-identified patent and that said Letters Patent is hereby corrected as shown below:

COLUMN 49

Line 2, "unit 113," should read
--unit 113 (shown in FIG. 62),--.

COLUMN 50

Line 14, "of" should read --of the--.

COLUMN 52

Line 60, "Subsequently" should read --Subsequently,--.

COLUMN 54

Line 13, "serviceman for" should read
--serviceman, taking--.
Line 25, "counter 436" should read --counter 435--.
Line 64, "set variable" should read --variably set--.

COLUMN 56

Line 4, "is" (1st occurrence) should be deleted.
Line 53, "by" should be deleted.

COLUMN 59

Line 23, "an" should be deleted.
Line 52, "made" should read --made of--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.    Page 8 of 9

It is certified that error appears in the above-identified patent and that said Letters Patent is hereby corrected as shown below:

COLUMN 60

Line 34, "head," should read --heads,--.

COLUMN 61

Line 26, "forming" should read --formation--.
Line 37, "correction" should read --correcting--.
Line 38, "signal" should read --signals--.
Line 62, "recording" should read --forming--.

COLUMN 63

Line 19, "claim 18," should read --claim 26,--.
Line 24, "recording" should read --forming--.

COLUMN 64

Line 28, "in accordance with" should be deleted.
Line 30, "processing" should read
         --processing in accordance with--.
Line 39, "in accordance with" should be deleted.
Line 40, "cessing" should read
         --cessing in accordance with--.

UNITED STATES PATENT AND TRADEMARK OFFICE
CERTIFICATE OF CORRECTION

PATENT NO. : 5,276,459
DATED : January 4, 1994
INVENTOR(S) : TOSHIMITSU DANZUKA ET AL.

It is certified that error appears in the above-identified patent and that said Letters Patent is hereby corrected as shown below:

COLUMN 65

Line 8, "in accordance with" should be deleted.
    Line 9, "cessing" should read
        --cessing in accordance with--.
    Line 39, "in accordance with" should be deleted.
    Line 40, "processing" should read
        --processing in accordance with--.

COLUMN 66

Line 42, "in accordance with" should be deleted.
    Line 43, "processing" should read
        --processing in accordance with--.

Signed and Sealed this

Thirteenth Day of September, 1994

Attest:

BRUCE LEHMAN

Attesting Officer     Commissioner of Patents and Trademarks